United States Patent
Lindsay et al.

(10) Patent No.: US 7,629,043 B2
(45) Date of Patent: *Dec. 8, 2009

(54) MULTI PURPOSE CLEANING PRODUCT INCLUDING A FOAM AND A WEB

(75) Inventors: Jeffrey Dean Lindsay, Appleton, WI (US); Fung Jou-Chen, Appleton, WI (US); Julie Marie Bednarz, Neenah, WI (US); Stanley R. Kellenberger, Appleton, WI (US); James Tanner, Winneconne, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 64 days.

This patent is subject to a terminal disclaimer.

(21) Appl. No.: 10/744,238

(22) Filed: Dec. 22, 2003

(65) Prior Publication Data
US 2005/0136238 A1  Jun. 23, 2005

(51) Int. Cl.
B32B 3/26 (2006.01)
A47L 13/46 (2006.01)

(52) U.S. Cl. ............. 428/316.6; 428/317.1; 428/317.9; 15/244.1; 15/244.3; 15/244.4

(58) Field of Classification Search .............. 428/316.6, 428/317.1, 317.9; 15/244.1, 244.3, 244.4
See application file for complete search history.

(56) References Cited

U.S. PATENT DOCUMENTS

| | | | |
|---|---|---|---|
| 3,093,600 A | 6/1963 | Spencer et al. | |
| 3,134,152 A | 5/1964 | Pei | |
| 3,522,196 A | 7/1970 | Dorier et al. | |
| 3,537,123 A | 11/1970 | Leland | |
| 3,857,133 A | 12/1974 | Linenfelser | |
| 4,018,575 A | 4/1977 | Davis et al. | |
| 4,125,664 A | 11/1978 | Giesemann | |
| 4,188,447 A | 2/1980 | Ehlenz | |
| 4,240,919 A | 12/1980 | Chapman | |
| 4,254,527 A | 3/1981 | Pfeifer | |
| 4,334,971 A | 6/1982 | Mahnke et al. | |
| 4,530,940 A | 7/1985 | Woerner et al. | |
| 4,540,717 A | 9/1985 | Mahnke et al. | |
| 4,569,861 A * | 2/1986 | Smith et al. | 427/244 |
| 4,666,948 A | 5/1987 | Woerner et al. | |
| 4,812,368 A | 3/1989 | Scherzer et al. | |
| 4,866,806 A | 9/1989 | Bedford | |
| 4,870,725 A | 10/1989 | Dubowik | |
| 4,885,206 A | 12/1989 | Graalmann et al. | |
| 4,902,283 A * | 2/1990 | Rojko et al. | 604/290 |
| 5,084,488 A | 1/1992 | Weiser et al. | |
| 5,094,717 A | 3/1992 | Manning et al. | |
| 5,152,809 A | 10/1992 | Mattesky | |
| 5,219,648 A | 6/1993 | Morimoto et al. | |
| 5,234,969 A | 8/1993 | Clark et al. | |
| 5,322,915 A | 6/1994 | Weiser et al. | |
| 5,413,853 A | 5/1995 | Imashiro et al. | |
| 5,436,278 A | 7/1995 | Imashiro et al. | |
| 5,530,031 A | 6/1996 | Guenther et al. | |

(Continued)

FOREIGN PATENT DOCUMENTS

CH   360592   2/1962

(Continued)

OTHER PUBLICATIONS

English Translation of JP 2003-116762, Mizukami Akira, "Sponge Scrub Brush and its Manufacturing Method," Apr. 22, 2003.*

(Continued)

*Primary Examiner*—Hai Vo
(74) *Attorney, Agent, or Firm*—Dority & Manning, P.A.

(57) ABSTRACT

A cleaning wipe and cleaning product are provided. The cleaning wipe includes a foam layer such as phenolic or melamine based foam that is configured for contacting and cleaning a surface. A reinforcing web is attached to the foam.

82 Claims, 17 Drawing Sheets

U.S. PATENT DOCUMENTS

| | | | |
|---|---|---|---|
| 5,560,794 A * | 10/1996 | Currie et al. ............. | 156/73.2 |
| 5,827,393 A | 10/1998 | Kinzelmann et al. | |
| 5,849,051 A | 12/1998 | Beardsley et al. | |
| 5,863,663 A | 1/1999 | Mackey et al. | |
| 5,939,515 A | 8/1999 | Guenther et al. | |
| 5,952,043 A | 9/1999 | Mackey et al. | |
| 5,952,251 A * | 9/1999 | Jackson et al. ............. | 442/340 |
| 5,990,377 A | 11/1999 | Chen et al. | |
| 6,017,831 A | 1/2000 | Beardsley et al. | |
| 6,133,332 A | 10/2000 | Ide et al. | |
| 6,211,128 B1 * | 4/2001 | Black ........................ | 510/191 |
| 6,346,557 B1 | 2/2002 | Argy et al. | |
| 6,350,511 B2 | 2/2002 | Thom | |
| 6,395,957 B1 | 5/2002 | Chen et al. | |
| 6,433,244 B1 | 8/2002 | Roe et al. | |
| 6,436,234 B1 | 8/2002 | Chen et al. | |
| 6,501,002 B1 | 12/2002 | Roe et al. | |
| 6,503,615 B1 | 1/2003 | Horii et al. | |
| 6,537,614 B1 | 3/2003 | Wei et al. | |
| 6,541,679 B2 | 4/2003 | Betrabet et al. | |
| 6,561,354 B1 | 5/2003 | Fereshtehkhou et al. | |
| 6,586,483 B2 * | 7/2003 | Kolb et al. ................... | 521/91 |
| 6,603,054 B2 | 8/2003 | Chen et al. | |
| 6,608,118 B2 | 8/2003 | Kosaka et al. | |
| 6,617,490 B1 | 9/2003 | Chen et al. | |
| 6,685,376 B2 | 2/2004 | Weihrauch | |
| 6,701,105 B2 | 3/2004 | Funabashi | |
| 6,713,156 B1 | 3/2004 | Pauls et al. | |
| 2002/0108640 A1 | 8/2002 | Barger et al. | |
| 2003/0017960 A1 | 1/2003 | Bertrem et al. | |
| 2003/0044569 A1 | 3/2003 | Kacher et al. | |
| 2003/0074756 A1 | 4/2003 | Policicchio et al. | |
| 2003/0135181 A1 | 7/2003 | Chen et al. | |
| 2003/0216272 A1 | 11/2003 | Sherry et al. | |
| 2004/0009141 A1 | 1/2004 | Koenig et al. | |
| 2004/0009210 A1 | 1/2004 | Koenig et al. | |
| 2004/0045112 A1 * | 3/2004 | Naumann | |
| 2004/0097609 A1 | 5/2004 | Hahnle et al. | |
| 2005/0011780 A1 * | 1/2005 | Simon et al. | |
| 2005/0202232 A1 * | 9/2005 | Sauniere | |
| 2006/0003912 A1 * | 1/2006 | Lindsay et al. ............. | 510/267 |
| 2006/0229229 A1 * | 10/2006 | Bednarz et al. ............. | 510/438 |

FOREIGN PATENT DOCUMENTS

| | | |
|---|---|---|
| DE | 2643717 | 8/1977 |
| DE | 8511694 | 11/1994 |
| DE | 29813214 U1 | 10/1998 |
| EP | B071671 | 12/1979 |
| EP | 0011055 | 5/1980 |
| EP | 0221330 | 5/1987 |
| EP | 0370697 | 5/1990 |
| EP | 0800784 | 10/1997 |
| EP | 0856276 | 8/1998 |
| EP | 0983014 B1 | 11/1998 |
| EP | 0986322 B1 | 11/1998 |
| EP | 0906410 B1 | 4/1999 |
| EP | 0987098 | 3/2000 |
| EP | 1147734 A2 | 10/2001 |
| EP | 1147734 A3 | 10/2001 |
| EP | 1203073 | 5/2002 |
| EP | 1251766 A2 | 10/2002 |
| EP | 1259152 A2 | 11/2002 |
| EP | 1314390 A1 | 5/2003 |
| FR | 2840523 | 12/2003 |
| GB | 664694 | 1/1952 |
| GB | 1131846 | 10/1968 |
| GB | 1443024 | 10/1973 |
| GB | 1354576 | 6/1974 |
| GB | 2125689 | 3/1984 |
| JP | 5171034 | 7/1993 |
| JP | 2000 288482 | 10/2000 |
| JP | 2000 342502 | 12/2000 |
| JP | 2000 351868 | 12/2000 |
| JP | 2001 169985 | 6/2001 |
| JP | 2002059443 A * | 2/2002 |
| JP | 2002 355211 | 12/2002 |
| JP | 2003 020358 | 1/2003 |
| JP | 2003 160687 | 6/2003 |
| JP | 2003 191256 | 7/2003 |
| JP | 2003180449 A * | 7/2003 |
| JP | 2003 250818 | 9/2003 |
| WO | WO 9114731 | 10/1991 |
| WO | WO 9614835 | 5/1996 |
| WO | WO 9633638 A1 | 10/1996 |
| WO | WO 9634035 | 10/1996 |
| WO | WO 9740814 | 11/1997 |
| WO | WO 9842819 | 1/1998 |
| WO | WO 9807809 A2 | 2/1998 |
| WO | WO 9807809 A3 | 2/1998 |
| WO | WO 9923160 | 5/1999 |
| WO | WO 9937747 A1 | 7/1999 |
| WO | WO 0000148 | 1/2000 |
| WO | WO 0027271 | 5/2000 |
| WO | WO 0111004 | 2/2001 |
| WO | WO 0112526 | 2/2001 |
| WO | WO 0141622 | 6/2001 |
| WO | WO 0154552 | 8/2001 |
| WO | WO 0162132 | 8/2001 |
| WO | WO 0194436 A2 | 12/2001 |
| WO | WO 0194436 A3 | 12/2001 |
| WO | WO 0200088 | 1/2002 |
| WO | WO 0226872 | 4/2002 |
| WO | WO 0241747 | 5/2002 |
| WO | WO 02083834 | 10/2002 |
| WO | WO 03000104 | 1/2003 |
| WO | WO 03000105 | 1/2003 |
| WO | WO 03103469 A1 * | 12/2003 |

OTHER PUBLICATIONS http://www.users.bigpond.com/jmc.au/cleenpro/cleenpro-e.htm.
http://www.aspachk.com/v9/aspac/why_aspac.html.
http://www.homemadesimple.com/mrclean/eraseruesage.shtml.
http://www.users.bigpond.com/jmc.au/cleenpro/cleenpro%20family-e.htm.
www.pvatechnology.com/kwnw/what.htm.
http://www.basf.com/static/openmarket/xcelerate/preview cid-991655156889 pubid.991224177622 c-article.html.
www.pfa.org/jifsgs 15.html.
Japanese Patent Laid-open No. 26054/1995, published Aug. 9, 1996.
Japanese Patent Laid-open No. 152848/1981, published Nov. 26, 1981.
U.S. Appl. No. 10/036,736, filed Dec. 21, 2001.
U.S. Appl. No. 10/321,277, filed Dec. 17, 2002.
U.S. Appl. No. 10/321,831, filed Dec. 17, 2002.
U.S. Appl. No. 10/733,169, filed Dec. 11, 2003.
U.S. Appl. No. 10/743,556, filed Dec. 22, 2003.
U.S. Appl. No. 10/739,530, filed Dec. 18, 2003.
U.S. Appl. No. 10/743,261, filed Dec. 22, 2003.
www.3M.com/us/home-leisure/scotchbrite/products/scrubbing-easy-erasing-pad.jhtml.
PCT International Search Report, Dec. 22, 2003.
PCT Written Opinion, Dec. 22, 2003.
Internet Document, "Stresses: Beams in Bending", found at http://ocw.mit.edu/NR/rdonlyres/49DF83AC-6D32-445F-9131-C441C1658F92/0/emech9_04.pdf.
Internet Document, Plate Calculations, found at www.efunda.com/formulae/solid_merchanics/plates/theory.cfm, Nov. 1, 2005.
Internet Document, "Comparison of FEM results with existing theory", found at http://ciks.cbt.nist.gov/~garbocz/opencell/node7.html, Nov. 1, 2005.

* cited by examiner

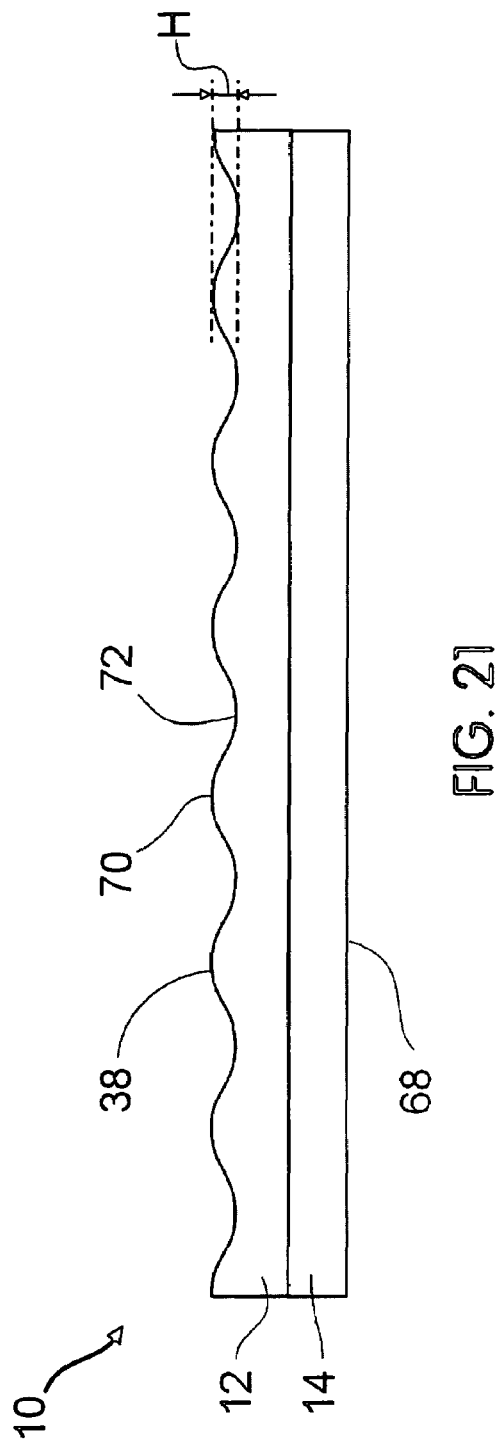
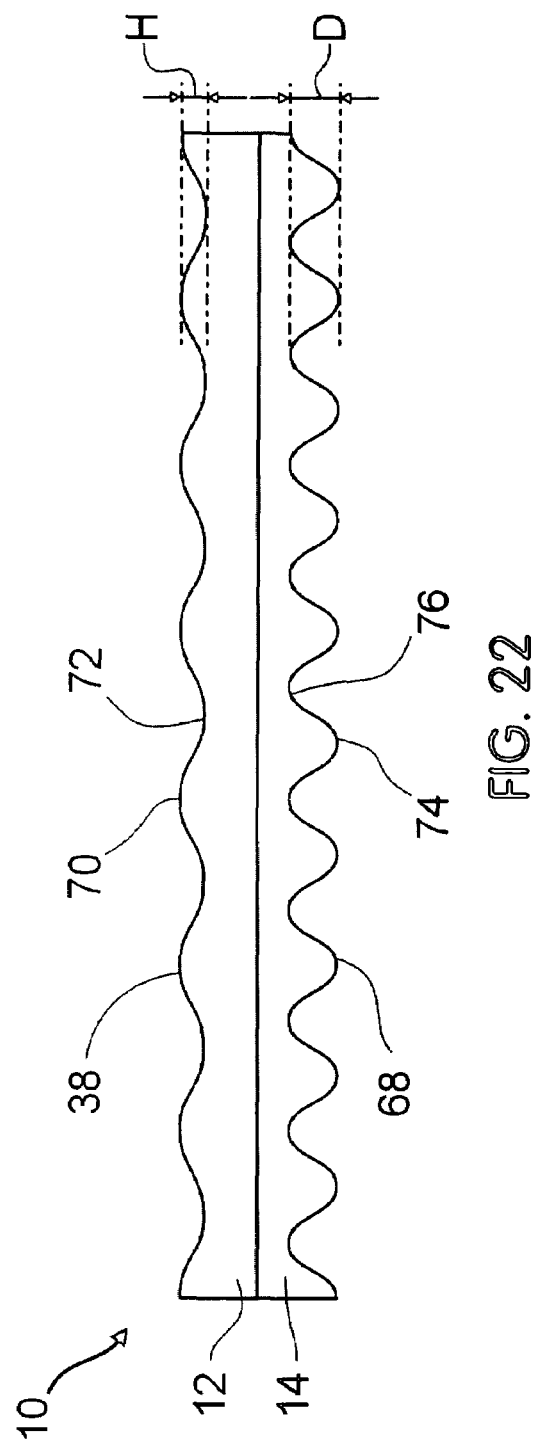

MULTI PURPOSE CLEANING PRODUCT INCLUDING A FOAM AND A WEB

BACKGROUND

Cleaning applications employ cleaning products, such as towels, in order to remove dirt and other unwanted elements from surfaces. In some instances the cleaning product may be a urethane foam or a cellulose sponge which may be used in order to wipe a surface clean. The cleaning product may be configured with bristles or grit disposed thereon in order to aid in cleaning.

Cleaning products can be configured to work when in a dry state in order to clean the surface, or may be designed to work in a wet state so that the cleaning product is wet to some degree when cleaning the surface. A detergent may be used with the cleaning product in order to assist in breaking up dirt and other unwanted elements so that the surface may be cleaned. It is sometimes the case that dirt or other unwanted elements cannot be sufficiently removed from a surface even when a cleaning product is properly applied. Applying the cleaning product too aggressively may result in the surface being damaged, and may still not result in the removal of dirt or unwanted elements from the surface. Examples of difficult to clean materials include crayon on walls, scuff marks from shoes on floors, permanent magic marker markings on a variety of surfaces such as dry erase boards, stains on porcelain or ceramics including dentures, grease and oil spots on numerous surfaces, hard water spots and soap scum on tile, biofilms on metal and plastic surfaces, mildew and fungus growths on numerous surfaces, and other forms of dirt, grime, or other unwanted elements from various surfaces.

Blocks of melamine foam have been recognized as having useful cleaning properties when wetted with water and rubbed against certain surfaces to be cleaned, and have been marketed in several countries for such purposes. Melamine-based foam has an open-celled, microporous structure. Melamine-based foam is abrasive in that when rubbed across a surface, dirt and other unwanted elements will be removed. Particles of the melamine-based foam may break off due to this abrasive contact. Over time, the melamine-based foam will be worn down due to repeated abrasion with the surface to be cleaned and the unwanted elements present on this surface.

Melamine-based foam may be used to clean a surface when in a wet state. In this regard, the melamine-based foam may be soaked with water to some degree prior to being applied by a user to the surface to be cleaned. A block of melamine-based foam by itself is sometimes used as a cleaning product. In this regard, the user may grasp the block of melamine-based foam, wet the block in water, and then rub the wetted melamine-based foam across a surface to remove dirt and unwanted elements.

Unfortunately, commercially marketed blocks of melamine-based foam suffer from a number of drawbacks. After a few uses, the block tends to become visibly degraded, nonuniform, and soiled, presenting an unsightly appearance even though the product may still have a significant number of additional uses remaining. Given the expense and size of the relatively large foam block, users tend to feel obligated to continue using the soiled foam beyond a point when they may wish to throw the foam away based on its appearance. In some cases, continued use of a soiled foam block can spread particles of grease or grime to previously unsoiled areas.

Another drawback of previous commercial melamine-based foam cleaning products is that the generally thick block of foam does not conform readily to some three-dimensional surfaces, such as interior corners of walls or the inside corners of coffee cups, making it difficult to reach many confined places or depressed regions of some surfaces. Attempts to clean narrow depressed areas, such as grout regions between bathroom tiles, may result in excessive scrubbing pressure applied to the elevated surrounding surfaces and relatively little cleaning of the depressed region, due to the thickness of the foam block and the difficulty of making it conform to small three-dimensional regions.

Further, while melamine-based foam has been recognized as an effective cleaning agent, it does not appear to have been recognized that other relatively brittle foams such as phenolic foams can also perform effective cleaning functions.

The present invention improves upon known cleaning products by providing for an improved cleaning product that includes a thin, flexible layer of an effective cleaning foam such as melamine-based foam or phenolic foam attached to a thin, flexible web to provide a wiping and scrubbing product that can readily conform to complex surfaces and provide good tactile control of applied pressure. Alternatively or in addition, the wiping and scrubbing product can provide for more effective use of the foam, such that after the thin foam layer has been substantially soiled or abraded away by use, the product is ready to be discarded.

In general, it has been discovered that certain relatively brittle foam materials such as microporous melamine foam or phenolic foams can be used as cleaning products in order to remove a wide variety of unwanted elements from surfaces.

SUMMARY

Various features and advantages of the invention will be set forth in part in the following description, or may be obvious from the description.

The present invention provides for a cleaning wipe for use in cleaning a surface through wiping or scrubbing, either in a dry state, in the presence of water, or in the presence of other cleaning agents or other compounds. The wipe includes a thin layer of a brittle foam such as an aminoplast foam (e.g., foams made from urea-formaldehyde resins or melamine-formaldehyde resins) or a phenolic foam such as a foam made from phenol-formaldehyde resins, wherein the foam has mechanical properties suitable for contacting and cleaning the surface. A hydrophilic fibrous web is also included and is attached to the melamine based foam. The web generally comprises cellulosic fibers and can comprise a paper material such as a latex-reinforced creped towel, an uncreped through-air-dried towel reinforced with wet strength resins or other binding agents, other single-ply or multi-ply tissue structures (multi-ply tissues will generally require interply bonding means such as adhesive attachment for good mechanical integrity), a coform layer comprising wood pulp fibers intermingled with thermoplastic material that has been thermally bonded, and airlaid material comprising bicomponent binder fibers, a hydroknit comprising hydraulically entangled paper fibers on a nonwoven substrate, and the like. The web itself may comprise a plurality of layers bonded together. The web can a provide water retention function to help absorb water in use or to provide water for cleaning when compressed. An absorbent web attached to the foam layer can have an Intrinsic Absorbent Capacity of at least any integral value from 1 to 5, with exemplary ranges of from 2 to 10, 2 to 7, and 3 to 7. The Free Swell Capacity can be at least about 3 grams of water per gram of fiber or at least about 6 grams of water per gram of fiber.

A detailed description of foams made of aminoplasts, i.e., for example, formaldehyde condensation products based on urea, melamine, dicyanodiamide and/or derivatives thereof, are found, for example in *Kunststoff-Handbuch*, Vol. X, Vieweg-Becker "Duroplaste", Karl Hanser Verlag, Munich, 1968, pp. 135 et seq., especially 466-475, including the bibliography cited therein. Corresponding information on foams of phenoplasts is found, for example, in Ullmann, *Encyklopadie der technischen Chemie,* 3rd ed., Vol. 15 (1964), pp. 190-1 including the bibliography mentioned therein.

Further, any aminoplast foam or other rigid or brittle foam disclosed in U.S. Pat. No. 4,125,664, "Shaped Articles of Foam Plastics," issued Nov. 14, 1978 to H. Giesemann, herein incorporated by reference, may be used to produce the products of the present invention. Other foams believed to be useful within the scope of the present invention include those disclosed in U.S. Pat. No. 4,666,948, "Preparation of Resilient Melamine Foams," issued May. 19, 1987 to Woerner et al.; U.S. Pat. No. 5,234,969, "Cured Phenolic Foams," issued Aug. 10, 1993 to Clark et al.; U.S. Pat. No. 6,133,332, "Process for Producing Phenolic Resin Foams," issued Oct. 17, 2000 to T. Shibanuma; and WO 91/14731, "Stable Aminoplast Cellular Foams and Process for Manufacturing Them," published Oct. 3, 1991 by Mäder et al., all of which are herein incorporated by reference. The latter, WO 91/14731, discloses cellular foams obtained by using an unsaturated, halogenated polyalcohol in a resin precondensate constituent and a dodecylbenzolsulphonic acid partially esterified preferably with a fatty alcohol and a long-chain polyhydric alcohol such as a polyethylene glycol, in a foaming agent hardener constituent.

In one embodiment, the cleaning foam comprises a thermoset foam, and the thermoset components of the cleaning foam may comprise over 50%, over 60%, over 80%, or over 90% of the mass of the foam. Alternatively, the solid polymeric components of the cleaning foam may consist essentially of one or more thermoset materials. In another embodiment, the cleaning foam is substantially free of thermoplastic materials. In another embodiment, the cleaning foam does not comprise more than 50% of any one of a component selected from polyolefin materials, polyurethanes, silicones, and polyesters.

Attachment of the hydrophilic fibrous web to the cleaning foam material can be done with adhesive means suitable for maintaining good flexibility in the product, and with adhesive means that also provide good strength when wet and when repeatedly subject to the stress cycles typical of scrubbing. In one embodiment, the adhesive means comprises a water-insoluble hot melt adhesive material having a Shore A hardness of about 95 or less, specifically about 75 or less, more specifically about 55 or less, more specifically still about 40 or less, and most specifically about 30 or less, such as from about 10 to about 95, or from about 20 to about 55. Useful adhesives can include those of U.S. Pat. No. 6,541,679, issued Apr. 1, 2003 to Betrabet et al. and U.S. Pat. No. 5,827,393, issued Oct. 27, 1998 to Kinzelmann et al., as well as the commercial HYSOL® hotmelts of Henkel Loctite Corporation (Rocky Hill, Conn.), including polyolefin, urethane, and polyamide hotmelts. The adhesive can have a glass transition temperature is between −10° C. and +30° C. or between 10° C. and 25° C. The tensile strength of the adhesive may be at least 100 psi, at least 300 psi, or at least 500 psi.

In one embodiment, the adhesive means comprises an adhesive with a plurality of hydrophilic groups suitable for maintaining good adhesion with cellulose even when the cellulose is wet. Such adhesives can comprise EVA (ethylene vinyl acetate), and may include, by way of example, the EVA HYSOL® hotmelts of Henkel Loctite Corporation (Rocky Hill, Conn.), including 232 EVA HYSOL®, 236 EVA HYSOL®, 1942 EVA HYSOL®, 0420 EVA HYSOL® SPRAYPAC®, 0437 EVA HYSOL® SPRAYPAC®, CoolMelt EVA HYSOL®, QuikPac EVA HYSOL®, SuperPac EVA HYSOL®, and WaxPac EVA HYSOL®. EVA-based adhesives can be modified through the addition of tackifiers and other conditioners, such as Wingtack 86 tackifying resin manufactured by Goodyear Corporation (Akron, Ohio).

In another embodiment, the adhesive means comprises an elastomeric adhesive such as a rubber-based or silicone-based adhesive, including silicone sealants and latex adhesives such as acrylic latex. In one embodiment, however, the adhesive means is substantially free of natural latex or proteins associated with natural latex. In another embodiment, the adhesive means is substantially free of any kind of latex.

For reactive adhesives and other adhesives, the "open time" of the adhesive (the time in which bonding to a second surface can be carried out after the adhesive has been applied to a first surface) can be about 10 seconds or greater, 30 seconds or greater, or 5 minutes or greater; alternatively, the open time can be less than 30 seconds such as less than 15 seconds.

The adhesive means can also comprise fibers or particulates that are either tacky or can be heated to melt a portion thereof for fusing the fibrous web to the foams. For example, bicomponent binder fibers may be used, in which a sheath has a lower melting point than a core fiber (e.g., a polypropylene or polyethylene sheath around a polyester core). The binder fibers may be applied in a separated loose form, or may be provided as a prebonded fusible web. In one embodiment, the adhesive means comprises a combination of adhesive particles or fibers such as bicomponent fibers and a hotmelt or reactive adhesive. For example, bicomponent fibers may be present in or on a reinforcing layer prior to application of a hotmelt or other flowable or liquid adhesive (e.g., by spray, extrusions, or printing) to either the reinforcing layer or the foam, followed by joining of the tissue to the foam and optional application of heat or other curing means. The particulate adhesive component may already be active (e.g., partially molten) when the foam is joined to the reinforcing layer.

In general, the adhesive means can be applied by spray nozzles, glue guns, bead applicators, extruders, gravure printing, flexographic printing, ink-jet printing, coating, and the like. The adhesive means can be but need not be uniformly applied on either the surface of the foam or the surface of the web or both, and may be applied selectively in regions where high strength is needed such as along the perimeter of the interfacial area between the web and the foam. The adhesive means can also be applied in a pattern or in a substantially random distribution.

The composition of the cleaning product according to the present invention can fall within any of the following exemplary ranges:

TABLE 1

Composition ranges for cleaning products of the present invention.

| Foam | Fibrous Web | Adhesive | Other |
|---|---|---|---|
| 10% to 50% | 30% to 60% | 2% to 25% | |
| 50% to 90% | 8% to 40% | 5% to 30% | |
| 55% to 85% | 15% to 40% | 3% to 30% | |
| 55% to 80% | 15% to 40% | 3% to 25% | Filler: 0 to 8% |
| 55% to 80% | 15% to 40% | 3% to 25% | Filler: 1 to 10% |
| 10% to 50% | 30% to 60% | 2% to 25% | Surfactant: 0.2% to 5% |

TABLE 1-continued

Composition ranges for cleaning products of the present invention.

| Foam | Fibrous Web | Adhesive | Other |
|---|---|---|---|
| 10% to 50% | 30% to 60% | 2% to 25% | Skin care agent: 0.2% to 5% |
| 10% to 30% | 40% to 85% | 2% to 25% | Skin care agent: 0.5% to 10% |

All percentages are weight percentages.

The present invention also provides for a cleaning product that is configured for cleaning dirt from a surface. The cleaning product includes a melamine based foam layer or similar brittle foam that is configured for engaging a surface and cleaning the surface. Without wishing to be bound by theory, it is believed that the minute size of the solid fiber-like struts in the foam that define the cells of the foam (e.g., struts generally having a diameter on the order of 5 microns or less, or on the order of 2 microns or less), coupled with a general degree of deformability of the bulk foam, allows the solid material under mild pressure to readily fit into crevices and recesses on a surface that may be filled with dirt or grime. A relatively non-rounded shape of the struts of solid material that define the sides of the open cell foams may also enhance the cleaning efficacy of the material, providing a somewhat knife-like attack on deposits during scrubbing, as opposed to the more gentle abrasive effect one might expect from filaments having substantially cylindrical cross-sections. Further, the relatively hard nature of the solid material is believed to be effective in scraping out the dirt or grime as the foam is moved over the surface. Alternatively, some have speculated that the brittleness of the foam allows small particles with sharp edges to break off when moving in contact with a surface, and that the small particles so formed contribute to the degree of friction and cleaning provided by the foam. The presence of water is generally helpful in the cleaning process, though other chemicals or cleaning agents need not be present (but can be, if desired).

A reinforcing web layer is included and is attached to the melamine based foam layer. The reinforcing web layer provides at least some degree of structural rigidity to the melamine-based foam layer. The web layer can also be substantially hydrophilic to assist in wiping and removal of excess water in use, or as a moistened source of water to be applied to the surface prior to scrubbing with the foam layer.

According to one aspect of the present invention, the cleaning wipe is intended to permit the foam cleaning layer to wear away during use, recognizing that some loss of the foam due to abrasion and cleaning action is typically involved in the cleaning mechanism and, in some cases, may play an important role in the cleaning function. To allow the foam layer to be worn away without necessitating premature discarding of the wipe or to prevent failure of the foam layer, it has been found that excellent results are obtained when the reinforcing web provides a majority of the tensile strength of product. Thus, in one embodiment, the foam layer contributes less than half of the total tensile strength of the cleaning wipe, such as less than about any of the following: 40%, 30%, 20%, 15%, and 10% of the total tensile strength of the cleaning wipe.

In some embodiments, the foam can comprise two or more discrete segments that are mounted to a reinforcing layer. The foam layer itself may then have essentially zero tensile strength per se due to the segmentation of the foam (e.g., when tested such that the boundary between the two segments spans the width of the test zone between the jaws in a test device), but the presence of the reinforcing web provides sufficient tensile strength to maintain integrity of the product in use. Segmented sections of foam may be desirable for improving the flexibility of the overall product and allowing the wipe to reach narrow corners or crevices more easily without excessive bending of the foam.

Tensile strength is measured in the direction yielding the greatest tensile strength values (e.g., for wipes joined to a machine-made tissue layer, tensile strength can be measured in the machine direction). For cleaning wipes so configured, the wipe can be used efficiently even after a major portion of the foam has abraded away, allowing for more efficient use of the foam and more effective cleaning. Nevertheless, the reinforcing layer can, if desired, still have such thinness and flexibility that it can permit the user readily discern the texture of a surface being cleaned (e.g., permitting tactile perception of the grooves between tiles when cleaning grout, or tactile perception of elevated spots comprising dried organic matter to be removed from kitchen surfaces, and the like) in order to allow the user to effectively apply finger pressure to spots and regions most in need of cleaning underneath the cleaning wipe.

Likewise, the reinforcing layer can have a wear resistance substantially greater than that of the foam layer, such that a cycle of scrubbing with the foam layer that results in loss of about 10% of the mass of the foam layer would, if the same cycle of scrubbing were applied but with the reinforcing layer in contact with the opposing surface rather than the foam layer, result in a mass loss of less than half of the mass loss encountered in the foam.

The reinforcing layer can also provide cleaning functions in addition to reinforcing the foam. The reinforcing layer may be used to moisten and clean deposits on a surface that do not require the higher frictional power of the cleaning foam, and may also assist in the cleaning process by being able to wipe up any debris from the cleaning foam. For example, when a green phenolic resin (or resins of any color) is used, an absorbent tissue layer joined to the foam can be used to wipe away any debris from abrasion of the foam. This can be particularly helpful with foams capable of crumbling under mechanical force, such as some phenolic foams.

The reinforcing web layer may be provided in premoistened form, in dry form, or dry in combination with an aqueous source such as lipid shells containing water that can be readily released during use. Lipid shells containing aqueous solutions are described in WO 96/34035, WO 96/14835, U.S. Pat. Nos. 5,952,043; 5,863,663; 5,863,663; 5,952,043 and WO97/40814, all of which are herein incorporated by reference to the extent they are non-contradictory herewith. Alternatively, the laminated cleaning product of the present invention may be provided in a kit comprising a source of water such as a spray bottle.

The present invention also provides for a cleaning wipe or product as set forth above where the web is a nonwoven web.

Also, the present invention includes a cleaning wipe or product as set forth above where the foam layer is laminated to the web.

The present invention further provides for a cleaning wipe or product as set forth above where the web is an absorbent material that may be either an absorbent tissue, an absorbent through-dried tissue, an absorbent tissue-polymer composite web, an absorbent coform web, an absorbent reinforced airlaid web, an absorbent molded airlaid web, a hydroknit web, a woven web such as cotton cloth, or a hyrdoentangled web.

The present invention provides for a cleaning wipe or product as described above where the foam and the fibrous web are configured in multiple layers. The layers of foam are alternately positioned with the layers of the web in a stacked configuration. Alternatively, multiple layers of foam may be laminated together to allow an outer layer of foam to be removed to expose a fresh layer. Successive layers of foam may be separated by a film or other barrier, including a fibrous web, to prevent dirt encountered by an outer layer during scrubbing from being transferred to the next interior layer of foam. In several such embodiments, when a foam layer has become soiled or damaged during use, it is simply peeled off or otherwise removed, exposing a fresh layer beneath.

Also provided for in accordance with the present invention is a cleaning wipe or product as set forth above where the cleaning foam is from about 1 millimeters to about 10 millimeters, or from about 2 millimeters to about 8 millimeters in thickness. Alternatively, the thickness may be from about 1 mm to about 6 mm, or from about 4 mm to about 12 mm. The ratio of the thickness of the fibrous web to the thickness of the foam layer may be any of the following: from about 1 to about 20, from about 1 to about 15, from about 1 to about 10, from about 2 to about 10, from about 3 to about 10, from about 4 to about 10, from about 0.2 to about 2, from about 0.3 to about 2, from about 0.3 to about 1, less than 1, greater than 1, and from about 0.5 to about 1.5.

Also provided for in accordance with the present invention is a cleaning wipe or product as set forth above where the web is integrally formed with the melamine based foam layer. The integrally formed web may comprise a plurality of fibers that are embedded into the foam resin that is subsequently formed into the cleaning wipe.

Also provided for in accordance with the present invention is a cleaning wipe or product as discussed above where the web has a functional member incorporated therewith. The functional member may be a cleaning enzyme, a bleaching agent, an abrasive compound, a detergent, an odor releasing agent, an odor control agent, a wax, a polish, a biosensing agent, a heat generating agent, or a foam generating agent.

Also, provided for in accordance with the present invention is a cleaning product as set forth above where the reinforcing web layer has an outer surface. The melamine based foam or other suitable foam can substantially cover the entire outer surface of the reinforcing web layer.

The present invention further includes a cleaning product as previously discussed where the reinforcing fibrous web layer comprises an abrasive material which may be either a coarse meltblown shot or a meltblown multifilament aggregate.

Also provided for in accordance with the present invention is a cleaning wipe or product as previously discussed where the cleaning foam has a visual indicating portion. The visual indicating portion is of a different color than the outer surface of the melamine based foam, and indicates to a user that the melamine based foam has experienced some degree of wear.

Also provided for in accordance with the present invention is a cleaning wipe that includes a cleaning foam that is configured for cleaning a surface. The foam can be free from plastic deformation, and can be from about 1 millimeters to about 8 millimeters in thickness, or less than 5 millimeters. A fibrous web is included and is attached to the melamine based foam. The fibrous web and the foam are attached to one another through lamination.

Also provided for in accordance with the present invention is a cleaning wipe as discussed above, wherein the cleaning wipe is provided in roll form, either as a continuous length of the cleaning wipe optionally provided with perforations for easy removal of sheets of the cleaning wipe, or as multiple discrete sections of cleaning wipes rolled together in overlapping form. Rolls may be provided on a core such as a paper core or plastic core, or may be coreless. Cleaning wipes provided as rolls can provide for the convenience of paper towels in cleaning applications, but with the enhanced performance provided by the cleaning foam joined to a reinforcing web, which can be a paper towel or other hydrophilic fibrous material.

Also provided for in accordance with the present invention is a cleaning wipe as discussed above, wherein the cleaning wipe has sufficient thinness and flexibility that the human hand can readily perceive small indentation or asperities on an otherwise smooth surface by feeling the surface through the wipe under light pressure (about 0.3-0.5 psi) as the wipe is rubbed back and forth over the surface. For example, a groove about 0.3 mm deep and 5 mm wide may be readily felt by the fingers through a wipe of some embodiments of the present invention; alternatively, the depth of the groove may be about 0.2 mm deep. Likewise, a copper wire having a diameter of 0.2 mm on a smooth surface may be felt by the fingers through some wipes of the present invention.

Also provided for in accordance with the present invention is a cleaning wipe as discussed above, wherein a plurality of cleaning wipes are provided in a box for easy removal. The wipes may be interfolded or stacked in any known configuration (e.g., C-fold, W-fold, Z-fold, etc.) for ease of dispensing, or may be provided as flat unfolded sheets stacked in superposed relationship. The wipes may be dry or premoistened, or may receive moisture or cleaning agents (e.g., a foam from a detergent) as the wipes are removed from the container.

Also provided for in accordance with the present invention is a cleaning product comprising a cleaning foam layer, optionally laminated to a reinforcing web such as a cellulosic web or polymeric nonwoven web, and gripping means adapted to hold the foam layer and optional reinforcing web to provide a handle-like structure to assist in holding the cleaning foam during scrubbing or wiping. In one embodiment, the gripping means comprises a handle or block adapted to be held by the hand in wiping, the gripping means further comprising attachment means such as mechanical hooks (such as is found in hook and loop fasteners) suited for penetrating into the foam or the reinforcing layer attached to the foam to hold the foam in place even when shear forces typical of scrubbing are applied. Alternatively, adhesive means, such as a pressure sensitive adhesive, may be used, A cleaning product comprising a thin layer of a cleaning foam held in place by gripping means can be used for cleaning of walls, floors, or other surfaces such as dry erase boards. Because of the excellent cleaning properties of melamine-based foams and other cleaning foams, traditional dry erase boards can be replaced with lower cost surfaces such as conventional high pressure laminates, wherein not only dry erase markers but also more conventional markers such as permanent markers, grease pencils, and crayons can be used. Writing with crayons and other writing means can be readily removed with the cleaning products of the present invention, allowing entirely new dry erase systems to be offered in which low-cost writing surfaces can be used with low-cost writing means such as crayons. Conventional dry-erase systems typically have specialized coatings that resist marking by crayons but permit marking with special dry-erase markers. Low-cost marking surfaces can be used such as white laminated wood-based products having sufficient surface roughness to readily receive crayon markings. Thus, also provided for in accordance with the present invention is a dry-erase marking system comprising a writing board suitable for marking with crayons, a selection of crayons or other marking products, optionally excluding conventional dry-erase markers and optionally including conventional ink-based markers, optionally including permanent markers, and further comprising cleaning means for removing markings from the writing board, the cleaning means comprising cleaning foam such as a melamine-based foam or phenolic foam. In one embodiment, the cleaning means comprises a thin layer of a cleaning foam (e.g., less than 10 mm thick, optionally less than about 6 mm thick) and may further comprise at least one of a fibrous web as a reinforcing layer and a gripping means comprising a handle and attachment means for holding the foam in place relative to the handle during scrubbing.

Principles for manufacturing melamine-based foam are well known. Melamine-based foams are currently manufactured by BASF (Ludwigshafen, Germany) under the BASOTECT® brand name. For example, BASOTECT® 2011, with a density of about 0.01 g/cm$^3$, may be used. Blocks of melamine-based foam for cleaning are marketed by Procter & Gamble (Cincinnati, Ohio) under the MR. CLEAN® brand name, and under the CLEENPRO™ name by LEC, Inc. of Tokyo, Japan (several product executions are shown at http://www.users.bigpond.com/jmc.au/CLEENPRO/CLEEN-PRO-E.htm and http://www.users.bigpond.com/jmc.au/CLEENPRO/CLEENPRO%20Family-E.htm, both printed on Nov. 13, 2003). Melamine-based foam is also marketed for acoustic and thermal insulation by many companies such as American Micro Industries (Chambersburg, Pa.).

Principles for production of melamine-based foam are disclosed by H. Mahnke et al. in EP-B 071 671, published Dec. 17, 1979. According to EP-B 017 671, they are produced by foaming an aqueous solution or dispersion of a melamine-formaldehyde condensation product which comprises an emulsifier (e.g., metal alkyl sulfonates and metal alkylaryl sulfonates such as sodium dodecylbenzene sulfonate), an acidic curing agent, and a blowing agent, such as a C5-C7 hydrocarbon, and curing the melamine-formaldehyde condensate at an elevated temperature. The foams are reported to have the following range of properties:

- a density according to DIN 53 420 between 4 and 80 grams per liter (g/l), corresponding to a range of 0.004 g/cc to 0.08 g/cc (though for purposes of the present invention the density can also range from about 0.006 g/cc to about 0.1 g/cc, or other useful ranges);
- a thermal conductivity according to DIN 52 612 smaller than 0.06 W/m ° K;
- a compression hardness according to DIN 53 577 under 60% penetration, divided by the density, yielding a quotient less than 0.3 (N/cm$^2$)/(g/l), and preferably less than 0.2 (N/cm$^2$)/(g/l), whereby after measurement of compression hardness the thickness of the foam recovers to at least 70% and preferably at least 90% of its original thickness;
- an elasticity modulus according to DIN 53 423, divided by the density of the foam, under 0.25 (N/mm$^2$)/(g/l) and preferably under 0.15 (N/mm$^2$)/(g/l);
- a bending path at rupture according to DIN 53 423 greater than 6 mm and preferably greater than 12 mm;
- a tensile strength according to DIN 53 571 of at least 0.07 N/mm$^2$ or preferably at least 0.1 N/mm$^2$; and
- by German Standard Specification DIN 4102 they show at least standard flammability resistance and preferably show low flammability.

U.S. Pat. No. 6,503,615, issued Jan. 7, 2003 to Horii et al., discloses a wiping cleaner made from an open-celled foam such as a melamine-based foam, the wiping cleaner having a density of 5 to 50 kg/m3 in accordance with JIS K 6401, a tensile strength of 0.6 to 1.6 kg/cm2 in accordance with JIS K 6301, an elongation at break of 8 to 20% in accordance with JIS K 6301 and a cell number of 80 to 300 cells/25 mm as measured in accordance with JIS K 6402. Melamine-based foams having such mechanical properties can be used within the scope of the present invention.

Related foams are disclosed in U.S. Pat. No. 3,093,600 with agents present to improve the elasticity and tear strength of the foam.

Brittle foams can be made, as described in German publication DE-AS 12 97 331, from phenolic components, urea-based components, or melamine-based components, in aqueous solution with a blowing agent and a hardening catalyst.

The entire disclosure of U.S. Pat. No. 6,608,118 is incorporated by reference herein in its entirety.

Melamine-based foams are also disclosed in British patent GB 1443024, issued Jul. 21, 1976.

The brittle foam may comprise organic or inorganic filler particles, such as from 5% to 30% by weight of a particulate material. Exemplary particulate materials include clays such as kaolin, talc, calcium oxide, calcium carbonate, silica, alumina, zeolites, carbides, quartz, and the like. The fillers can also be fibrous materials, such as wood fibers, papermaking fibers, coconut fibers, milkweed fibers, flax, kenaf, sisal, bagasse, and the like. The particles of fibers added to the foam may be heterogeneously distributed or may be distributed homogeneously.

The foam or a portion thereof may also be impregnated with a material to reinforce or harden the foam, if desired, such as impregnation with water glass or other silicate compounds, as disclosed in U.S. Pat. No. 4,125,664, "Shaped Articles of Foam Plastics," issued Nov. 14, 1978 to H. Giesemann, herein incorporated by reference. Adhesives, hot melts, cleaning agents, bleaching agents (e.g., peroxides), antimicrobials, and other additives may be impregnated in the foam.

The foam may be molded or shaped into three-dimensional shapes for aesthetic or functional purposes. For example, melamine-based foam may be thermally molded according to the process disclosed in U.S. Pat. No. 6,608,118, "Melamine Molded Foam, Process for Producing the Same, and Wiper," issued Aug. 19, 2003 to Y. Kosaka et al., herein incorporated by reference, which discloses molding the foam at 210 to 350 C (or, more particularly, from 230° C. to 280° C. or from 240° C. to 270° C.) for 3 minutes or longer to cause plastic deformation under load, wherein the foam is compressed to a thickness of about 1/1.2 to about 1/12 the original thickness, or from about 1/1.5 to about 1/7 of the original thickness. The molded melamine foams can be joined to a urethane sponge layer to form a wipe, according to of Kosaka et al.

As described by Kosaka et al., the melamine-based foam can be produced by blending major starting materials of melamine and formaldehyde, or a precursor thereof, with a blowing agent, a catalyst and an emulsifier, injecting the resultant mixture into a mold, and applying or generating heat (e.g., by irradiation or electromagnetic energy) to cause foaming and curing. The molar ratio of melamine to formaldehyde (i.e., melamine:formaldehyde) for producing the precursor is said to be preferably 1:1.5 to 1:4, or more particularly 1:2 to 1:3. 5. The number average molecular weight of the precursor can be from about 200 to about 1,000, or from about 200 to about 400. Formalin, an aqueous solution of formaldehyde, is can be used as a formaldehyde source.

As monomers for producing the precursor, according to Kosaka et al., the following monomers may be used in an amount of 50 parts by weight (hereinafter abbreviated as "parts") or less, particularly 20 parts by weight or less, per 100 parts by weight of the sum of melamine and formaldehyde. Melamine is also known by the chemical name 2,4,6- triamino-1,3,5-triazine. As other monomers corresponding to melamine, there may be used C1-5 alkyl-substituted melamines such as methylolmelamine, methylmethylolmelamine and methylbutylolmelamine, urea, urethane, carbonic acid amides, dicyandiamide, guanidine, sulfurylamides, sulfonic acid amides, aliphatic amines, phenols and the derivatives thereof. As aldehydes, there may be used acetaldehyde, trimethylol acetaldehyde, acrolein, benzaldehyde, furfurol, glyoxal, phthalaldehyde, terephthalaldehyde, and the like.

As the blowing agent, there may be used pentane, trichlorofluoromethane, trichlorotrifluoroethane, etc. As the catalyst, by way of example, formic acid may be used and, as the emulsifier, anionic surfactants such as sodium sulfonate may be used.

The amount of the electromagnetic energy to be irradiated for accelerating the curing reaction of the reaction mixtures can be adjusted to be from about 500 to about 1,000 kW, or from about 600 to 800 kW, in electric power consumption based on 1 kg of an aqueous formaldehyde solution charged in the mold. If the electric power applied is insufficient, there may be insufficient foaming, leading to production of a cured product with a high density. On the other hand, in case when the electric power consumption is excessive, the pressure upon foaming becomes high, leading to significant exhaust flows from the mold and even the possibility of explosion.

Other useful methods for producing melamine-based foam are disclosed in U.S. Pat. No. 5,413,853, "Melamine Resin Foam," issued May 9, 1995 to Y. Imashiro et al., herein incorporated by reference. According to Imashiro et al., a melamine resin foam can be obtained by coating a hydrophobic component on a known melamine-formaldehyde resin foam body obtained by foaming a resin composition composed mainly of a melamine-formaldehyde condensate and a blowing agent. The components used in the present melamine resin foam can therefore be the same as those conventionally used in production of melamine-formaldehyde resins or their foams, except for the hydrophobic component.

As an example, Imashiro et al. disclose a melamine-formaldehyde condensate obtained by mixing melamine, formalin and paraformaldehyde and reacting them in the presence of an alkali catalyst with heating. The mixing ratio of melamine and formaldehyde can be, for example, 1:3 in terms of molar ratio.

The melamine-formaldehyde condensate can have a viscosity of about 1,000-100,000 cP, more specifically 5,000-15,000 cP and can have a pH of 8-9.

As the blowing agent, a straight-chain alkyl hydrocarbon such as pentane or hexane is disclosed.

In order to obtain a homogeneous foam, the resin composition composed mainly of a melamine-formaldehyde condensate and a blowing agent may contain an emulsifier. Such an emulsifier includes, for example, metal alkylsulfonates and metal alkylarylsulfonates.

The resin composition may further contain a curing agent in order to cure the foamed resin composition. Such a curing agent includes, for example, acidic curing agents such as formic acid, hydrochloric acid, sulfuric acid and oxalic acid.

The foam disclosed by Imashiro et al. can be obtained by adding as necessary an emulsifier, a curing agent and further a filler, etc. to the resin composition composed mainly of a melamine-formaldehyde condensate and a blowing agent, heat-treating the resulting mixture at a temperature equal to or higher than the boiling point of the blowing agent to give rise to foaming, and curing the resulting foam.

In another embodiment, the foam material may comprise a melamine-based foam having an isocyanate component (isocyanate-based polymers are generally understood to include polyurethanes, polyureas, polyisocyanurates and mixtures thereof). Such foams can be made according to U.S. Pat. No. 5,436,278, "Melamine Resin Foam, Process for Production Thereof and Melamine/Formaldehyde Condensate," issued Jul. 25, 1995 to Imashiro et al., herein incorporated by reference, which discloses a process for producing a melamine resin foam comprising a melamine/formaldehyde condensate, a blowing agent and an isocyanate. One embodiment includes the production of a melamine resin foam obtained by reacting melamine and formaldehyde in the presence of a silane coupling agent. The isocyanate used in U.S. Pat. No. 5,436,278 can be exemplified by CR 200 (a trademark of polymeric-4,4'-diphenylmethanediisocyanate, produced by Mitsui Toatsu Chemicals, Inc.) and Sumidur E211, E212 and L (trademarks of MDI type prepolymers, produced by Sumitomo Bayer Urethane Co., Ltd). One example therein comprises 100 parts by weight of melamine/formaldehyde condensate (76% concentration), 6.3 parts sodium dodecylbenzenesulfonate (30% concentration), 7.6 parts pentane, 9.5 parts ammonium chloride, 2.7 parts formic acid, and 7.6 parts CR 200. A mixture of these components was placed in a mold and foamed at 100° C., yielding a material with a density of 26.8 kg/m$^3$ (0.0268 g/cm$^3$), a compression stress of 0.23 kgf/cm$^2$, and a compression strain of 2.7%. In general, the melamine-based foams of U.S. Pat. No. 5,436,278 typically had a density of 25-100 kg/m$^3$, a compression strain by JIS K 7220 of 2.7%-4.2% (this is said to be improved by about 40%-130% over the 1.9% value of conventional fragile melamine foams), and a thermal conductivity measured between 10° C. to 55° C. of 0.005 kcal/m-h-° C. or less (this is far smaller than 0.01 kcal/m-h-° C. which is said to be the value of conventional fragile foam). Other foams comprising melamine and isocyanates are disclosed in WO 99/23160, "Composition and Method for Insulating Foam," published May 14, 1999 by Sufi, the US equivalent of which (U.S. Pat. No. 9,823,864) is herein incorporated by reference.

In another embodiment, a melamine-based foam may be used that is produced according to WO 0/226872, "Hydrophilic, Open-Cell, Elastic Foams with a Melamine/Formaldehyde Resin Base, Production Thereof and Use thereof in Hygiene Products," published Apr. 4, 2002 by Baumgartl and Herfert. Such foams have been tempered at elevated temperature to improve their suitability for use as absorbent articles in proximity to the human body. During or after the tempering process, further treatment with at least one polymer is disclosed, the polymer containing primary and/or secondary amino groups and having a molar mass of at least 300, although this polymer treatment may be skipped, if desired, when the foams of WO 0/226872 are applied to the present invention. Such foams are said to have a specific surface area determined by BET of at least 0.5 m$^2$/g. Exemplary phenolic foams include the dry floral foams made by Oasis Floral Products (Kent, Ohio) and also the water-absorbent open-celled brittle phenolic foams manufactured by Aspac Floral Foam Company Ltd. (Kowloon, HongKong), partially described at http://www.aspachk.com/v9/aspac/why aspac.html. Open-cell phenolic foams can be made from the phenolic resins of PA Resins (Malmö, Sweden) combined with suitable hardeners (e.g., an organic sulfonic acid) and emulsifiers with a blowing agent such as pentane. Phenolic resins may include resole resins or novolac resins, for example, such as the Bakelite® Resin 1743 PS (Bakelite AG, Iserlohn-Letmathe, Germany) which is used for floral foams.

BRIEF DESCRIPTION OF THE DRAWINGS

FIG. 21 depicts a web joined to a three-dimensional cleaning foam layer.

FIG. 22 depicts a three-dimensional web joined to a three-dimensional cleaning foam layer.

DEIFNITIONS AND TEST METHODS

Figure 1:
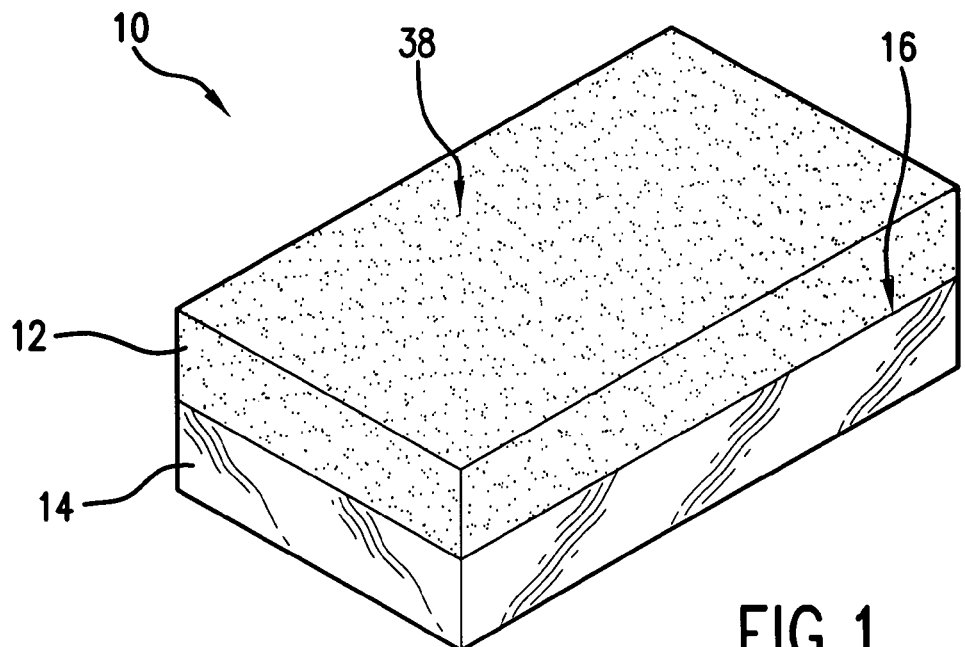
FIG. 1 is a perspective view of a cleaning wipe used in accordance with one exemplary embodiment of the present invention.

As used herein, "Intrinsic Absorbent Capacity" refers to the amount of water that a saturated sample can hold relative to the dry weight of the sample and is reported as a dimensionless number (mass divided by mass). The test is performed according to Federal Government Specification UU-T-595b. It is made by cutting a 10.16 cm long by 10.16 cm wide (4 inch long by 4 inch wide) test sample, weighing it, and then saturating it with water for three minutes by soaking. The sample is then removed from the water and hung by one corner for 30 seconds to allow excess water to be drained off. The sample is then re-weighed, and the difference between the wet and dry weights is the water pickup of the sample expressed in grams per 10.16 cm long by 10.16 cm wide sample. The Intrinsic Absorbent Capacity value is obtained by dividing the total water pick-up by the dry weight of the sample. If the material lacks adequate integrity when wet to perform the test without sample disintegration, the test method may be modified to provide improved integrity to the sample without substantially modifying its absorbent properties. Specifically, the material may be reinforced with up to 6 lines of hot melt adhesive having a diameter of about 1 mm applied to the outer surface of the article to encircle the material with a water-resistant band. The hot melt should be applied to avoid penetration of the adhesive into the body of the material being tested. The corner on which the sample is hung in particular should be reinforced with external hot melt adhesive to increase integrity if the untreated sample cannot be hung for 30 seconds when wet.

As used herein, "absorbent capacity" refers to the total mass of water that a specified quantity of absorbent material can hold, and is simply the Intrinsic Absorbent Capacity multiplied by the dry mass of the absorbent material. Thus 10 g of material having an Intrinsic Absorbent Capacity of 5 has an absorbent capacity of 50 g (or about 50 ml of fluid).

As used herein, a material is said to be "deformable" if the thickness of the material between parallel platens at a compressive load of 100 kPa is at least 5% greater than the thickness of the material between parallel platens at a compressive load of 1000 kPa.

"Water retention value" (WRV) is a measure that can be used to characterize some fibers useful for purposes of this invention. WRV is measured by dispersing 0.5 gram of fibers in deionized water, soaking overnight, then centrifuging the fibers in a 4.83 cm (1.9 inch) diameter tube with an 0.15 mm (100 mesh) screen at the bottom at 1000 gravities for 20 minutes. The samples are weighed, then dried at 105°C. for two hours and then weighed again. WRV is (wet weight–dry weight)/dry weight. Fibers useful for purposes of this invention can have a WRV of about 0.7 or greater, more specifically from about 1 to about 2. High yield pulp fibers typically have a WRV of about 1 or greater.

As used herein, "biodegradable" refers to the ability of a compound to ultimately be degraded completely into carbon dioxide and water or biomass by microorganisms and/or natural environmental factors.

As used herein, the term "hydrophobic" refers to a material having a contact angle of water in air of at least 90 degrees. In contrast, as used herein, the term "hydrophilic" refers to a material having a contact angle of water in air of less than 90 degrees. For the purposes of this application, contact angle measurements are determined as set forth in Robert J. Good and Robert J. Stromberg, Ed., in "Surface and Colloid Science—Experimental Methods," Vol. II, (Plenum Press, 1979), herein incorporated by reference.

As used herein, the term "surfactant" includes a single surfactant or a mixture of two or more surfactants. If a mixture of two or more surfactants is employed, the surfactants may be selected from the same or different classes, provided only that the surfactants present in the mixture are compatible with each other. In general, the surfactant can be any surfactant known to those having ordinary skill in the art, including anionic, cationic, and nonionic surfactants. Examples of anionic surfactants include, among others, linear and branched-chain sodium alkylbenzenesulfonates, linear and branched-chain alkyl sulfates, and linear and branched-chain alkyl ethoxy sulfates. Cationic surfactants include, by way of illustration, tallow trimethylammonium chloride. Examples of nonionic surfactants, include, again by way of illustration only, alkyl polyethoxylates; polyethoxylated alkylphenols; fatty acid ethanol amides; and complex polymers of ethylene oxide, propylene oxide, and alcohols.

"Absorbency Under Load" (AUL) is a measure of the liquid retention capacity of a material under a mechanical load. It is determined by a test which measures the amount in grams of an aqueous solution, containing 0.9 weight percent sodium chloride, a gram of a material can absorb in 1 hour under an applied load or restraining force of about 0.3 pound per square inch.

The AUL apparatus comprises a Demand Absorbency Tester (DAT) as described in U.S. Pat. No. 5,147,343, issued Sep. 15, 1992 to Kellenberger, herein incorporated by reference, which is similar to a GATS (Gravimetric Absorbency Test System), available from M/K Systems, Danners, Mass. A level porous plate is used having ports confined within a 2.5 cm. diameter area to provide liquid saline solution, 0.9 (w/w)% NaCl, delivered from a reservoir to the porous plate such that there is no hydraulic head (neither positive pressure nor suction) at the top of the porous plate. Thus, fluid can be absorbed into the absorbent without overcoming a significant capillary pressure barrier to move liquid out of the porous plate. Fluid absorbed from the plate is replaced with liquid from the reservoir, which resides on an electronic balance that measures the amount of liquid removed from the reservoir and absorbed into the absorbent. The sample on the porous plate resides within a section of one-inch (2.54 cm) inside diameter thermoplastic tubing machined-out slightly to be sure of concentricity. 100 mesh stainless steel wire cloth is fused on the bottom of the cylinder to restrain the sample and any particulates therein. Care must be taken to maintain a flat smooth bottom and not distort the inside of the cylinder. A 4.4 g piston is made from one inch diameter solid material (e.g., Plexiglas) and is machined to closely fit without binding in the cylinder. A standard 100 gm weight placed on the piston is used to provide a 21,000 dyne/sq. cm. (about 0.3 psi) restraining load which is commonly experienced in infant diapers. To carry out the test with a foam-like fibrous material or a foam, a material sample is cut into circular discs with a diameter slightly smaller than one inch to freely fit within the sample tube. The sample mass should be from about 0.05 g to about 0.16 g.

This test is initiated by placing a 3 cm diameter GF/A glass filter paper onto the porous plate (the paper is sized to be larger than the inner diameter and smaller than the outer diameter of the cylinder), to insure good contact while eliminating evaporation over the ports of the DAT and then allowing saturation to occur. The material to be tested is placed on the wire cloth at the bottom of the AUL apparatus. The sample is then covered with a plastic spacer disc, weighing 4.4 grams and having a diameter of about 0.995 inch, which serves to protect the sample from being disturbed during the test and also to uniformly apply a load on the entire sample. After carefully placing the piston and weight on the sample in the cylinder, the AUL apparatus is placed on the glass filter paper. The amount of fluid pick-up is monitored as a function of time either directly by hand, with a strip chart recorder or directly into a data acquisition system.

The amount of fluid pickup measured after one hour is the AUL value, expressed as grams of liquid per dry gram of the tested material.

The AUL of fibrous webs of the present invention can be above 2 grams/gram, more specifically about 4 grams/gram or greater, still more specifically about 6 grams/gram or greater, and most specifically about 8 grams/gram or greater, with an exemplary range of from about 3 to about 12 grams/gram.

As used herein, "Free Swell Capacity" (FS) is the result of a test which measures the amount in grams of an aqueous solution, containing 0.9 weight percent sodium chloride, that a gram of a material can absorb in 1 hour under negligible applied load. The test is done as described above for the AUL test, except that the 100 gm weight is not placed on the sample.

The Free Swell Capacity of the fibrous webs of the present invention can be above 3, more specifically above 5 more specifically above 8, and most specifically above 10 grams/gram.

As used herein, the "Zwick Flexibility" test is a measure of stiffness of a flat foam sample as it is deformed downward into a hole beneath the sample. For the test, the foam sample is modeled as an infinite plate with thickness t that resides on a flat surface where it is centered over a hole with radius R. A central force applied to the foam directly over the center of the hole deflects the foam down into the hole by a distance w when loaded in the center by a Force F. For a linear elastic material the deflection can be predicted by:

$$w = \frac{3F}{4\pi E t^3}(1-v)(3+v)R^2$$

where E is the effective linear elastic modulus, v is the Poisson's ratio, R is the radius of the hole, and t is the thickness of the foam, taken as the caliper in millimeters measured under a load of about 0.05 psi, applied by a 3-inch diameter Plexiglass platen, with the thickness measured with a Sony U60A Digital Indicator. Taking Poisson's ratio as 0.1 (the solution is not highly sensitive to this parameter, so the inaccuracy due to the assumed value is likely to be minor), we can rewrite the previous equation for w to estimate the effective modulus as a function of the flexibility test results:

$$E \approx \frac{2R^2}{3t^3} \frac{F}{w}$$

The test results are carried out using an MTS Alliance RT/1 testing machine (MTS Systems Corp., Eden Prairie, Minn.) with a 100 N load cell. As a foam sample at least 2.5-inches square sits centered over a hole of radius 17 mm on a support plate, a blunt probe of 3.15 mm radius descends at a speed of 2.54 mm/min. When the probe tip descends to 1 mm below the plane of the support plate, the test is terminated. The maximum slope in grams of force/mm over any 0.5 mm span during the test is recorded (this maximum slope generally occurs at the end of the stroke). The load cell monitors the applied force and the position of the probe tip relative to the plane of the support plate is also monitored. When the probe tip descends to 1 mm below the plane of the support plate, the test is terminated. The peak load is recorded, and E is estimated using the above equation.

The bending stiffness per unit width can then be calculated as:

$$S = \frac{Et^3}{12}$$

The stiffness and modulus measured with the Zwick Flexibility Test are believed to provide useful information about the ability of a wipe to reach depressed areas or corners during cleaning, somewhat simulating the ability of a finger to push a wipe into a recessed area.

The cleaning wipes of the present invention can have relatively low bending stiffness (S) values according to the Zwick Flexibility test. For example, the bending stiffness may be about 0.4 Newton-meter (Nm) or less, specifically about 0.1 Nm or less, more specifically about 0.05 Nm or less, more specifically still about 0.02 Nm or less, and most specifically about 0.01 Nm or less, such as from about 0.001 Nm to about 0.1 Nm, or from about 0.002 Nm to about 0.07 Nm. The modulus (E) for the cleaning wipe can be about 60,000 kPa or less, such as about 30,000 kPa or less, more specifically about 20,000 kPa or less, and most specifically about 7,000 kPa or less.

The "Wire Mesh Tactile Sensitivity" value is a measure of the load that must be applied by a human finger to feel the texture of a 30-mesh screen through a cleaning wipe. To conduct the test, a human subject is first tested for sensitivity to wire mesh materials. McMaster-Carr Stainless Steel 304 wire cloths and screens (McMaster Carr Supply Company, Elmhurst, Ill.) are used. A kit with mesh sizes of 200, 150, 100, 80, and 70 mesh wires cloths are used for the initial sensitivity tests. Beginning with the 200 mesh cloth, which is described to human subject as "smooth," the subject is asked to move his or her index finger tip in a linear motion over the wire cloth in a direction aligned with whichever of the two orthogonal axes seems to provide the most texture. After feeling the 200 mesh cloth, the subject is asked to feel the other cloths, beginning with the 150 mesh followed in order by the 100, 80, and 70 mesh cloths, until a cloth is encountered that no longer feels smooth but clearly feels like a textured wire mesh. The mesh size is recorded as the "mesh discrimination" value. Then a 6-inch square 30-mesh wire (with 30×30 wires having a wire diameter of 0.012 inches) is placed on an electronic Sartorius (Goettingen, Germany) LC220S and the balance is tared. The corners of the 30-mesh wire project beyond the 7-inch diameter weighing platen of the balance, where they can be restrained by hand by an observer to prevent in-plane motion without substantially applying downward force to the measuring platen of the balance. The subject is then given a wipe to be tested and is asked to apply mild pressure by the fingertip of an index finger (the right finger for the right-handed and the left finger for the left-handed) resting on the wipe as the wipe is pulled toward the body with the index finger exerting steady downward force on the wipe during the stroke, gradually increasing the applied load until the finger can discern a wire-like texture of the 30-mesh wire through the wipe. The finger is at the far end of the wire mesh at the beginning of the stroke and moves steadily toward the body during the stroke, along one of the principal axes of the mesh (if a difference in texture can be discerned between the two major axes of the mesh, the axis with the greatest texture is used for the test). The foam side of the wipe contacts the wire mesh. Care is taken to ensure that the testing is not done on a spot that has been previously abraded away. Two or more strokes of the wire may be needed to find the force that permits perception of the texture of the underlying wire. The mass reading of the balance at this point is recorded. This process is repeated for seven human subjects, all of whom are in good health and between 25 and 60 years of age, and the mean and standard deviation of the recorded loads are computed. All subjects should have a mesh sensitivity value of at least 80 mesh (i.e., 80 mesh, 100 mesh, or 150 mesh). Wire Mesh Tactile Sensitivity is taken as the mean of the 7 recorded loads. A normalized tactile sensitivity value is computed by multiplying each subject's recorded load by the square root of their respective mesh discrimination value, and dividing by 10. The mean of these normalized values is reported as the "Normalized Wire Mesh Tactile Sensitivity" value. The normalization procedure adjusts the scores to compensate for differences in human tactile sensitivity. (The scores for those with a mesh discernment value of 100 are unchanged by this procedure.) Those with highly sensitive fingers may perceive wire cloth texture at a higher mesh value (e.g., 150), possibly resulting in perceived texture of the 30-mesh wire at a lower load than would be recorded for a less sensitive person, while those with less sensitivity might require a higher load to detect the texture of the mesh through the wipe. Though the normalization process is relatively crude, it may reduce some variability in the results.

Corrugated Tactile Sensitivity is a related measure, based on the ability of human subjects to feel the texture of a metal plate having a sinusoidal surface topography. The plate is stainless steel, 1.5 inches square, that has been machined with a CAD-driven prototyping device to create a uniform pattern of sinusoidal peaks and valleys extending in a first direction parallel with one pair of opposing sides of the square. The peak-to-valley distance is 4 mils (about 100 microns) and there are 15 peaks per inch in the first direction. The sinusoidal pattern extends uniformly in the second orthogonal direction (e.g., there is substantially constant height along any line in the second direction, normal to the first direction and parallel to the plane of the plate).

Figure 31:
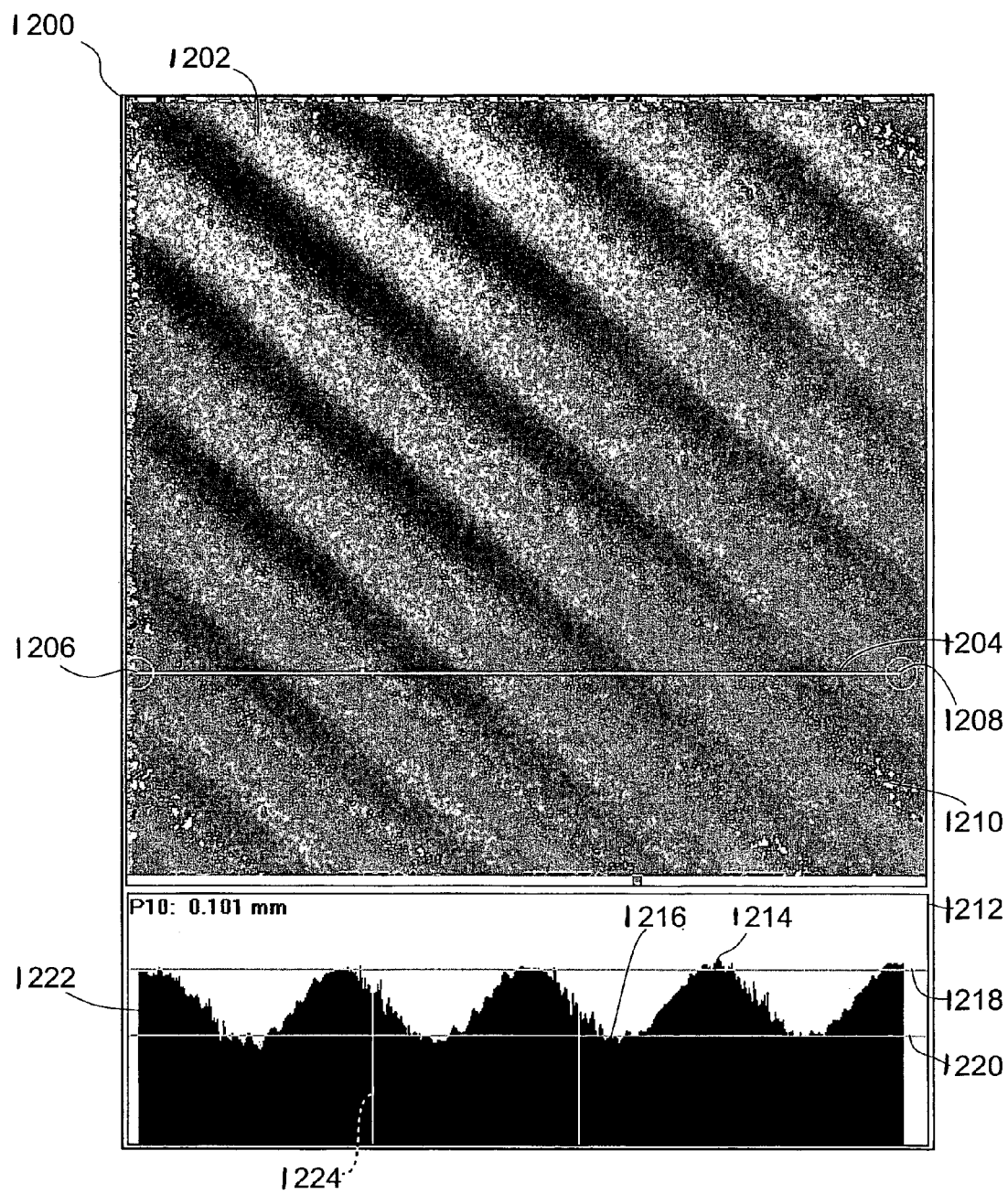
FIG. 31 is a screen shot from a topographical measurement of a textured metal plate used for tactile testing of cleaning wipes.

A height map of a portion of the plate is shown in FIG. 31, which was obtained using a CADEYES™ moiré interferometer as described more fully in U.S. Pat. No. 6,395,957, "Dual-zoned Absorbent Webs," issued May 28, 2002 to Chen et al., herein incorporated by reference. The measurement was conducted using a 5-millimeter field-of-view device. In FIG. 31, a screenshot 1200 from CADEYES-related software depicts a height map 1202 for the textured surface of the machined plate. The height map 1202 depicts a grayscale representation of the topography of an approximately 5-mm square region. Light regions generally correspond to elevated regions of the web and dark regions correspond to depressed regions of the web. A manually selected profile line 1204 has been drawn across the height map 1202, where it spans first and second endpoints 1206, 1208. The various elevations along the profile line 1204 are graphically portrayed below the height map 1202 in a profile box 1212, where the two-dimensional height profile 1222 is depicted. The height profile 1222 shows a series of peaks 1216 and valleys 1214, punctuated by occasional drop outs 1224 where a measurement could not be obtained or by some optical noise resulting in spikes 1210.

In the profile box 1212, the 90% material line 1218 and the 10% material line 1220 are shown. These are horizontal lines positioned such that 90% or 10%, respectively, of the length of the line through the profile passes through the material being measured. The vertical gap between the 90% material line 1218 and the 10% material line 1220 is the P10 value for the height profile 1222, which is 0.101 mm. P10 is a slightly conservative estimate of peak-to-valley depth because the highest and lowest points are excluded. While the nominal amplitude of the machined surface was 3 mils (about 0.075 mm), the measured peak-to-valley depth is 4 mils (0.10 mm), with a substantially uniform, unidirectional sinusoidal structure.

The corrugated plate is attached with two-sided tape to the center of the measuring platen of the balance and the balance is tared. Each human subject is asked to use their index finger (the right finger for the right-handed and the left finger for the left-handed) to press down on a cleaning wipe with the foam-side contacting the corrugated plate, and to slowly draw the finger along the first direction of the plate, with the finger centered relative to the second direction and away from the body initially, the finger moving toward the body of the subject along the direct direction. The load is gradually increased until the corrugated texture of the underlying plate can begin to be sensed by the finger during such motion, and the load being applied is recorded. The mean load recorded for seven human subjects is the Corrugated Tactile Sensitivity value. A Normalized Corrugated Tactile Sensitivity can be computed, with the computation being analogous to the Normalized Wire Mesh Tactile Sensitivity.

In one embodiment, the foam material by itself (unattached to a reinforcing layer) when provided in a 2-millimeter-thick layer having in-plane dimension at least 60 millimeters square, can have a bending stiffness according to the Zwick Flexibility Test of about 0.0003 Nm or greater, such as about 0.0004 Nm or greater, about 0.0006 Nm or greater, about 0.0008 Nm or greater, or about 0.001 or greater.

DETAILED DESCRIPTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges and limits mentioned herein include all ranges located within, and also all values located under or above the prescribed limits. For instance, a range from about 100 to 200 also includes ranges from 110 to 150, 170 to 190, and 153 to 162. Further, a limit of up to about 7 also includes a limit of up to about 5, up to 3, and up to about 4.5.

The present invention provides for a cleaning product which may be a cleaning wipe 10 as shown in FIG. 1. The cleaning wipe 10 includes a foam 12 such as a melamine-based foam that is attached to a web 14. The foam 12 generally has an open celled structure that when moved over a surface is capable of effectively cleaning dirt and other unwanted elements from the surface. The web 14 may act as a reinforcing layer in order to strengthen or hold the melamine based foam 12, and/or may provide for water retaining properties which help to keep the melamine based foam 12 wet should wet wiping with the cleaning wipe 10 be conducted. Alternatively or in addition, the web 14 may be adapted for scrubbing, and may comprise abrasive material (not shown) such as coarse polymeric filaments, meltblown shot, abrasive particles, hook-like protrusions such as those used in hook and loop mechanical fastening systems, and the like.

The web 14 may comprise a structure of fibers or filaments that are retained to one another by fiber-fiber bonding (e.g., hydrogen bonding), fiber entanglement, adhesive bonding, interfiber or interfilament friction, and the like. In accordance with one exemplary embodiment of the present invention, the web 14 can be a hydrophilic cellulosic fibrous web such as a wet-laid or air-laid paper web comprising predominately natural cellulosic fibers such as wood-based papermaking fibers, cotton, kenaf, bagasse, milkweed, etc., and mixtures thereof. In other embodiments, the web may be a paper web comprising synthetic cellulosic fibers such as rayon. Alternatively, the web 14 can be a nonwoven fibrous web which has a structure of individual fibers or threads which are interlaid, but not in an identifiable manner as in a knitted fabric. The fibers in a nonwoven web are generally understood to be manmade fibers such as non-cellulosic polymeric fibers, typically based on synthetic polymers such as polyolefins, including webs made from meltspun processes (meltblowing, spin-bonding, etc.). Alternatively, the web 14 need not include a fiber structure but may be, for instance, a film or foam in other exemplary embodiments.

As shown in FIG. 1, the cleaning wipe 10 includes a single layer of melamine based foam or another cleaning foam attached to a single reinforcing layer shown as web 14. Alternative exemplary embodiments exist in which the foam 12 and/or web 14 are made of any number of layers. The foam 12 may be laminated to the web 14 in order to effect attachment of these two components of the cleaning wipe 10. The term "laminated" as used herein means the two components are united to one another by an adhesive optionally with the use of heat and/or pressure. However, in accordance with other exemplary embodiments of the present invention, the foam 12 may be attached to the web 14 in a variety of manners. For instance, these two components may be attached to one another by ultrasonic bonding, hot melts, pressure sensitive adhesives, thermal bonds, or by mechanical attachments such as sewing, mechanical fasteners, or a hook and loop type fastener in accordance with other exemplary embodiments. Hydroentangling can also be used to join a fibrous web to the foam. In one embodiment, a hotmelt is used comprising at least one polymer with a substantial number of carboxyl groups or salts thereof to provide good bonding with a fibrous cellulosic web when wet. For example, a hot melt suitable for the present invention may comprise ethylene vinyl acetate (EVA), and may have at least about 20 weight percent (wt %) EVA or at least about 50 wt % EVA. Hotmelts may be applied by meltblown nozzles, glue guns, other known adhesive nozzles, and the like. After hotmelt is applied to one or both surfaces to be joined, the two surfaces can immediately be brought into contact and optionally pressed together with a compressive force, such as a force of about 0.03 psi or greater, or about 0.5 psi or greater, or about 5 psi or greater. The compressive force may be provided by a nip between two rollers, pressure between two flat plates, or other methods known in the art.

The cleaning wipe 10 may be configured such that the foam 12 is a relatively thin layer. For instance, the foam may be on the order of from about 2 millimeters to about 8 millimeters in thickness. Other exemplary embodiments of the present invention exists in which the foam 12 may have a varying thickness, for instance being 1 millimeter thick at certain portions of the web 14, and being 10 millimeters thick at other portions of the web 14. As such, the present invention includes various embodiments in which the foam 12 has a uniform thickness throughout, and also a varying thickness throughout. Additionally, the present invention includes exemplary embodiments where the foam 12 is less than 20 millimeters in thickness. Still further exemplary embodiments exist in which the foam 12 is less than 15 millimeters in thickness, less than 10 millimeters in thickness, and less than 5 millimeters in thickness. Additional exemplary embodiments of the present invention exist in which the foam 12 is from about 1 millimeter to about 15 millimeters in thickness.

The foam 12 employed may be free from plastic deformation. In another aspect, the melamine based foam 12 used in the present application may be capable of regaining a part of or all of its original shape and size after being subjected to some degree of deformation.

The lamination of the foam 12 to the web 14 may be done with the aid of hot melt adhesives in accordance with certain exemplary embodiments of the present invention. Here, the foam 12 is adhered to the web 14 through heat and pressure which aid in melting the hot melt adhesive and forming a bond between the foam 12 and the web 14.

The web 14 used may have a flexibility of any degree. For instance, the web 14 may be a fairly flexible member or may be relatively rigid. The web 14 used may have the same flexibility as the foam 12 to which it is attached, or may have a flexibility that is greater than or less than the foam 12 attached thereto.

The web 14 may be made of a soft material so that it is capable of buffing or polishing a surface. Alternatively, the web 14 may be made of a coarse material such that the web 14 is more coarse or abrasive than the foam 12. In this instance, the cleaning wipe 10 may be used so that the web 14 is capable of scrubbing coarse surfaces which would otherwise damage the foam 12. In fact, the web 14 may be more capable of removing dried food substances or ground in dirt and some other unwanted elements from a surface to be cleaned in other exemplary embodiments. The web 14 may comprise abrasive grit or meltblown shot joined to a fibrous substrate, or abrasive fibers such as the multifilamentary aggregates disclosed in commonly owned U.S. patent Ser. No. 10/321,831, "Meltblown Scrubbing Product," filed Dec. 17, 2002 by Chen et al., herein incorporated by reference. A portion of the cleaning surface of the foam 12 itself may also be joined to materials such as meltblown shot or multifilamentary aggregates, in order to enhance cleaning or to strengthen the foam 12 and prevent the foam 12 from being damaged during cleaning.

In certain exemplary embodiments of the present invention, the web 14 may be configured so that it can help provide water to the foam 12 during cleaning, should the cleaning wipe 10 be configured as a wet wipe and be used in a wet state during cleaning. The web 14 in addition to, or alternatively to, helping provide water to the foam 12 may also be used in order to wipe away particulates that are created by the foam 12. These particulates are essentially tiny portions of the foam 12 that may be broken away during movement of the foam 12 across the surface that is being cleaned. Additionally, the particulates that are removed by the web 14 may also be particles of dirt or other unwanted objects that are detached from the surface by the foam 12.

Figure 2:
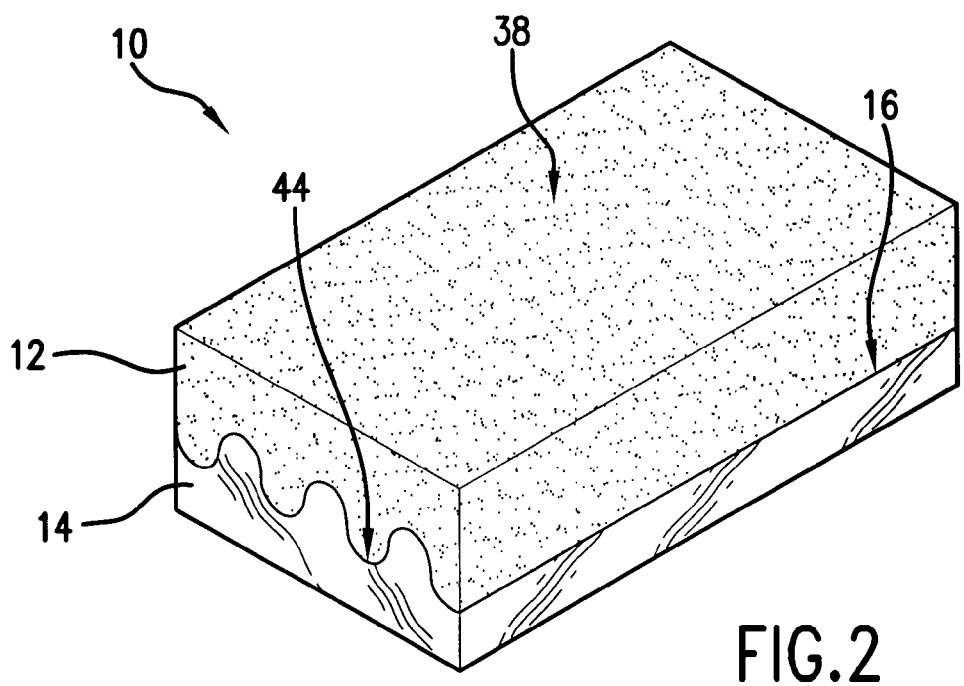
FIG. 2 is a perspective view of a cleaning wipe used in accordance with another exemplary embodiment of the present invention. A web is included and has a three dimensional surface to which a layer of melamine foam is attached.

FIG. 2 shows another exemplary embodiment of a cleaning wipe 10 used in accordance with the present invention. Here, the web 14 has a receiving surface 16 that is three-dimensional in shape. Specifically, the receiving surface 16 defines a plurality of cavities 44 in the web 14. The foam 12 may be disposed in the cavities 44 and attached to the receiving surface 16 of the web 14. In accordance with one exemplary embodiment of the present invention, the cleaning wipe 10 shown in FIG. 2 has a web 14 that is a wet-resilient tissue that along with the foam 12 is also capable of scrubbing a surface that is to be cleaned. A wet-resilient tissue is one that still holds together for at least some amount of time when wetted. More specifically, a wet resilient web can maintain a relatively high degree of bulk when wet after one or more compression cycles. For example, drawing upon the test methods for wet resilient webs described in U.S. Pat. No. 6,436,234, "Wet-Resilient Webs and Disposable Articles Made Therewith," issued Aug. 20, 2002 to Chen et al. and herein incorporated by reference, a wet resilient paper web suitable for the present invention can have a Wet Compressed Bulk of about 4 cc/g or greater, more specifically about 6 cc/g or greater; alternatively can have a Springback of about 0.6 or greater, more specifically about 0.7 or greater; and alternatively can have a Load Energy Ration (LER) of about 0.6 or greater, more specifically about 0.7 or greater. Any combination of the above-given values for Wet Compressed Bulk, Springback, and LER can also be provided in the fibrous web of the present invention, including selections for one, two, or all three of the parameters.

The web 14 may optionally include an abrasive material disposed therein, such as a coarse meltblown shot, an abrasive grit such as mineral particles, or a meltblown multifilamentary aggregate.

Figure 3:
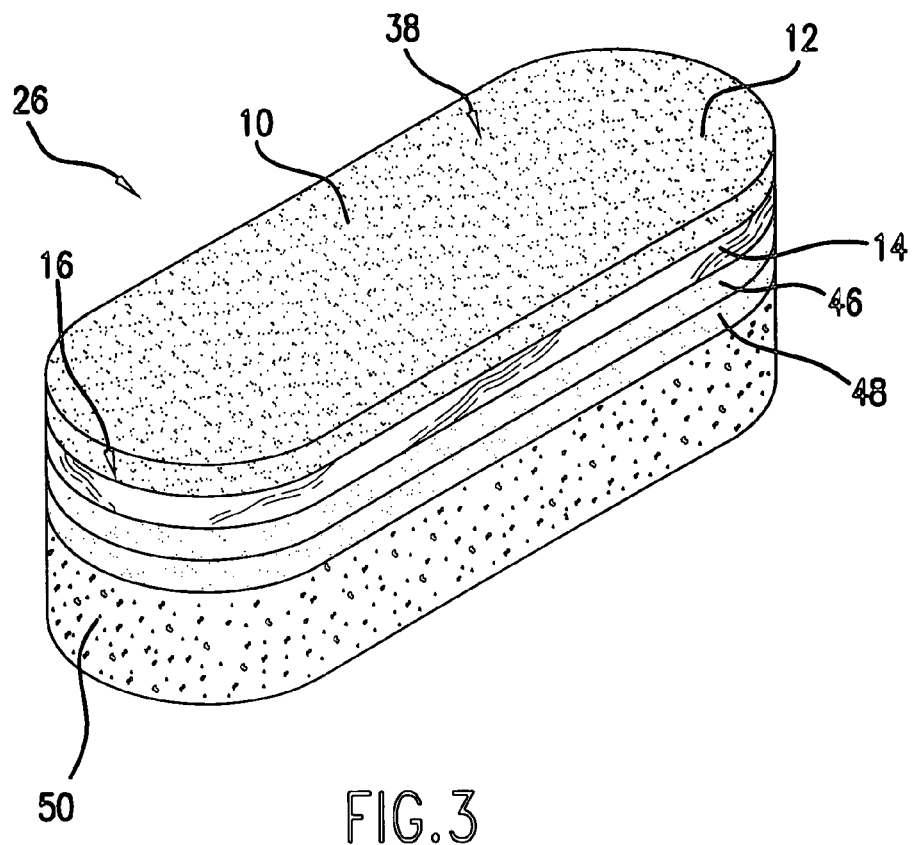
FIG. 3 is a perspective view of a cleaning wipe used in accordance with one exemplary embodiment of the present invention. Here, the cleaning wipe is configured onto a scrubbing pad.

As shown in FIG. 3, the cleaning wipe 10 may be incorporated into a scrubbing pad 26. Here, the cleaning wipe 10 comprises the outer surface of the scrubbing pad 26. The foam 12 is located on one end of the scrubbing pad 26. Alternatively, the foam 12 may be included on both ends of the scrubbing pad 26 in accordance with other exemplary embodiments. The web 14 is attached to the foam 12.

The scrubbing pad 26 is shown as being a layered structure, the outer layer in this instance is the cleaning wipe 10. Additional layers 46 and 48 of the scrubbing pad 26 may be each an abrasive meltblown layer which is also capable of contacting a surface to be cleaned once the cleaning wipe 10 is removed. The abrasive layer 48 is attached to a water absorbent substrate 50, which may be for instance a sponge. In this exemplary embodiment of the present invention, the scrubbing pad 26 may be configured to clean a surface when the scrubbing pad 26 is wet to some degree.

Once the cleaning wipe 10 has been worn down to some degree, the abrasive layer 46 and/or the abrasive layer 48 may be exposed in order to assist in cleaning the surface to be cleaned. Although described as being an abrasive meltblown, the layers 46, 48 may be substituted for additional cleaning wipes 10 in accordance with other exemplary embodiments of the present invention.

Figure 4:
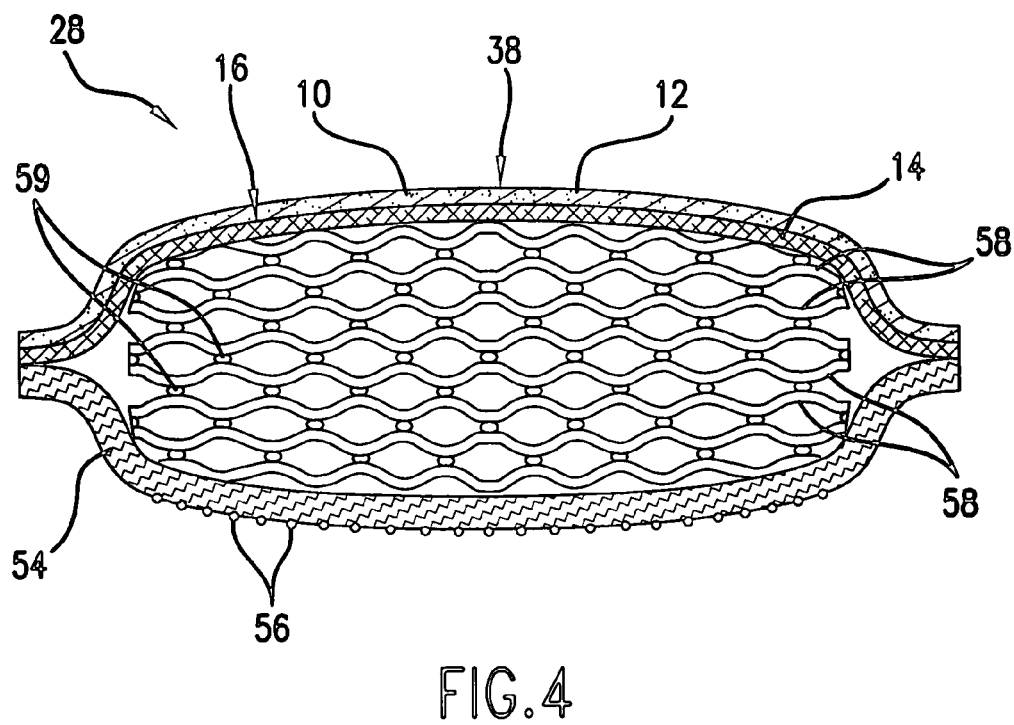
FIG. 4 is a cross-sectional view of a cleaning wipe used in accordance with one exemplary embodiment of the present invention. The cleaning wipe is configured to be used on a sponge substitute.

FIG. 4 shows an alternative exemplary embodiment of the present invention in which the cleaning wipe 10 is incorporated into a sponge substitute 28. The sponge substitute 28 used may be that as described in U.S. Ser. No. 10/036,736 filed on Dec. 21, 2001 which published as U.S. patent application publication number U.S. 2003/0135181 on Jul. 17, 2003. This application is owned by the assignee of the present application and is incorporated by reference herein in its entirety for all purposes. In the cross-sectional view of the exemplary embodiment shown in FIG. 4, the cleaning wipe 10 covers one side of the sponge substitute 28. The cleaning wipe 10 is joined to a cover 54 which covers the other side of the sponge substitute 28. These two components may be joined through any manner commonly known in the art, for instance thermal bonding, ultra-sonic bonding, adhesives, threads, hook and loop type fastening systems, snaps, rivets, and/or staples may be used in order to connect these two components. The cover 54 includes a plurality of abrasive members 56 disposed thereon.

The cover 54 and/or cleaning wipe 10 may be made from any suitable material that allows for the flow of liquid therethrough. The sponge substitute 28 is therefore capable of wet cleaning. The cover 54 may be a meltblown web, a spunbond web, a bonded carded web, a paper web, or a laminate containing any of the previously mentioned webs in accordance with various exemplary embodiments of the present invention. Enveloped between the cover 54 and the cleaning wipe 10 is a plurality of tissue layers 58. The tissue layers 58 may be connected to one another or to the cover 54 and/or cleaning wipe 10 by binder material 59. The tissue layers 58 help maintain the shape of the sponge substitute 28, causing the sponge substitute 28 to spring back into its initial shape after a user grasps and deforms the sponge substitute 28 during use. Additionally, the tissue layers 58 help to retain water within the sponge substitute 28 and assist in generating foam when the sponge substitute 28 is used. Additional layers of various materials can also be included inside the sponge substitute 28, such as nonwoven webs, superabsorbent particles, scrim, high bulk synthetic fibers, and the like.

In accordance with other exemplary embodiments of the present invention, the cleaning wipe 10 may be included on both ends of the sponge substitute 28, in this instance substituting for the cover 54. Alternatively, the cleaning wipe 10 does not have to cover the entire end of the sponge substitute 28, but may simply be included on a portion of the sponge substitute 28. Here, the foam 12 of the cleaning wipe 10 may be used for spot scrubbing in order to clean hard to remove dirt and other unwanted elements. The other portions of the sponge substitute 28 may be used in order to clean easier to remove dirt and other unwanted elements.

Figure 5:
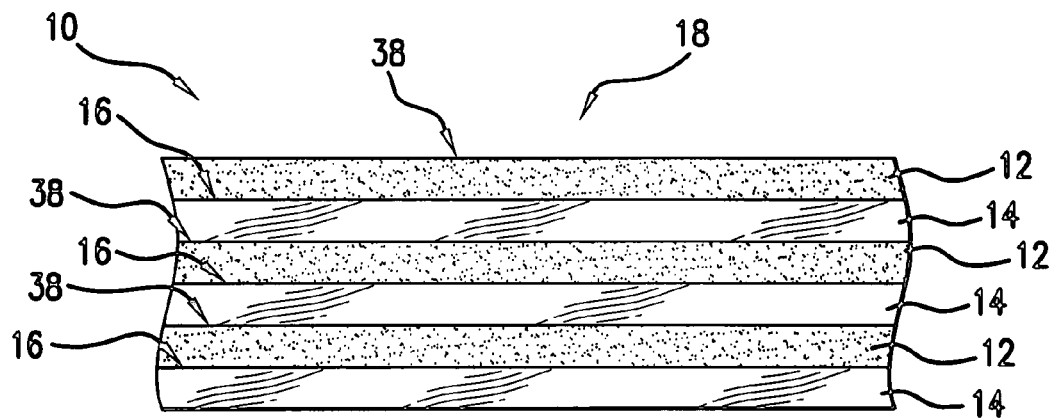
FIG. 5 is a side view of an exemplary embodiment of a cleaning wipe used in accordance with one exemplary embodiment of the present invention. Here, the cleaning wipe includes alternating layers of cleaning foam layers and web layers (e.g., paper webs, nonwoven webs, and films).

The cleaning wipe 10 may also be configured as shown in FIG. 5. Here, the cleaning wipe 10 is made from alternating layers of foam 12 and web 14 joined together. The alternating layers of foam 12 and web 14 are configured into a stack 18. In such a configuration, use of the cleaning wipe 10 will eventually result in one of the layers of the foam 12 and/or the web 14 to be worn away. In such an instance, a fresh layer of foam 12 and/or web 14 will be exposed upon the wearing away of the preceding foam 12 and/or web 14. Alternately or additionally, the stack 18 may be configured such that the user may remove layers of foam 12 and web 14. In this instance, the user can remove a worn or contaminated layer of foam 12 and/or web 14 in order to ensure the cleaning wipe 10 has a fresh layer of foam 12 and/or web 14 for a particular cleaning application.

Figure 10:
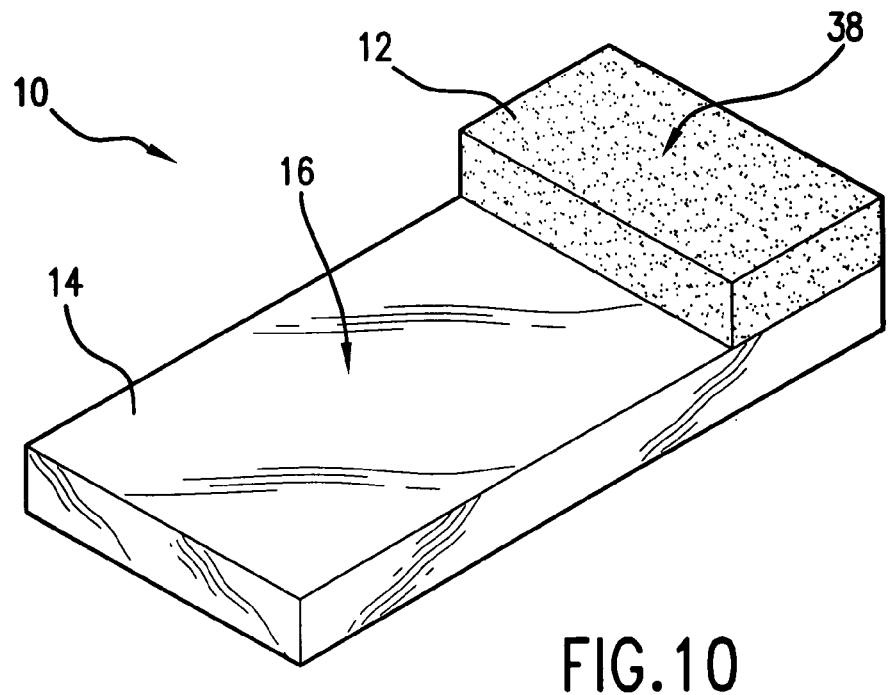
FIG. 10 is a perspective view of a cleaning wipe used in accordance with one exemplary embodiment of the present invention. The cleaning wipe includes a web and a melamine based foam which is attached to the web and covers only a certain portion of the outer surface of the web.

As shown in FIG. 1, the foam 12 extends across the entire receiving surface 16 of the web 14. In accordance with other exemplary embodiments, the foam 12 may extend only over a portion of the receiving surface 16 of the web 14. FIG. 10 shows one such embodiment in which the foam 12 covers only a portion of the receiving surface 16 of the web 14. This portion is located at one end of the web 14. In accordance with other exemplary embodiments of the present invention, any number of additional pieces of foam 12 may be placed onto the web 14 such that a plurality of foam 12 pieces are located throughout the receiving surface 16 of the web 14.

Figure 11:
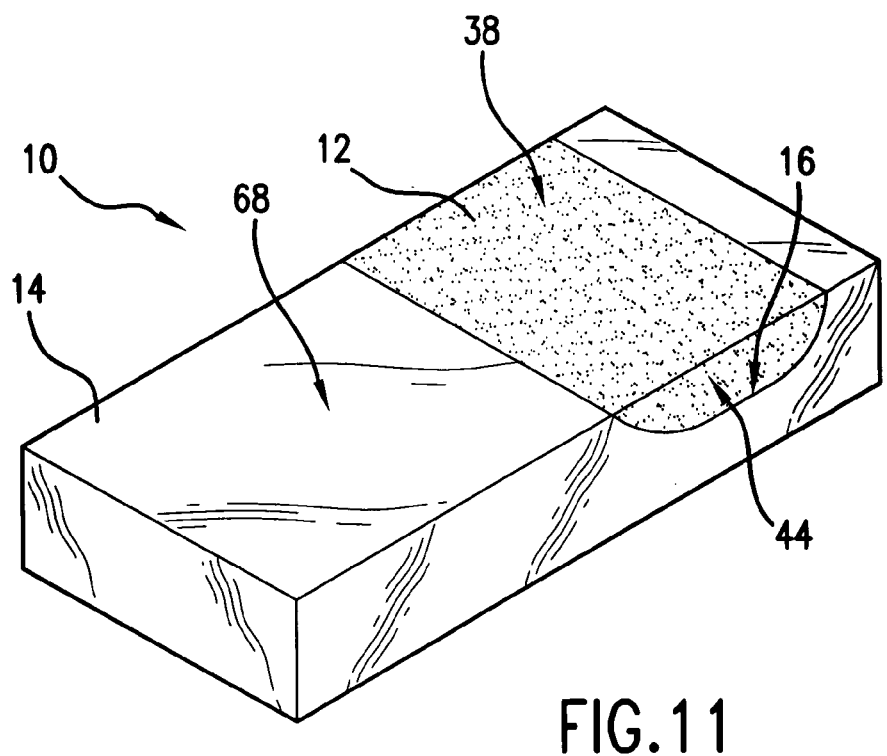
FIG. 11 is a perspective view of an exemplary embodiment of a cleaning wipe used in accordance with the present invention. The cleaning wipe includes a melamine based foam that is configured as an insert into a web to which the melamine based foam is attached.

An alternative exemplary embodiment of the cleaning wipe 10 is shown in FIG. 11. Here, the web 14 is provided with a cavity 44. The foam 12 is positioned within the cavity 44 such that the foam 12 acts as an insert in the cleaning wipe 10. The outer surface 38 of the foam 12 may be flush with the outer surface 68 of the web 14. As can be imagined, additional inserts of foam 12 (not shown) may be further provided on the web 14. Additionally, one or more pieces of foam 12 may also be attached to the outer surface 68 of the web 14 in addition to having the insert portion of the foam 12.

Figure 6:
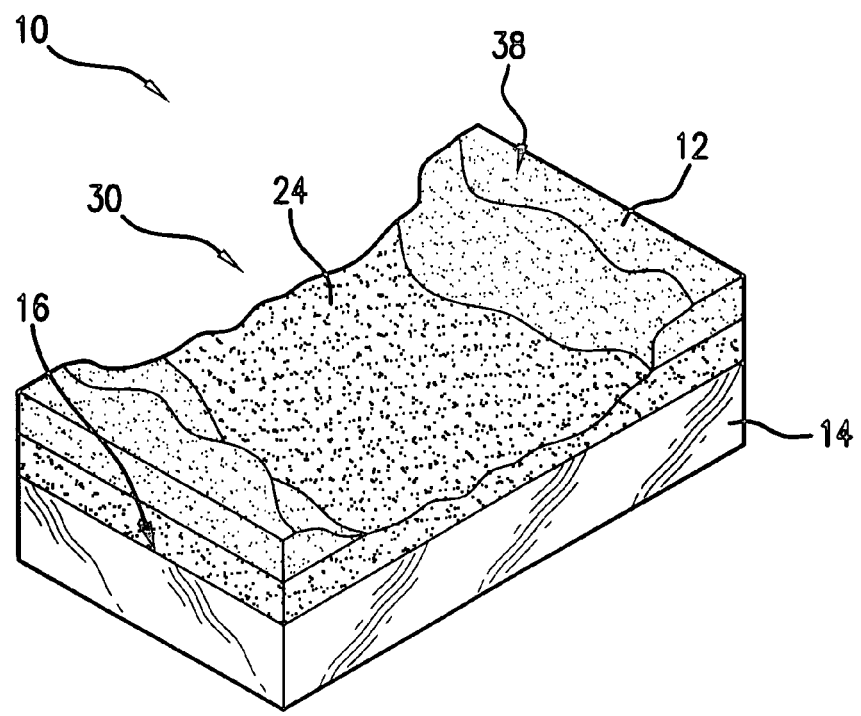
FIG. 6 is a perspective view of a cleaning wipe used in accordance with one exemplary embodiment of the present invention. The cleaning wipe includes a cleaning foam that has a visual indicating portion, a portion of the melamine based foam is shown as being worn away.

FIG. 6 shows a perspective view of an exemplary embodiment of the cleaning wipe 10. In this instance, the cleaning wipe 10 has been used by a user in order to clean a surface, resulting in a cavity 30 being formed in the foam 12 as a result of wear through normal cleaning. The foam 12 is provided with a visual indicating portion 24 which is a portion of the foam 12 that is of a different color than the rest of the foam 12. For instance, the visual indicating portion 24 may be red, while the rest of the foam 12 is white. Once a user has used a cleaning wipe 10 to such a degree that the cavity 30 is extended into the visual indicating portion 24 of the foam 12, the user will be provided with a visual indication that the cleaning wipe 10 is becoming worn. In this instance, the visual indicating portion 24 may indicate to the user that the cleaning wipe 10 has reached its useful life and may be discarded. Alternatively, the visual indicating portion 24 may indicate to the user that the cleaning wipe 10 has been used to such a degree that only a limited amount of life remains in the cleaning wipe 10 before it must be discarded.

Although shown as extending across the entire web 14 of the cleaning wipe 10, the visual indicating portion 24 may be configured differently in accordance with other exemplary embodiments of the present invention. For instance, the visual indicating portion 24 may instead of being a layer, be various smaller areas that are dispersed through the foam 12. The visual indicating portions 24 may be located in the central region of the foam 12, or may be located on the outer edges of the foam 12. In accordance with one exemplary embodiment of the present invention, the cleaning wipe 10 is designed such that the cavity 30 will be formed in the central region of the foam 12. The foam 12 in this instance is eight millimeters in thickness, and is provided with a visual indicating portion 24 that is an oval of blue pigmented foam 12 that is located six millimeters away from an outer surface 38 of the foam 12.

In a related embodiment (not shown), a colored layer of material other than foam is disposed between the foam and the fibrous layer to provide a visual indicator of wear. The colored layer may be an apertured or unapertured film, a nonwoven web, a paper layer, and the like, or may comprise colored adhesive that joins the fibrous web to the foam. Alternatively, the colored layer may be a part of the fibrous web, such as a layer comprising dyed fibers, or the entire web itself may be colored.

Figure 7:
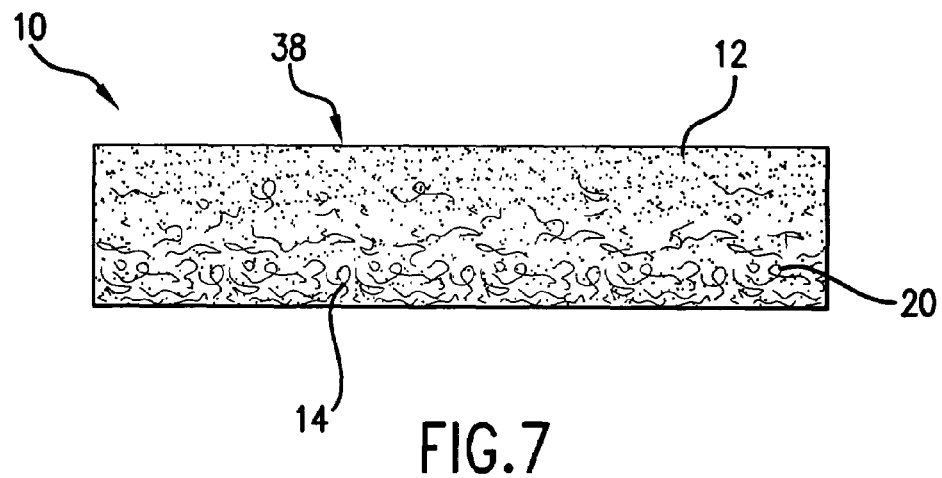
FIG. 7 is a side view of an exemplary embodiment of a cleaning wipe used in accordance with the present invention. The cleaning wipe includes a cleaning foam attached to a web. The web is formed by a plurality of fibers.

In accordance with one exemplary embodiment of the present invention, the foam 12 and the web 14 are attached to one another due to the fact that the foam 12 and the web 14 are integrally formed with one another. As shown in FIG. 7, the entire foam 12 or a layer or portion of the foam 12 may be integrally formed with a plurality of fibers 20. The plurality of fibers 20 may be paper making fibers, mineral fibers, and/or polymeric fibers. The foam 12 may be integrally formed with the plurality of fibers 20 which form the web 14 of the cleaning wipe by a method as set forth in U.S. Pat. No. 6,603,054 which is owned by the assignee of the present invention and is incorporated herein for all purposes in its entirety. In one such instance, the web 14 may be dispersed throughout the foam 12 and therefore integrally connected therewith. Here, about 10% or more of the weight of the cleaning wipe 10 may be from the plurality of fibers 20 which are formed by blending loose fibers 20 into a resin coupled with a blowing agent or other foam-producing means prior to curing the resin in order to form the foam.

In accordance with other exemplary embodiments of the present invention, the web 14 may be a scrim layer, a mesh, and/or an elastomeric network that is embedded in foam resin prior to curing in order to form a cleaning wipe 10 that has a foam 12 integrally formed with the web 14. Various materials may be imbedded into the foam resin which is used to form the foam 12. For example, tow, woven fabrics, tissue layers, coform materials, nonwoven webs, milkweed fibers and natural or synthetic fibers may be used in order to form the web 14 of the present invention.

Figure 8:
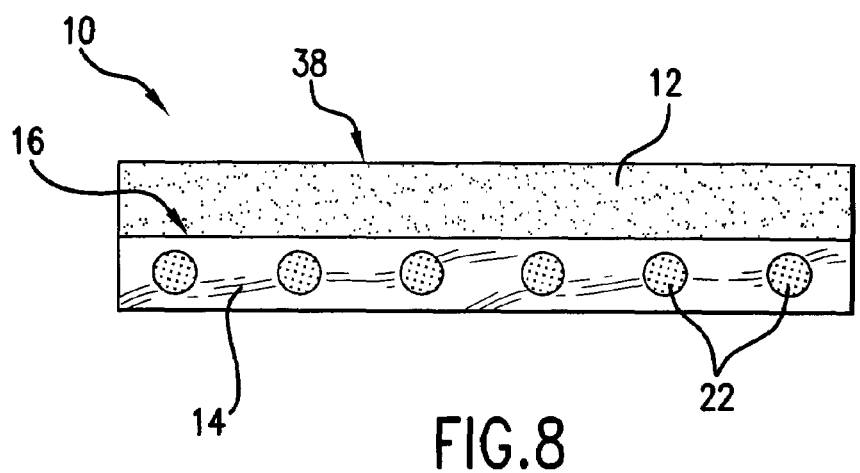
FIG. 8 is a side view of an exemplary embodiment of a cleaning wipe used in accordance with the present invention. The cleaning wipe includes a web that has a plurality of functional members incorporated therewith.

As stated, the web 14 of the cleaning wipe 10 may be used in order to act as a reinforcing layer to the foam 12, and/or may be configured in order to help clean the surface that is being cleaned by the cleaning wipe 10. The web 14 may in other exemplary embodiments of the present invention be provided with an additional functionality. FIG. 8 shows an exemplary embodiment of the cleaning wipe 10 in which the web 14 is provided with a plurality of functional members 22 disposed therein. The functional members 22 may be cleaning agents in order to help aid the cleaning wipe 10 in cleaning a surface. For instance, the functional members 22 may be enzymes such as papain enzymes, or may be bleaching agents such as peroxide. Additionally, the functional members 22 may be abrasive compounds or may be detergents in accordance with other exemplary embodiments. The functional members 22 may also be configured such that they release an odor which may subsequently be transferred to the surface which is to be cleaned. Further, the functional members 22 may be skin wellness agents. The functional members may be encapsulated in a polymeric or lipid shell capable of breaking during use in response to mechanical compression and shear, whereby ingredients in the functional members are released. Alternatively, the functional members may be encased or encapsulated in a water soluble material such that salvation of the material when wet permits release of the functional components. The functional members 22 may be antimicrobial agents and/or natural plant based extracts or compounds in accordance with other exemplary embodiments.

The web 14 may also have an added functionality such that the web 14 and/or the functional members 22 act as a biosensor. In this instance, should the web 14 and/or the functional members 22 detect the presence of harmful bacteria, lead, mercury, or other agents, the web 14 and/or functional member 22 may change color in order to indicate the presence of such agents. Alternatively or additionally, the web 14 and/or functional members 22 may be heat generating agents, for instance the cleaning wipe 10 may employ thermal pad technology. In one instance, oxidation of iron may result in a heating of the web 14. Alternatively, water activated technology may be used, such as calcium chloride pellets, in order to heat the web 14 such that the cleaning wipe 10 is also heated. Heating of the cleaning wipe 10 may be advantageous in that more effective cleaning of grease or other elements may be realized when employing the cleaning wipe 10.

The functional members 22 may be odor control agents such as cyclodextrins, zeolites, clays, and/or activated carbon particles or fibers. The cleaning wipe 10 may also be configured to have a chemical agent in order to combat odor or to regulate the release of odor eliminating or odor providing compounds. Chemical agents which may be included are, for instance, chlorine dioxide, antimicrobial gases or liquids, time release antimicrobial compounds, silver ions embedded in the foam 12, zeolites, and/or chitosan-related compounds.

The web 14 and/or functional members 22 may also be foaming agents. In these instances, the foaming agents may be activated when contacted by water in order to create a foam which may additionally be used in helping the cleaning wipe 10 clean a surface of dirt or other unwanted elements. Also, the functional members 22 and/or the web 14 may be made of a material or configured in order to help keep the foam 12 wet during use of the cleaning wipe 10.

Although described as being incorporated into the web 14, the functional members 22 may be incorporated into the foam of the cleaning wipe 10 in accordance with other various embodiments. Further, the functional members 22 may be on the outer surface, edges, or even separate from the web 14 and/or foam 12.

Figure 9:
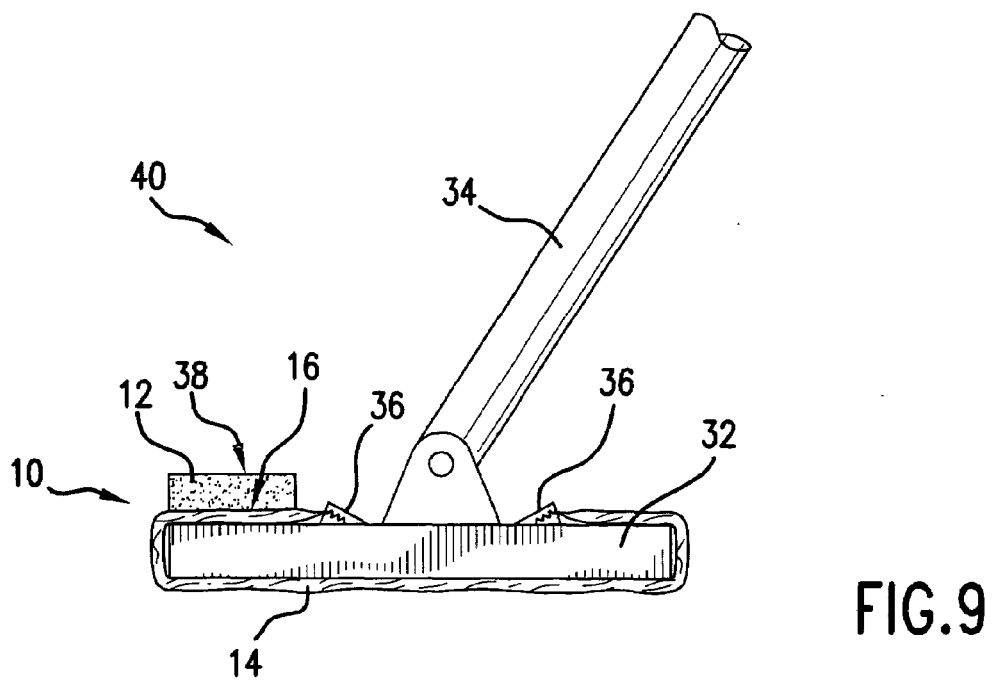
FIG. 9 is a side view of a mop which incorporates a cleaning wipe used in accordance with one exemplary embodiment of the present invention.

The cleaning wipe 10 of the present invention may be used in a variety of applications. For instance, the cleaning wipe 10 may be used in conjunction with a mop 40 as shown in FIG. 9. Here, the mop 40 includes a mop handle 34 attached to a mop head 32. The cleaning wipe 10 is attached to the mop head 32 such that the web 14 extends over the bottom surface of the mop head 32 and is connected to the upper surface of the mop head 32 on either end. One or more gripping elements 36 may be located on the mop head 32 in order to attach the cleaning wipe 10 to the mop head 32. The foam 12 is attached to the web 14 at a location located generally on the upper surface of the mop head 32. In this instance, the mop head 32 may be moved across a surface to be cleaned, the surface being cleaned by the web 14. When desired, the mop handle 34 may be rotated by the user such that the mop head 32 is flipped over and the foam 12 of the cleaning wipe 10 engages the surface to be cleaned. In this instance, harder to clean dirt and other unwanted materials may be removed by the application of the foam 12. The mop 40 may be configured to work as either a dry mop, or a wet mop in accordance with various exemplary embodiments of the present invention.

The mop 40 may be alternatively arranged such that the foam 12 is located across the entire surface of the web 14. In this instance, the foam 12 will be used in order to contact the surface to be cleaned. Additionally, the foam 12 may be attached to the web 14 and located at the leading edge of the mop head 32 and/or the trailing edge of the mop head 32. As such, the present invention includes various exemplary embodiments where the cleaning wipe 10 may be arranged on the mop head 32 of the mop 40.

Alternatively, a cleaning foam section may be disposed on a side of the mop head (not shown) such that a user can flip the mop head with the foam strip down for scrubbing.

An additional use for the cleaning wipe 10 may be as an add-on product to existing mops. Existing mops to which the cleaning wipe 10 may be added on are, for instance, sponge based mops, and mops which include disposable wipes which are attached to the mop head for one or more cleaning sessions and are then removed by the user.

The cleaning wipe 10 may also find utility as a dish cleaning tool. In this instance, it may be beneficial to provide the web 14 with functional members 22 that may be, for instance, detergents, heat generating agents, biosensors, and/or skin wellness agents.

An alternative use for the cleaning wipe 10 in accordance with the present invention is in conjunction with disposable gloves in which the cleaning wipe 10 may be configured onto the fingers, palm region or elsewhere on the glove. In this instance, the disposable glove may further protect the user's hands so that the user's hands are more isolated from the surface that is being cleaned or from detergents or other agents which may be employed.

Figure 12A:
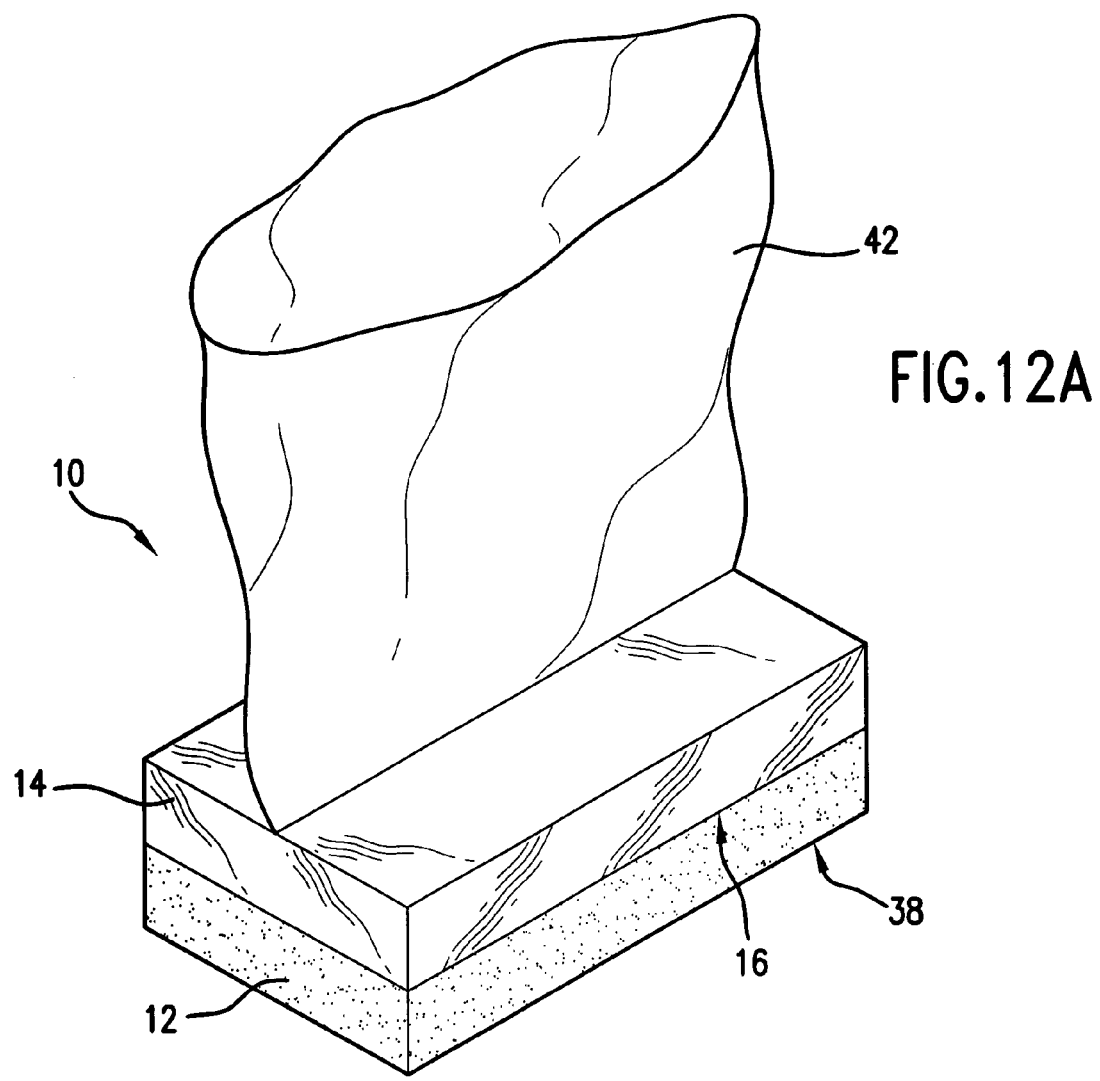
FIG. 12A is a perspective view of an exemplary embodiment of the cleaning wipe used in accordance with the present invention. The cleaning wipe is shown attached to a protective envelope.
Figure 12B:
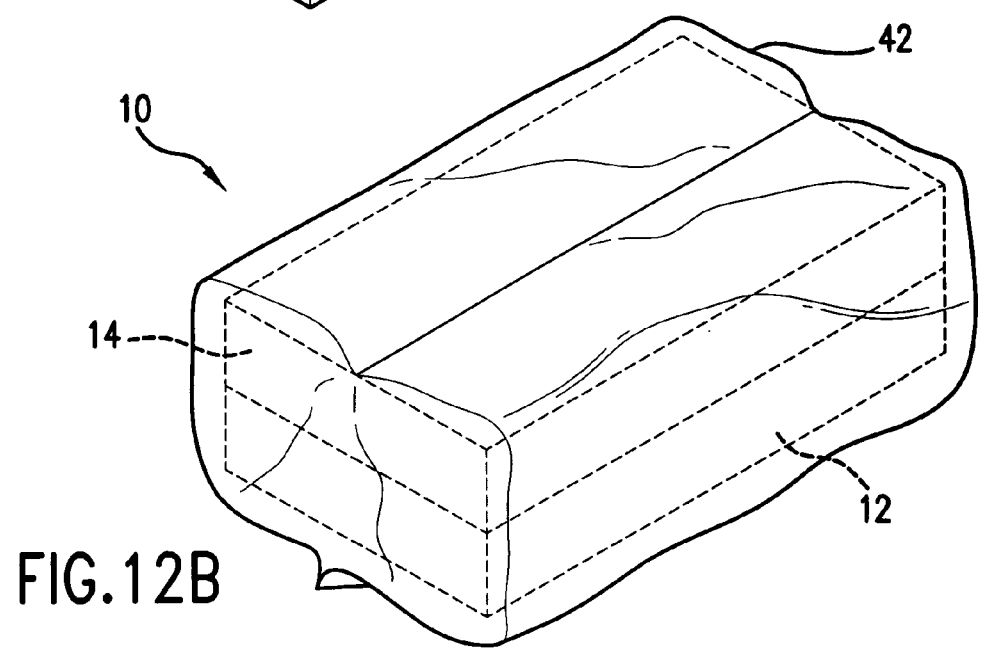
FIG. 12B is a perspective view of the cleaning wipe of FIG. 12A in which the cleaning wipe is located inside of the protective envelope.

The present invention also includes exemplary embodiments of the cleaning wipe 10 in which the cleaning wipe 10 is provided with a protective envelope 42 attached thereto. One such configuration is shown in FIG. 12A. The user of the cleaning wipe 10 may insert his or her hand into the protective envelope 42 in order to prevent the user from physically contacting the cleaning wipe 10. Once finished, the user can turn the protective envelope 42 inside out such that the protective envelope 42 encompasses the cleaning wipe 10. The user may then close the protective envelope 42 in order to facilitate clean up of a used cleaning wipe 10. The cleaning wipe 10 is shown inside of the protective envelope 42 in FIG. 12B.

The protective envelope 42 may be in the form of a glove or other encasement shaped to receive a human hand. In one embodiment, the envelope 42 has sealing means such as the seals used in ZIPLOC® bags, whereby after use of the scrubbing portion of the product, the protective envelope can be inverted as the hand is removed to place the soiled cleaning elements within the bag, and then the seal can be mechanically closed to secure the soiled contents within the bag.

The cleaning wipe 10 may be employed by a user in order to clean the face or other portions of the user's body. The cleaning wipe 10 may also be used as a make-up removal article. In this instance, the foam 12 may be provided with extra pore space in order to catch and hold make-up during wiping by the user across the surface of the skin. In such an instance, the foam 12 of the cleaning wipe 10 may provide a soft yet abrasive cleaning of the skin of the user. Such cleaning may be either wet or dry. Extra pore space may be provided by needling, drilling, laser drilling, punching, aperturing, or other means to provide wells or other depressions suitable for retaining removed material. In one embodiment, a textured three-dimensional molded foam layer with suitable topography can be used. Suitable topography can include molded wipes with depressions less than about 4 mm in diameter and with a peak-to-valley height of about 0.2 mm or greater. In a related embodiment, the elevated portions of a three-dimensional surface are substantially flat, with depressed regions occupying about 30% or less of the surface area of the foam layer.

The cleaning wipe 10 may also be configured as a patch, wrap, or bandage which may be applied against bunions, warts, or hardened skin of the user. In such an application, the foam 12 of the cleaning wipe 10 may be used to abrade the skin of the user and also deliver a health agent to the skin. Such a health agent may be provided by a functional member 22 and/or the web 14. The health agent may be a wart treatment compound, a skin softening agent, and/or an antimicrobial agent.

Figure 28:
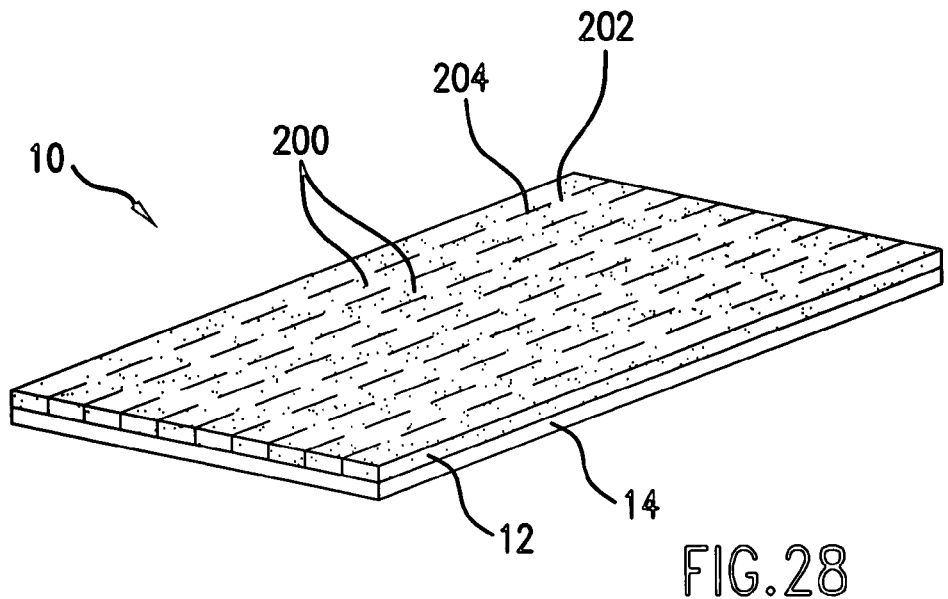
FIG. 28 is a perspective view of a cleaning wipe configured into thin strips connected to one another by a plurality of tabs.

The cleaning wipe 10 may be used as a toilet bowl cleaner. In one exemplary embodiment of the present invention shown in FIG. 28, the foam 12 may be thin strips 200 that are joined to a dispersible web 14. The thin strips 200 are connected to one another by a plurality of tabs 202 spaced between a plurality of perforations 204. Such a configuration of the cleaning wipe 10 provides for a flushable product. In such an instance, the web 14 may disintegrate or break up after being contacted with either a certain amount of water, or water over a certain amount of time. The cleaning wipe 10 may break up when disposed of in a toilet bowl, and the foam strips 200 may be small enough so that both the web 14 and the foam strips 200 are capable of being handled by a septic tank system.

Figure 29:
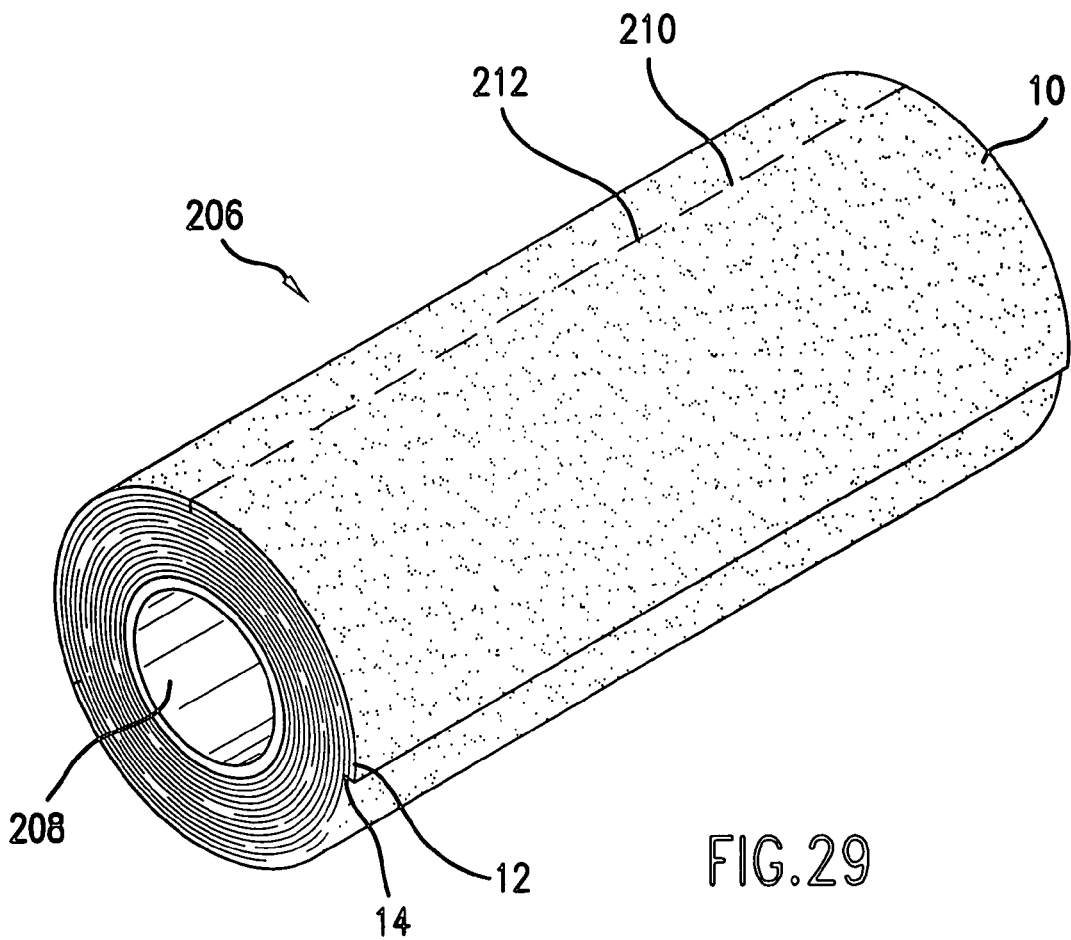
FIG. 29 is a perspective view of a plurality of cleaning wipes configured onto a roll.

The cleaning wipes 10 may also be configured into a roll 206 as shown in FIG. 29. The roll 206 may resemble a conventional paper towel roll. Here, the cleaning wipes 10 are connected to one another by a series of tabs 210 spaced between perforations 212, making one cleaning wipe removable from the next. The cleaning wipes 10 may be unwound from a core 208, or may be coreless in other exemplary embodiments. In such instances, the roll 206 of cleaning wipes 10 may be located in an operating room or in a pre-op room so that a surgeon or other medical technician may more effectively remove dirt, germs, and other unwanted elements when scrubbing and preparing for an operation. Scrubbing of the hands can be done, for example, with a textured cleaning wipe 10 of the present invention wherein at least one of the foam 12 or fibrous web 14 is textured (e.g., molded to a three-dimensional shape wherein H or D is greater than 0.2 mm or greater than 0.4 mm) and optionally further comprising a soap, detergent, antimicrobial agent or skin wellness agent. Cleaning wipes for such purposes may optionally be premoistened with water, alcohol, or solutions having antimicrobial properties or cleaning properties (e.g., soap solutions and preservatives).

Additional uses of the cleaning wipe 10 may be found by employing the cleaning wipe 10 as a furniture wipe for buffing and polishing wood furniture. The cleaning wipe 10 may also be configured as a buffing pad for automotive bodywork. The cleaning wipe 10 may also be configured as a waxing pad for use in maintaining an automotive body. In this instance, the foam 12 may have a wax additive impregnated therein in order to effect waxing of the automotive surface. Alternatively, a wax substrate may be attached to the foam 12 and/or the web 14 in other exemplary embodiments.

The cleaning wipe 10 may also be used in order to prepare a surface that is about to be painted. Still further, the cleaning wipe 10 may be used as a shoe shining wipe. The cleaning wipe 10 may also be used as a bathroom cleaning product. In this instance, the cleaning wipe 10 may be used in order to clean stiff grout from tile and porcelain found in bathrooms.

The cleaning wipe 10 may be used in order to clean a variety of objects. For instance, knives, golf balls, bowling balls, and various household objects may be cleaned by the cleaning wipe 10 of the present invention.

The cleaning wipe 10 may also be employed as an article useful for removing stains from the teeth of a user, or to brighten one's teeth. In this instance, the cleaning wipe 10 may be configured as a Q-tip like product or placed onto "finger gloves" which are small enough such that the user may wipe his or her teeth in order to remove calculus or stains therefrom. Lamination of a suitably thin section of a cleaning foam on a portion of such finger gloves can provide effective cleaning action, such that calculus and other deposits can be readily removed from dental surfaces.

The cleaning wipe 10 may further be used in dental and periodontal care products, for instance the cleaning wipe 10 may be used with dental floss, dental tape strips, and/or toothbrushes. In various exemplary embodiments of the present invention, the web 14 and/or the functional members 22 may be used in order to provide flavoring, cleaning compounds, polishing agents, antimicrobial compounds, mouthwash, oral care compounds, antiviral compounds, and healing agents when the cleaning wipe 10 is used for dental and periodontal care. As stated, the functional members 22 may be incorporated into either the web 14 and/or the foam 12 of the cleaning wipe 10.

It is to be understood that the cleaning wipe 10 of the present invention is not limited to a particular shape. As such, the cleaning wipe 10 may be square, round, or cylindrical in accordance with various exemplary embodiments. Further, the cleaning wipe 10 may have hollow elements that are configured in order to receive fingers, hands, cleaning agents, handles, or inserts in accordance with various exemplary embodiments of the present invention.

One or more portions of the cleaning wipe 10, for instance the foam 12 and/or the web 14, may be charged in order to more effectively remove and retain bacteria. In accordance with one exemplary embodiment, the foam and/or the web 14 have an electrostatic charge either chemically, or by the addition of electrets in order to help attract and retain bacteria by electrostatic means. A chemical electrostatic charge may be provided, for instance, by chitosan, polyvinylamines, primary, secondary, tertiary, or quaternary amines, cationic polymers, polyelectrolytes.

Any known method may be used for adding charged compounds to the surfaces of the struts in the foam 12 should charged surfaces be desired in the cleaning foam 12. For example, chemical additives may be attached to the surface of the polymeric struts by impregnating the foam 12 with a solution containing charged species that can be cross linked to each other or to the foam 12. Combinations of chemical, electrical, and other physical treatments may be used, such as plasma treatment, corona discharge treatment, electret generation, and the like. By way of example, chemical post-treatments of hydrophobic surface are disclosed in U.S. Pat. No. 6,537,614, issued Mar. 25, 2003 to N. Wei et al., and it is believed that such treatments can be adapted for the cleaning foams 12 of the present application. The Wei et al. patent discloses a hydrophobic polymer fiber having a cationically charged coating thereon, in which the coating includes a functionalized cationic polymer, such as an epichlorohydrin-functionalized polyamine or an epichlorohydrin-functionalized polyamido-amine, which has been crosslinked by heat. Such materials can be made by treating the fibrous filter with an aqueous solution of a functionalized cationic polymer cross linkable by heat under conditions sufficient to substantially coat the fibers with the functionalized cationic polymer, wherein the solution includes the functionalized cationic polymer, a poly(vinyl alcohol), a polar solvent for the poly(vinyl alcohol), and water; and treating the resulting coated fibrous filter with heat at a temperature and for a time sufficient to crosslink the functionalized cationic polymer present on the hydrophobic polymer fibers. As adapted for the present application, a solution of a functionalized cationic polymer cross linkable by heat can be used to impregnate or saturate all or a portion of a cleaning foam 12 layer to coat the struts of the foam 12. The resulting coated foam 12 can be treated with heat at a temperature and for a time sufficient to crosslink the functionalized cationic polymer present on the surfaces of the foam 12.

U.S. Patent Application 20030216272 A1, issued Nov. 20, 2003 to Sherry et al., herein incorporated by reference, provides another approach that may be adapted for the present application. Sherry et al. discloses a wipe impregnated with a cleaning solution comprising a soil entrainment system having one or more polyamine compounds and one or more modified polyacrylamide compounds, with a pH between 5 and 11. Polymeric biguanides and other antimicrobials can also be present. Some versions of such wipes are said to be effective in retaining bacteria and in wiping surfaces without leaving visible streaks. The compounds and systems of US Patent Application 20030216272A1 can also be adapted for the cleaning products of the present invention.

The use of charged materials on or in the foam material may provide any one of several possible benefits. Cationic materials, for example, may be useful in attaching to Gram negative bacteria or other microbes with a negative surface charge. Such microbes can then be more effectively removed and retained by the cleaning product. Many forms of non-microbial dirt and grime also contain negative charges that can be more effectively trapped and removed by materials with positive charge. For some applications, negative charges in or on the foam 12 can be useful in removing positively charged dirt. Charged materials can, in some cases, also exert an antimicrobial or bacteriostatic effect.

Charged components in a wetting solution can also be used to improve cleaning with the cleaning product of the present invention.

Cationic compounds effective for attracting bacteria are disclosed in commonly owned copending U.S. application Ser. No. 10/330,458, "Skin Cleansing Products Incorporating Cationic Compounds," filed Dec. 26, 2002, and Ser. No. 10/330,460, "Wound Management Products Incorporating Cationic Compounds," also filed Dec. 26, 2002, both of which are herein incorporated by reference. As disclosed therein, by providing a cleansing substrate comprising a sufficient amount of cationic compounds having an effective charge density of from about 0.1 microequivalents/g to about 8000 microequivalents/g or more, the product can be electrically altered such that it has an effective cationic charge density of more than about 2000 microequivalents/100 g and numerous contaminants can be electrostatically dislodged from the surface (e.g., from skin or other substrates) and captured and carried away. Cationic compounds such as octadecyldimethyltrimethoxylsilpropy-lammonium chloride can be impregnated into the product, in either the foam or the reinforcing layer.

In general, cationic charge for retaining microbes and other contaminants can be provided in any of the cleaning foam 12, a layer or region within the cleaning foam 12, within the reinforcing layer or a portion thereof, or within a wetting solution that can be added to the web 14 prior to being sold commercially (i.e., in a premoistened web) or prior to or during use. Charged components can also be present in an adhesive used to join the reinforcing layer to the cleaning foam 12.

In one embodiment, the cleaning foam 12 or the reinforcing layer comprises negative charges (e.g., anionic groups), which interact with cationic elements in a cleaning solution or wetting solution that retain negatively charged contaminants and microbes, and also are electrostatically attracted to the cleaning foam or reinforcing layer, such that negatively charged microbes and contaminants are effectively retained.

The cleaning wipe 10 may also be configured in some embodiments such that the "melamine based foam" is a non-melamine foam that contains melamine powder.

To illustrate details of a foam structure suitable for the present invention, optical and SEM photomicrographs were obtained for portions of a BASOTECT® foam pad distributed by Procter & Gamble (Cincinnati, Ohio) as a MR. CLEAN® Magic Eraser.

Figure 13:
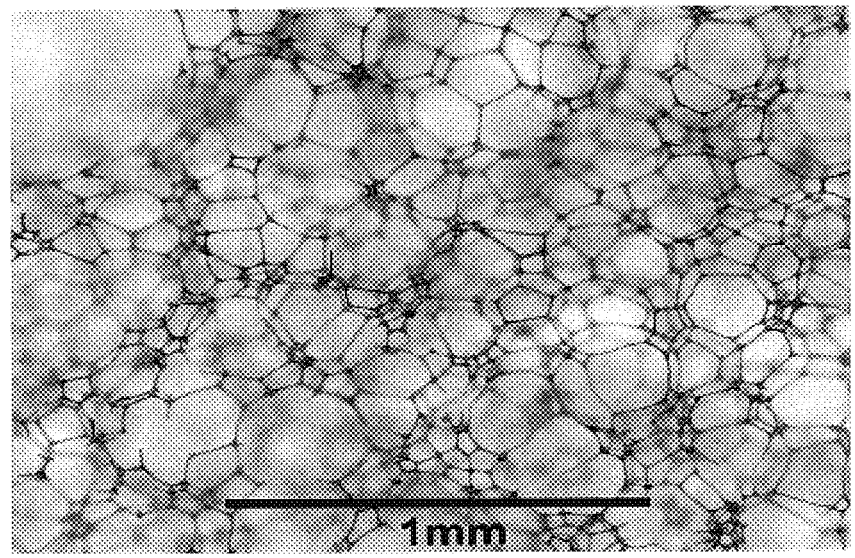
FIG. 13 is an optical photomicrograph at 80× magnification in transmitted light of a razor-cut cross-sectional surface of a commercial melamine-based foam sample.

Examination at low magnification with reflected light and transmitted light microscopy of both the outer surfaces and of a cross-section of the material cut in half show that the material is a substantially uniform block of semi-rigid foam with an open cell structure. For example, FIG. 13 was taken at 80× magnification in transmitted light showing a razor-cut cross-sectional surface of the MR. CLEAN® Magic Eraser. The foam was cut in half through its center. All surfaces, inside and outside, appear substantially as shown in FIG. 13, showing a network of interconnected filaments serving as struts in an open-celled foam network that appeared to be substantially uniform throughout.

Samples were prepared for SEM analysis by cutting out a cube ½" on a side with a razor blade. Thinner segments were cut from the cube and mounted onto a 1" diameter flat disc holder with double-stick tape. The mounted samples were metallized with gold using a vacuum sputter coater to approximately 250 angstroms thickness. SEM analysis was performed with a JSM-840 electron microscope (Jeol USA Inc., Peabody, Mass.) with an accelerating voltage of 5 kV, a beam current of 300 picoAmps, a working distance of 36 to 12 millimeters, and magnification of 30× to 15,000×.

Figure 14:
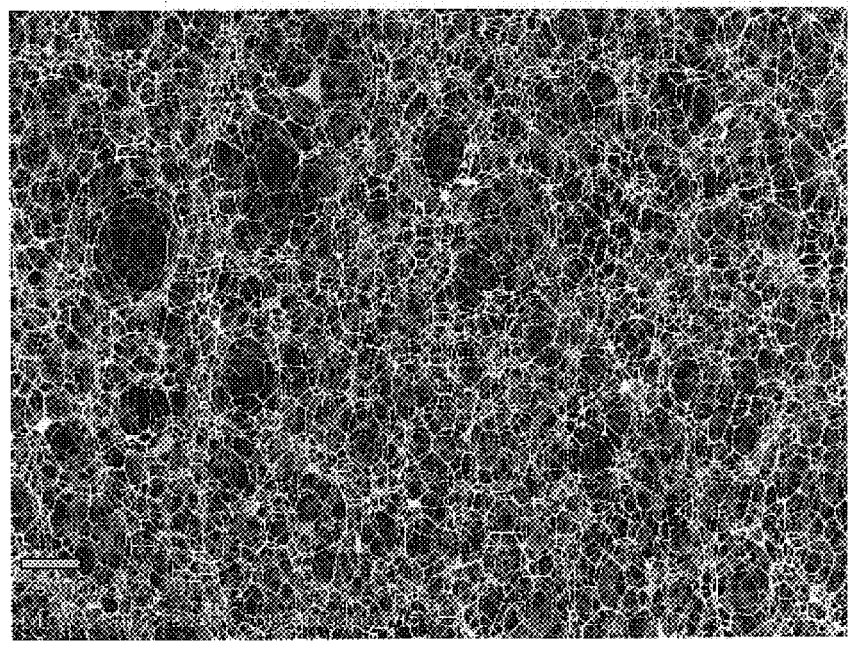
FIG. 14 is an SEM photomicrograph at 30× magnification of a razor-cut cross-sectional surface of a commercial melamine-based foam sample showing a substantially uniform network of interconnected filaments.
Figure 15:
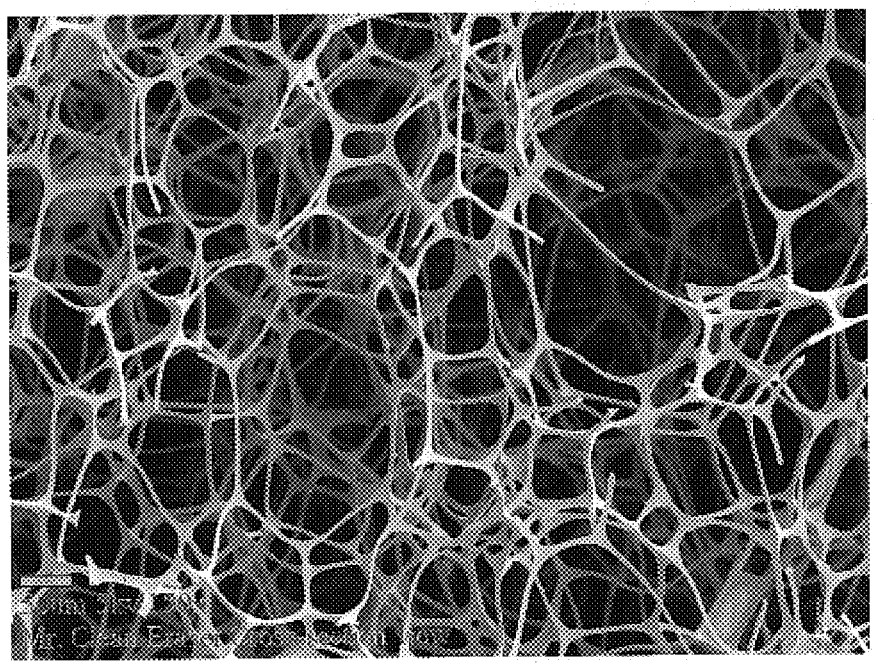
FIG. 15 is an SEM photomicrograph at 150× magnification of a razor-cut cross-sectional surface of a commercial melamine-based foam sample.

FIG. 14 is an SEM photomicrograph at 30× magnification of a razor-cut cross-sectional surface of the melamine-based foam sample showing a substantially uniform network of interconnected filaments. FIG. 15 is similar but at magnification of 150×. As shown in FIGS. 14 and 15, SEM analysis of the interior shows that the structure consists of a 3-D network of interconnected filaments defining open cells in the foam. Size is not uniform, as shown in FIG. 15.

Figure 16:
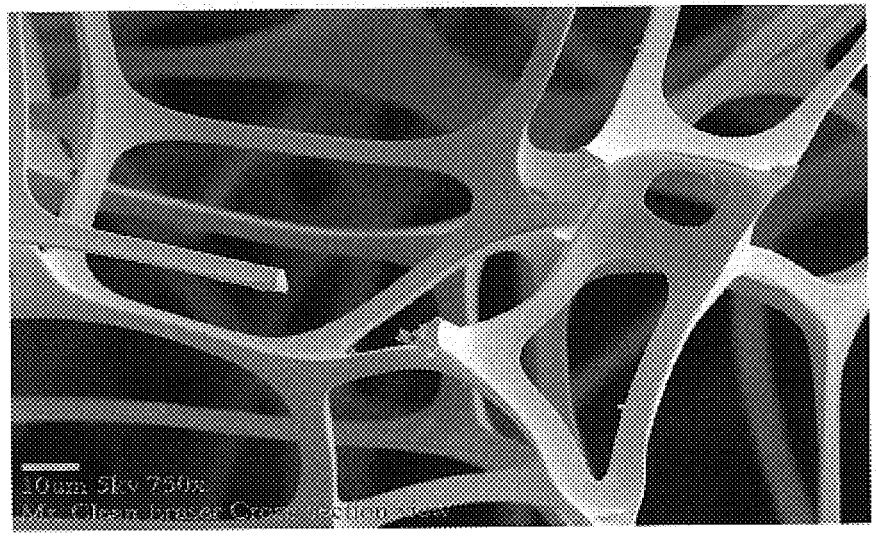
FIG. 16 is an SEM photomicrograph at 750× magnification of a razor-cut cross-sectional surface of a commercial melamine-based foam sample.

FIG. 16 is an SEM photomicrograph at 750× magnification of the melamine-based foam sample. As shown in FIG. 16, the individual filaments are substantially triangular in cross-section and about 5 μm to 10 μm thick.

Figure 17:
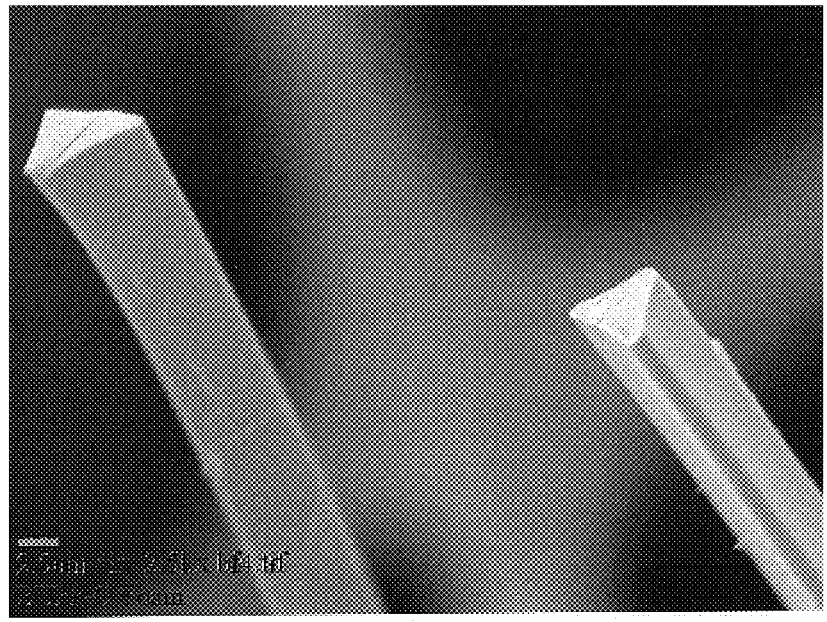
FIG. 17 is an SEM photomicrograph at 2,000× magnification showing razor-cut struts of a commercial melamine-based foam sample.
Figure 18:
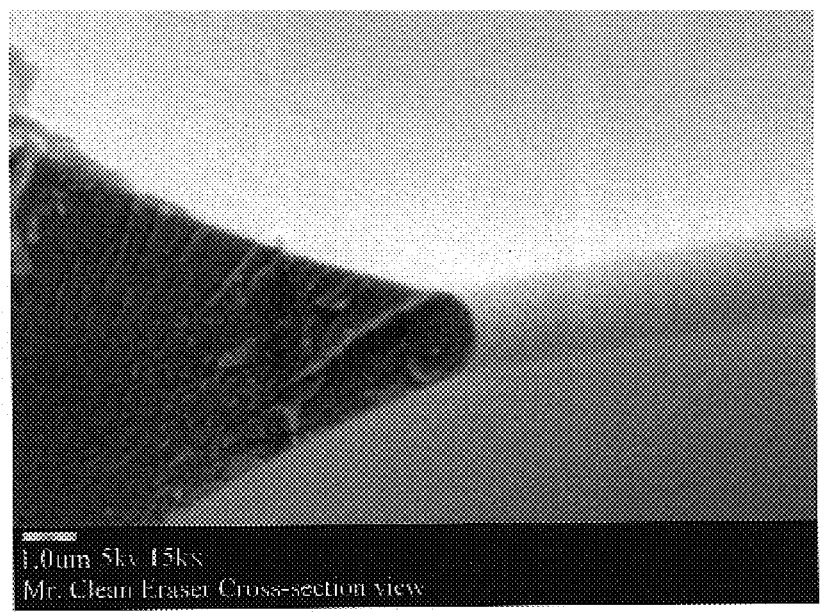
FIG. 18 is an SEM photomicrograph at 15,000× magnification of a razor-cut strut of a commercial melamine-based foam sample.

FIG. 17 is an SEM photomicrograph illustrating the triangular cross-sectional shape of two struts. FIG. 18 is an SEM photomicrograph at 15,000× magnification showing a highly magnified portion of a razor cut filament (strut) in the open-cell foam. FIG. 18 shows that the filament surfaces appear to be smooth, and that the interior is substantially solid. In general, the struts that form the open-cell network have an effective diameter of about 5 to 7 microns. The cells formed by the struts range from about 50-200 microns in size, with a few significantly larger voids scattered about.

Figure 19:
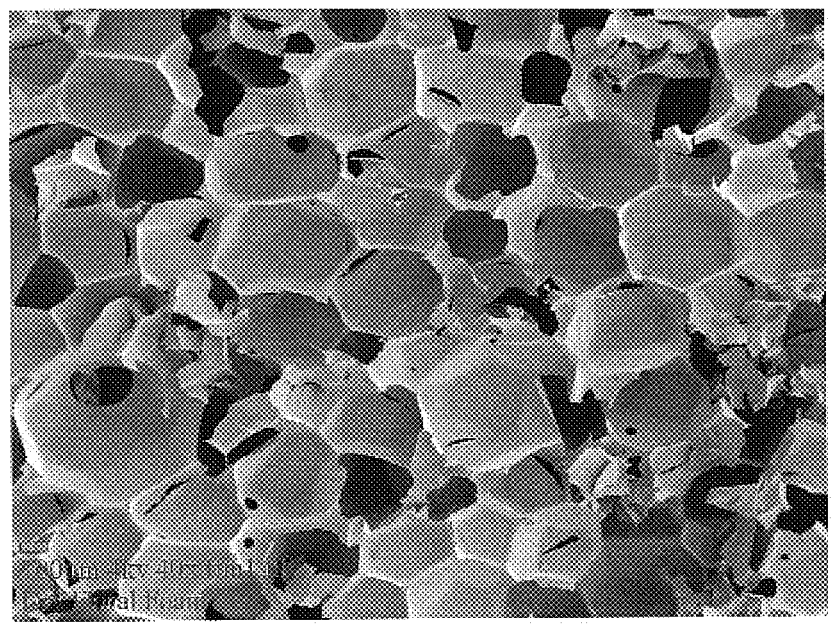
FIG. 19 is an SEM micrograph at 40× magnification of a green floral foam.

FIG. 19 shows an SEM micrograph at 40× magnification of green floral foam. The foam is a well known commercial green foam marketed as "Dry Floral Foam," manufactured by Oasis Floral Products, a division of Smithers-Oasis Company of Kent, Ohio, commonly used for floral arrangements for silk flowers and dried flowers. Many cells contain thin membranes acting as walls over the sides of many cells, but many openings exist in these walls such that many of the cells can remain open. The struts are estimated to have a characteristic thickness of about 7 to 10 microns, while the membranes are substantially thinner. A characteristic cell size is estimated at about 200 to 800 microns, with many or most cells less than about 600 microns in size. The cells are generally 5 or 6 sided. The cell walls are fairly sharp-edged, which may contribute to its cleaning ability. The foam is also brittle and produces fine, flaky dust when cut or used to rub a surface.

Figure 20:
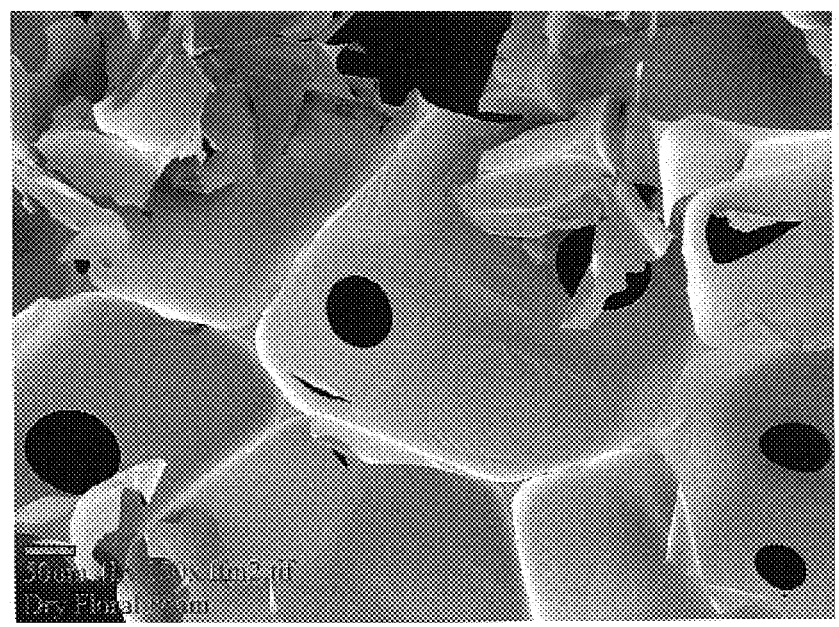
FIG. 20 is an SEM micrograph at 15× magnification of a green floral foam.

FIG. 20 an SEM micrograph of the same sample shown in FIG. 19, but at 150× magnification.

FIG. 21 depicts a cross-sectional view of a cleaning wipe 10 of the present invention in which the cleaning foam layer 12 has a textured three-dimensional surface 38 comprising spaced apart peaks 70 and valleys 72 with a characteristic peak-to-valley height H that can be about any of the following values or greater: 0.2 millimeters (mm), 0.4 mm, 0.6 mm, 0.8 mm, 1 mm. 1.5 mm, 2 mm, 3 mm, 4 mm, or 5 mm.

FIG. 22 depicts a cross-sectional view of the cleaning wipe 10 of the present invention in which the foam 12 has a three-dimensional outer surface 38 with a first set of peaks 70 and valleys 72, and wherein the web 14 has a three-dimensional outer surface 68, which also has a series of peaks 74 and valleys 76, with a characteristic height difference (surface depth) D, that can that can be about any of the following values or greater: 0.2 mm, 0.3 mm, 0.4 mm, 0.5 mm, 0.6 mm, 0.8 mm, 1 mm, 1.5 mm, and 2 mm. Alternatively, the surface depth D of the fibrous web 14 or the peak-to-valley height H of the foam layer 12 can be less than any of the following values: 5 mm, 2 mm, 1 mm, 0.5 mm, 0.3 mm, 0.2 mm, and 0.1 mm.

Figure 23:
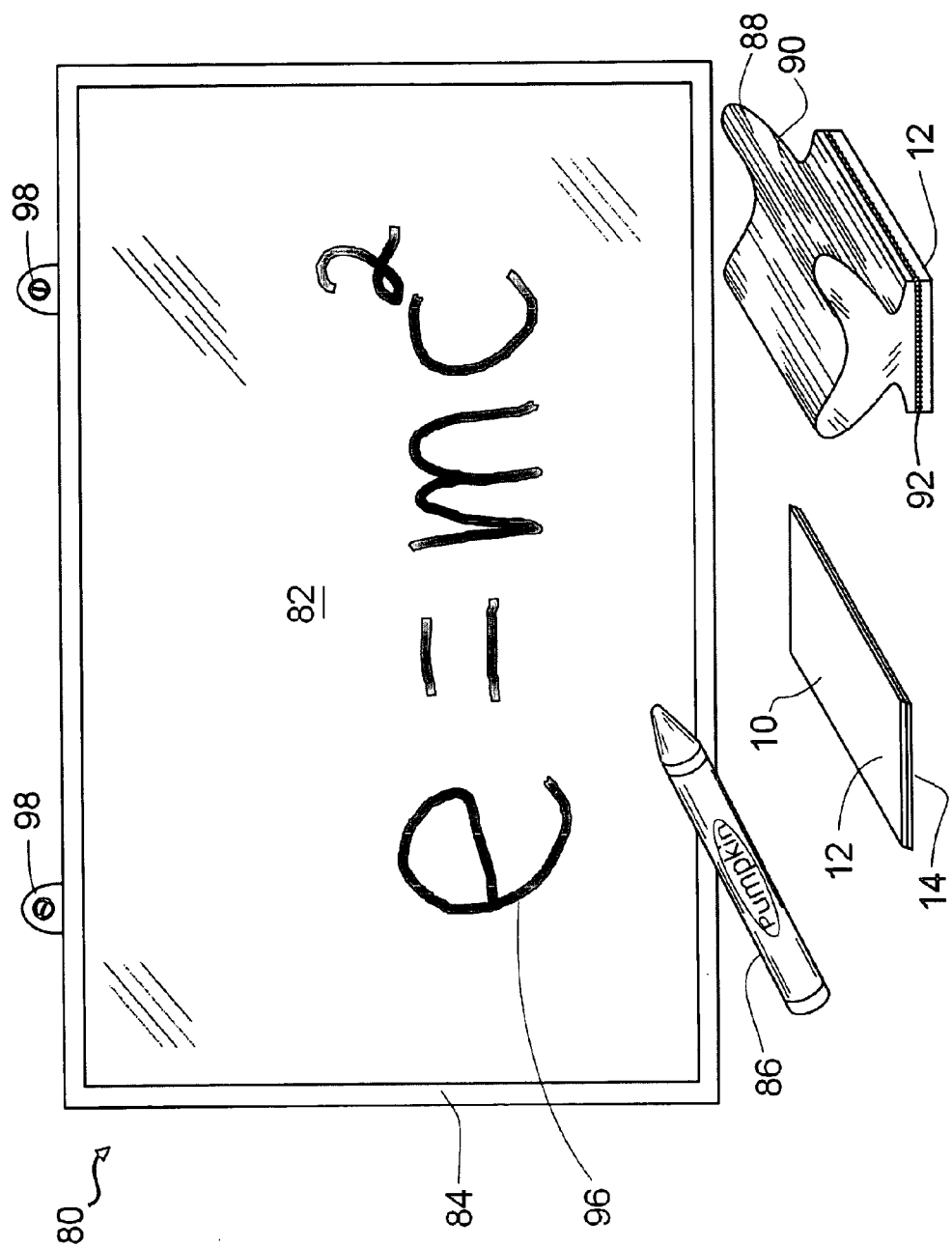
FIG. 23 depicts a dry-erase system using wipes or an eraser comprising a cleaning foam.

FIG. 23 depicts a dry-erase system 80 in which conventional eraser systems are replaced with a foam-based eraser 88 comprising a thin layer of a cleaning foam 12 associated with a handle 90 via restraining means 92 which can be hooks from a hook and loop system or a cut-loop hook-like material from Velcro USA (Manchester, N.H.). The restraining means 92 holds the foam layer 12 in place against shear forces during wiping of dry erase board 82. The dry-erase board can be made without the glossy polymeric coating in conventional dry-erase systems, such that the board maintains sufficient surface roughness and other surface properties to readily receive crayon markings, in contrast to conventional dry-erase boards, in which the coating provided generally makes it difficult to mark the board with a crayon. The dry erase board 82 is mounted in a frame 84 with fastening means 98 (e.g., screws in mounting brackets) for attachment to a wall. A crayon 86 or other marker can be used to provide readily visible writing 96 on the board 82. The writing 96 can be removed by using the easy-to-grip eraser 88 or by simply wiping a cleaning wipe 10 across the board 82, the cleaning wipe comprising a cleaning foam 12 joined to a reinforcing web 14. In the dry-erase system 80, the eraser 88 may be mounted on a ledge (not shown) or other holding means associated with the dry-erase system 80. Likewise, replacement layers of foam 12 or additional wipes 10 may be held in a box (not shown) or other device associated with the dry-erase system 80 for conveniently providing a plurality of the disposable wipes 10.

Figure 30:
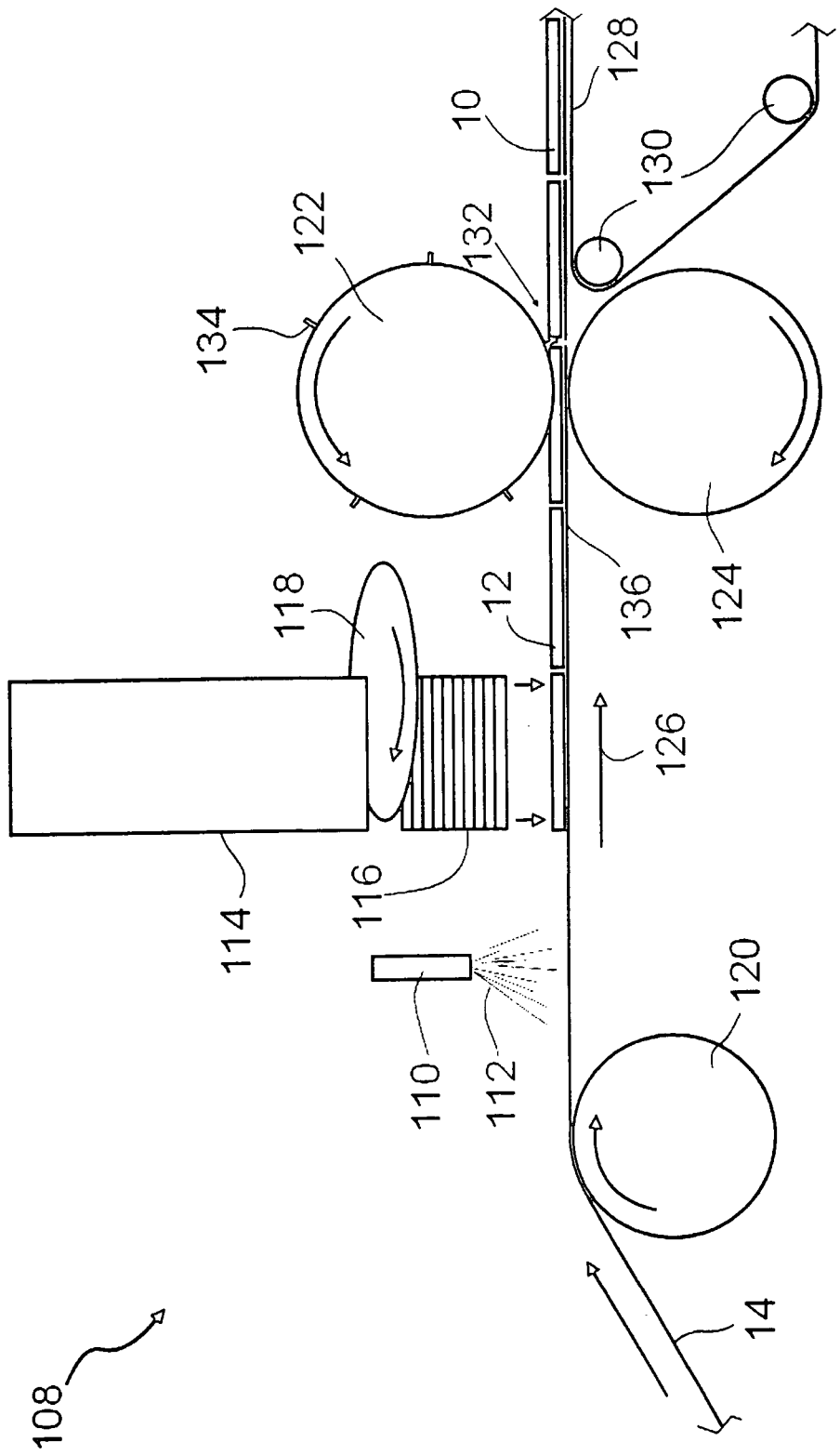
FIG. 30 is a schematic view of a method of manufacturing a cleaning wipe in accordance with one exemplary embodiment of the present invention.

FIG. 30 depicts a process 108 for making the cleaning wipes 10 of the present invention. Here a continuous reinforcing web 14 passes over a guide roll 120 and receives an adhesive spray 112 delivered by a spray nozzle 110. The adhesive may be a hot melt or reactive adhesive that cures chemically, or other adhesives known in the art. A foam block 114 is cut into a stack 116 of individual thin foam layers 12 which are then placed on the adhesive-treated side of the reinforcing web 14 to form a foam-web composite 136. As depicted, a rotary saw blade 118 cuts the foam block 114, but cutting of the foam may be done by any means, include cutting wires, blades, laser cutting, automated meat slicers, and the like. After the foam layer 12 is joined to the reinforcing web 14, the foam-web composite 136 is then cut into discrete sections in a die cutting nip 132 comprising a die cutting roll 122 with elevated die cutting blades 134, in cooperative association with an opposing roll 124. One or both of the rolls 122, 124 may also provide pneumatic passageways (not shown) to provide air pressure or vacuum pressure to a portion of the foam-web composite layer 136 as it passes through the nip 132 for improved handling. Mechanical and/or pneumatic pressure in the nip 132 can improve the attachment of the web 14 to the foam layer 12 and, in some embodiments, help drive adhesive material further into either the foam 12 or reinforcing web 14 for better attachment. After passing through the nip 132, the discrete cleaning wipes 10 can be carried by a carrier wire 128 that is guided by carrier wire rolls 130 to bring the wipes into a converting and packaging section (not shown) where the wipes may be provide in cartons, flexible packages, vacuum-packed enclosures (such that the foam layer is compressed by atmospheric pressure until the package is opened), and the like. They may also be joined with other products and materials, such as pouches or packets of cleaning agents, separate tissue layers, wet wipes, spray bottles, bleach applicators, furniture polish, biosensors and bacteria indicators, antimicrobial agents, protective gloves, lotions, fragrance, etc. In the converting and packaging section or elsewhere in the process, many of the aforementioned agents can also be added directly to a portion of the cleaning wipe, if desired, either by direct addition or by other means such as encapsulation prior to addition to keep the active material encapsulated until the product is used.

The foam layer 12 may be substantially longer in length than the final cleaning wipes 10. In this case, cutting of the foam-web composite 136 may cut each individual foam layer from the foam stack 116 into two, three, or more sections, in contrast to the depicted embodiment in which the foam sections 12 are not cut in the nip. In any embodiment, however, further cutting or trimming of the cleaning wipes 10 or any components thereof may be done to provide desired sizes and shapes. The packaged cleaning wipes 10 need not be rectangular in shape, but may be circular, elliptical, annular, dogbone shaped, triangular, zig-zagged, W-shaped, rounded rectangles, sinuous, and the like. Multiple cleaning wipes 10 may be joined on to another in a separable manner (not shown, but see FIG. 5 for a related embodiment), such that a foam cleaning surface can be repeatedly renewed by peeling off an exterior wipe to reveal a fresh cleaning wipe 10.

Several alternatives to the process in FIG. 30 can be considered. The die cutting nip 132, for example, can be replaced with a perforating nip that does not completely sever the reinforcing web 14, but perforates it so that the foam-web composite 136 remains intact for conversion to roll form (not shown) in order to provide a thin, flexible towel-like product that can be dispensed like known paper towels to provide detachable cleaning wipes.

In another alternative, the adhesive 112 could be applied to a foam layer 12 before it is joined to the reinforcing web 114, rather than (or in addition to) applying the adhesive to the reinforcing web 114.

In another alternative (also not shown), the cutting of the foam block 114 occurs after an end of the foam block 114 has been adhesively joined to the reinforcing web 14. In this manner, very thin foam layers 12 can be provided with reduced risk of failure during handling because reinforcement is always present. In such a process, adhesive may be applied to either the reinforcing web 14 or the foam block 114 or both before the two are combined, followed by cutting to create a thing foam layer 12 already joined to the reinforcing web 14.

In another embodiment (not shown), the foam layer 12 may be attached to a first reinforcing layer, such as a thin meltblown or spunbond web, prior to attachment to a second reinforcing layer. Joining of the foam to the first reinforcing layer may be done in a batch process or a continuous process that is either part of the online process 108 for making cleaning wipes 10, or is a process that is done offline. Thus, in one embodiment, the stack 116 of foam layers 12 could be a stack of foam layers 12 already joined to a first reinforcing web (not shown), which is then subsequently joined to a second reinforcing web 14.

EXAMPLE 1

Cleaning Pads on a Pilot Line

A set of cleaning pads according to the present invention were made by laminating melamine-based foam layers to reinforcing webs using a hot melt adhesive applied on a pilot meltblown device. Two different kinds of reinforcing layers were used, a commercial VIVA® paper towel web (Kimberly-Clark Corp., Dallas, Tex.) and an 0.55 ounce per square yard (osy) polypropylene spunbond web (Kimberly-Clark Corp., Lexington Mill, Lexington, Ky.). Sliced melamine foam samples were manually taped onto a moving carrier fabric (a spunbond web that was not to be joined to the foam, but served merely as a carrier for application of the adhesive) traveling at a speed of about 50 feet per minute. The moving fabric brought the foam samples beneath a meltblown nozzle through which a fine spray of a polypropylene-based hot melt adhesive comprising Eastman P1023 Polypropylene made by Eastman Chemical Company (Kingsport, Tenn.) and about 10% DPX 584 elastomer from Dexco Polymers of Exxon Mobil Chemical Company (Houston, Tex.). The holt melt adhesive was applied at a basis weight of about 20 grams per square meter for joining to VIVA® paper towel and 10 grams per square meter for joining to the spunbond web. After the meltblown hotmelt was applied to the foam, the adhesive-treated side was immediately joined to the reinforcing web deployed from a roll, and contact was secured by passing both into an unloaded nip between two rotating rolls that brought the two materials into contact under mild pressure to avoid damage to the foam.

To produce thin layers of melamine-based foam, a commercial block of BASOTECT® foam (BASF, Ludwigshafen, Germany) was obtained through the purchase of a MR. CLEAN® Magic Eraser (Procter and Gamble, Cincinnati, Ohio), said to be a formaldehyde-melamine-sodium bisulfite copolymer. This melamine-based foam is believed to be BASOTECT® 3012, which has been densified under load at elevated temperature to a density of about 0.009 g/cc (9 kg/m³). The block was cut into thin slices (typically 2 mm thick) using a commercial meat slicer (Chef's Choice VariTilt Model 632, EdgeCraft Corp., Avondale, Pa., UPC 087877632008).

Figure 24:
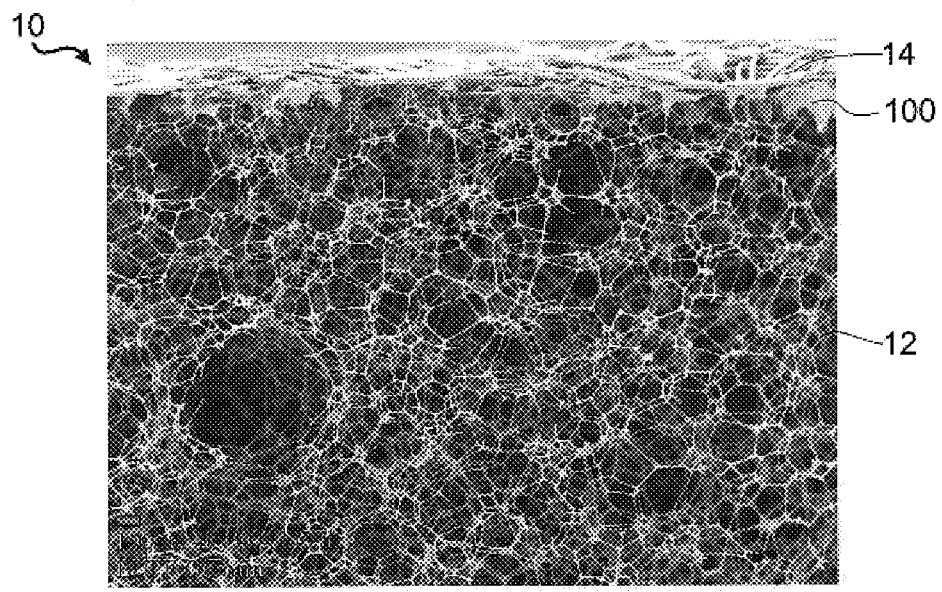
FIG. 24 is an SEM micrograph at 40× magnification of a cross-section of a cleaning wipe comprising melamine foam attached to a spunbond web.
Figure 25:
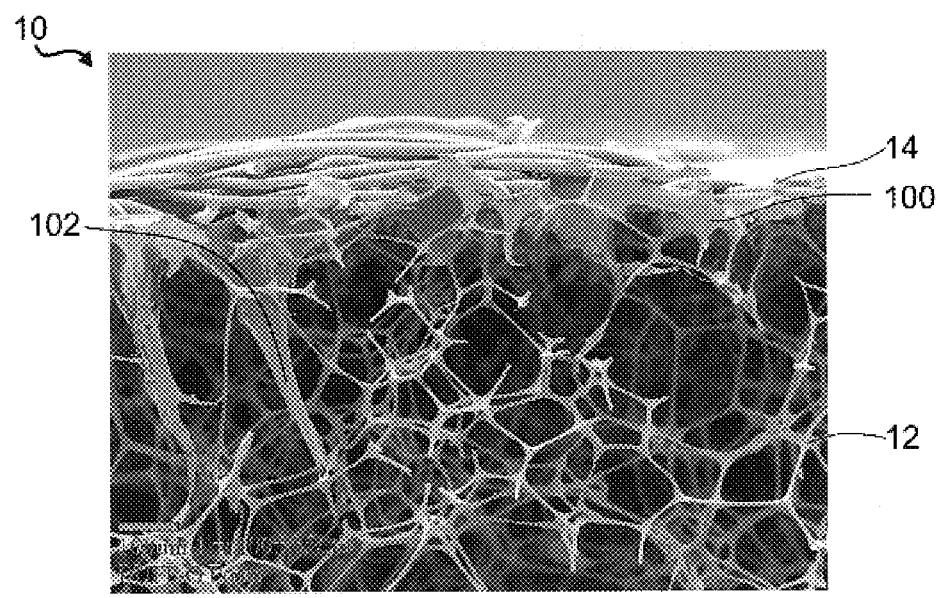
FIG. 25 is an SEM micrograph at 100× magnification of a cross-section of a cleaning wipe comprising melamine foam attached to a spunbond web.

The foam strips cut from the MR. CLEAN® product had the same planar dimensions as the product, 2.5 inches×4.75 inches. In making the samples, the major axis of the foam (the direction spanning 4.75 inches) was aligned with the machine direction of the reinforcing web. The thickness of the foam layers typically ranged from 2 mm to about 8 mm, though other thickness ranges are to be considered within the scope of some versions of the present invention. FIG. 24 shows a 40×SEM view of a cross-section of a cleaning wipe 10 comprising melamine foam 12 from the MR. CLEAN® product joined to a spunbond web 14 with meltblown adhesive material 100. FIG. 25 shows the same sample at 100× magnification. In FIG. 25, some portions of the adhesive material 100 form "stringers" 102 that extend into the foam 12 by a distance greater than the characteristic cell size of the foam (here the penetration depth is roughly 1.5 to 2 times a typical cell size).

Figure 26:
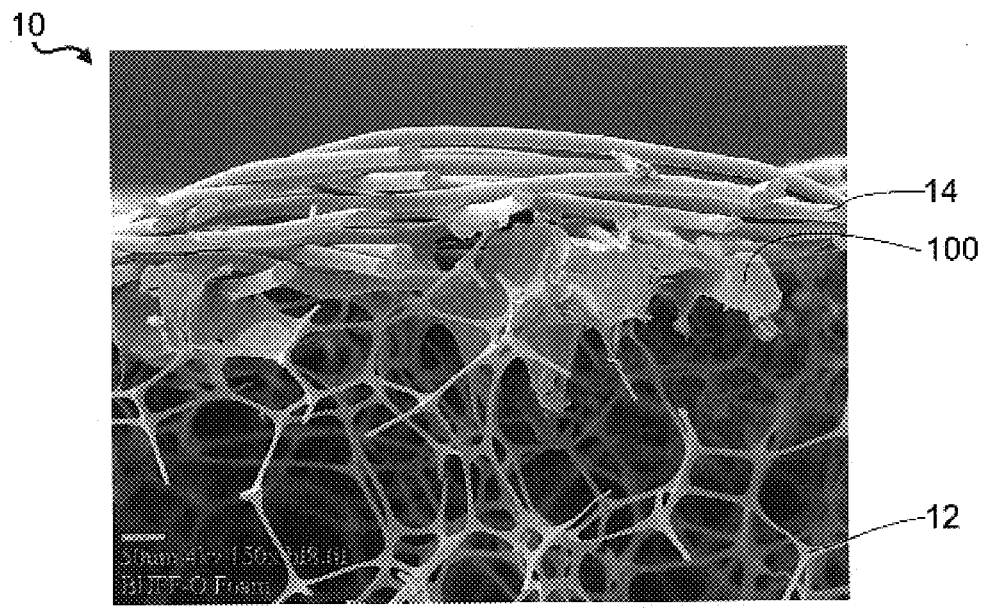
FIG. 26 is an SEM micrograph at 150× magnification of a cross-section of a cleaning wipe comprising melamine foam attached to a spunbond web.
Figure 27:
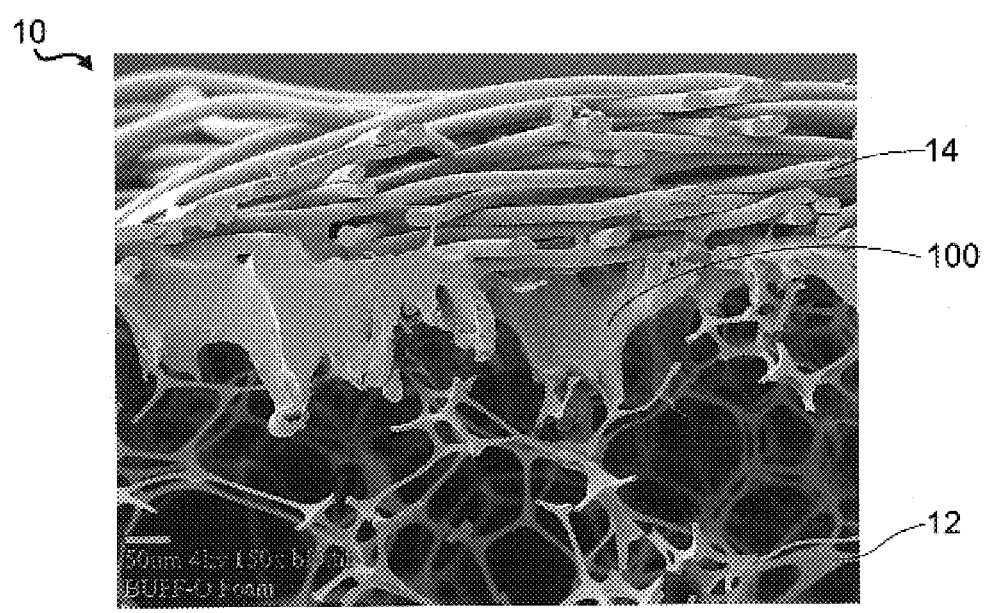
FIG. 27 is an SEM micrograph at 150× magnification of a cross-section of a cleaning wipe comprising melamine foam attached to a spunbond web.

FIGS. 26 and 27 show similar samples at 150× magnification.

The cleaning wipe samples, each having dimensions of 4.75 inches×2.5 inches and an area of 11.9 square inches, were then tested according to the Zwick Flexibility test. The reinforcing web materials unbonded to foam were also tested, as were slices of the MR. CLEAN® foam unbonded to the reinforcing web and 2-mm thick slices of BASOTECT® 2011 foam. All samples were conditioned at 23° C. and 50% relative humidity for a minimum of 4 hrs. prior to testing. Results are shown in Table 2 below. Note that the addition of the spunbond layer, which by itself is too drapable to yield a measurable flexibility modulus, gave a significant increase in Zwick Flexibility Modulus (E) of the foam when the two are joined. The adhesive material contributes to the flexibility. It is believed that even lower bending stiffness values of the cleaning wipe could be obtained by using less adhesive or a more flexible or elastomeric adhesive, or by using other bonding methods such as application of adhesive in a spaced-apart pattern, sewing, ultrasonic bonding with a spunbond web in a spaced apart pattern, etc.

TABLE 2

Zwick Flexibility properties of foam wipes for several different implementations of the invention.

| Sample ID | Weight (g) | Caliper 0.05 psi (mm) | Density g/cc | Peak Load (g) | Max Slope (g/mm) | Slope (N/m) | Modulus E (KPa) | E (psi) | Bending Stiffness (Nm) | Basis Weight gsm |
|---|---|---|---|---|---|---|---|---|---|---|
| MR. CLEAN ® Slices | 0.13 | 1.93 | 0.009 | 12 | 7 | 69 | 1829 | 265 | 0.0011 | 17 |
| 2 mm thick | 0.13 | 1.96 | 0.009 | 12 | 7 | 69 | 1746 | 253 | 0.0011 | 17 |
| (BASOTECT ® 3012) | 0.13 | 1.93 | 0.009 | 11 | 6 | 59 | 1577 | 229 | 0.0009 | 17 |
| | 0.13 | 1.94 | 0.009 | 10 | 6 | 59 | 1544 | 224 | 0.0009 | 17 |
| | 0.14 | 2.09 | 0.009 | 13 | 7 | 69 | 1460 | 212 | 0.0011 | 18 |
| Mean | 0.13 | 1.97 | 0.009 | 12 | 7 | 65 | 1631 | 237 | 0.0010 | 17 |
| Standard Deviation | 0.00 | 0.06 | 0.000 | 1 | 1 | 5 | 152 | 22 | 0.0001 | 1 |
| MR. CLEAN ® + VIVA ® | 0.83 | 2.67 | 0.041 | 47 | 22 | 216 | 2185 | 317 | 0.0035 | 108 |
| VIVA ® side up | 0.83 | 2.61 | 0.042 | 48 | 22 | 216 | 2339 | 339 | 0.0035 | 108 |
| | 0.84 | 2.73 | 0.040 | 57 | 25 | 245 | 2322 | 337 | 0.0039 | 110 |
| | 0.84 | 2.77 | 0.040 | 57 | 25 | 245 | 2223 | 322 | 0.0039 | 110 |
| | 0.84 | 2.78 | 0.039 | 60 | 26 | 255 | 2287 | 332 | 0.0041 | 110 |
| Mean | 0.84 | 2.71 | 0.040 | 54 | 24 | 235 | 2271 | 329 | 0.0038 | 109 |
| Standard Deviation | 0.01 | 0.07 | 0.001 | 6 | 2 | 18 | 66 | 10 | 0.0003 | 1 |
| MR. CLEAN ® + VIVA ® | 0.83 | 2.67 | 0.041 | 33 | 13 | 128 | 1291 | 187 | 0.0020 | 108 |
| VIVA ® side down | 0.83 | 2.61 | 0.042 | 33 | 13 | 128 | 1382 | 200 | 0.0020 | 108 |
| | 0.84 | 2.73 | 0.040 | 33 | 13 | 128 | 1208 | 175 | 0.0020 | 110 |
| | 0.84 | 2.77 | 0.040 | 35 | 14 | 137 | 1245 | 181 | 0.0022 | 110 |
| | 0.84 | 2.78 | 0.039 | 35 | 14 | 137 | 1232 | 179 | 0.0022 | 110 |
| Mean | 0.84 | 2.71 | 0.040 | 34 | 13 | 131 | 1271 | 184 | 0.0021 | 109 |
| Standard Deviation | 0.01 | 0.07 | 0.001 | 1 | 1 | 5 | 69 | 10 | 0.0001 | 1 |
| MR. CLEAN ® + Spnbd. | 0.35 | 2.04 | 0.022 | 53 | 30 | 294 | 6679 | 969 | 0.0047 | 46 |
| Spunbond side up | 0.36 | 2.00 | 0.023 | 55 | 33 | 324 | 7796 | 1131 | 0.0052 | 47 |
| | 0.34 | 1.93 | 0.023 | 43 | 28 | 275 | 7361 | 1068 | 0.0044 | 44 |
| | 0.34 | 2.02 | 0.022 | 50 | 29 | 284 | 6650 | 964 | 0.0046 | 44 |
| | 0.38 | 2.23 | 0.022 | 59 | 32 | 314 | 5454 | 791 | 0.0050 | 50 |
| Mean | 0.35 | 2.04 | 0.023 | 52 | 30 | 298 | 6788 | 985 | 0.0048 | 46 |
| Standard Deviation | 0.02 | 0.11 | 0.001 | 6 | 2 | 20 | 888 | 129 | 0.0003 | 2 |
| MR. CLEAN ® + Spnbd. | 0.36 | 2.00 | 0.023 | 29 | 15 | 147 | 3544 | 514 | 0.0024 | 47 |
| Spunbond side down | 0.34 | 1.93 | 0.023 | 32 | 15 | 147 | 3944 | 572 | 0.0024 | 44 |
| | 0.34 | 2.02 | 0.022 | 29 | 14 | 137 | 3210 | 466 | 0.0022 | 44 |
| | 0.38 | 2.23 | 0.022 | 30 | 14 | 137 | 2386 | 346 | 0.0022 | 50 |
| Mean | 0.36 | 2.05 | 0.023 | 42 | 19 | 142 | 3271 | 474 | 0.0023 | 46 |
| Standard Deviation | 0.02 | 0.13 | 0.001 | 1 | 1 | 6 | 662 | 96 | 0.0001 | 2 |
| VIVA ® | 0.50 | 0.75 | 0.087 | 2 | 1 | 10 | 4480 | 650 | 0.0002 | 65 |
| (wire side up, as on | 0.51 | 0.78 | 0.085 | 2 | 1 | 10 | 3983 | 578 | 0.0002 | 67 |
| wipe) | 0.49 | 0.76 | 0.084 | 2 | 1 | 10 | 4306 | 624 | 0.0002 | 64 |
| | 0.49 | 0.77 | 0.083 | 2 | 1 | 10 | 4140 | 600 | 0.0002 | 64 |
| | 0.48 | 0.77 | 0.081 | 2 | 1 | 10 | 4140 | 600 | 0.0002 | 63 |
| Mean | 0.49 | 0.77 | 0.084 | 2 | 1 | 10 | 4210 | 611 | 0.0002 | 64 |
| Standard Deviation | 0.01 | 0.01 | 0.002 | 0 | 0 | 0 | 189 | 27 | 0.0000 | 1 |
| Spunbond | 0.12 | 0.06 | 0.261 | 1 | NA | NA | NA | NA | NA | 16 |
| | 0.12 | 0.06 | 0.261 | 1 | NA | NA | NA | NA | NA | 16 |

TABLE 2-continued

Zwick Flexibility properties of foam wipes for several different implementations of the invention.

| Sample ID | Weight (g) | Caliper 0.05 psi (mm) | Density g/cc | Peak Load (g) | Max Slope (g/mm) | Slope (N/m) | Modulus E (KPa) | E (psi) | Bending Stiffness (Nm) | Basis Weight gsm |
|---|---|---|---|---|---|---|---|---|---|---|
| | 0.13 | 0.07 | 0.242 | 1 | NA | NA | NA | NA | NA | 17 |
| | 0.13 | 0.07 | 0.242 | 1 | NA | NA | NA | NA | NA | 17 |
| | 0.13 | 0.07 | 0.242 | 1 | NA | NA | NA | NA | NA | 17 |
| Mean | 0.13 | 0.07 | 0.250 | 1 | NA | NA | NA | NA | NA | 16 |
| Standard Deviation | 0.01 | 0.01 | 0.010 | 0 | NA | NA | NA | NA | NA | 1 |
| BASOTECT ® 2011 2 mm thick | 0.12 | 1.75 | 0.009 | 5 | 3 | 29 | 1058 | 153 | 0.0005 | 16 |
| | 0.12 | 1.74 | 0.009 | 5 | 3 | 29 | 1076 | 156 | 0.0005 | 16 |
| | 0.12 | 1.84 | 0.009 | 7 | 4 | 39 | 1214 | 176 | 0.0006 | 16 |
| | 0.14 | 1.78 | 0.010 | 7 | 4 | 39 | 1341 | 194 | 0.0006 | 18 |
| | 0.15 | 1.84 | 0.011 | 8 | 4 | 39 | 1214 | 176 | 0.0006 | 20 |
| Mean | 0.13 | 1.79 | 0.009 | 6 | 4 | 35 | 1180 | 171 | 0.0006 | 17 |
| Standard Deviation | 0.01 | 0.05 | 0.001 | 1 | 1 | 5 | 116 | 17 | 0.0001 | 2 |

In Table 2, results are shown for the overall density of the product under a load of about 0.05 psi. The product density can range from about 0.01 to about 0.1 g/cc, such as from about 0.02 to about 0.08 g/cc. The basis weight of the combined product (foam, adhesive, and reinforcing layer) ranged from about 40 gsm to about 110 gsm in the samples that were tested, though much broader ranges are within the scope of the present invention. For example, the basis weight could range from about 15 gsm to about 400 gsm, or from about 25 gsm to about 300 gsm, or from about 25 gsm to about 300 gsm, or from about 25 gsm to 200 gsm, or from about 30 gsm to about 150 gsm. Higher basis weights can be achieved by using a heavier reinforcement layer, such as two layers of VIVA® towel joined together, or a heavier foam layer, or using additional components such as adhesive or other additives. Basis weight is typically measured in a dry state under TAPPI conditions (23° C. and 50% relative humidity).

The bending stiffness values according to the Zwick Flexibility test range from about 0.002 Nm to about 0.005 Nm for the wipes having a reinforcing layer joined to a 2-mm thick layer of foam. Given the expected relationship between bending stiffness and thickness, it is believed that substantially thicker samples still within the scope of the present invention could have significantly higher bending stiffness values, such as up to about 0.4 Nm or about 0.05 Nm and still be effective for many cleaning purposes. Further, increased bending stiffness could be achieved by using a heavier basis weight of adhesive or a stiffer reinforcing layer.

The samples were also tested for tensile properties, again after being conditioned at 23° C. and 50% relative humidity for at least four hours. Mean tensile results are shown in Table 3, which also includes mean stiffness results from the Zwick Flexibility tests previously described. Tensile testing was conducted on an MTS Alliance RT/1 tensile tester (MTS Corp., Eden Prairie, Minn.) running with TestWorks® 4 Universal Testing Software for Electromechanical Systems, also of MTS Corporation. For tensile testing, a 1-inch wide sample was mounted between 1.5-inch wide jaws with a 2-inch jaw span (gage length). The crosshead speed was 10 inches per minute. Web strips were cut in the machine direction. In wet tensile testing, the sample was gently bent to form a loop in the center that was dipped in deionized water, such that a central region about 1-inch long was immersed. Excess water was removed by gentle blotting, and then the sample was mounted between the jaws with the wetted region roughly centered between the jaws, followed by tensile testing.

TABLE 3

Summary of physical properties of foam wipes for several different implementations of the invention.

| Sample ID | Basis Wt. gsm | Bending Stiffness Nm | Caliper 0.05 psi mm | Density g/cc | Tensile Wet/Dry % | Tensile Dry gm/1" | Tensile Wet gm/1" | % Stretch Dry | % Stretch Wet |
|---|---|---|---|---|---|---|---|---|---|
| MR. CLEAN ® Slices, 2 mm (BASOTECT ® 3012) | 17 | 0.0010 | 1.97 | 0.0086 | 90 | 525 | 475 | 21.0 | 22.0 |
| MR. CLEAN ® + VIVA ® | | | | | 60 | 1683 | 1003 | 29.6 | 29.3 |
| VIVA ® side up | 109 | 0.0038 | 2.71 | 0.0402 | | | | | |
| VIVA ® side down | 109 | 0.0021 | 2.71 | 0.0402 | | | | | |
| MR. CLEAN ® + Spunbond | | | | | 85 | 3015 | 2566 | 31.2 | 28.2 |
| Spunbond side up | 46 | 0.0048 | 2.04 | 0.0225 | | | | | |
| Spunbond side down | 46 | 0.0023 | 2.05 | 0.0224 | | | | | |
| VIVA ® | 64 | 0.0002 | 0.77 | 0.0831 | 53 | 360 | 192 | 18.6 | 17.7 |
| Spunbond | 16 | — | 0.07 | 0.2286 | 103 | 1883 | 1941 | 27.2 | 35.5 |
| BASOTECT ® 2011, 2 mm | 17 | 0.0006 | 1.79 | 0.0095 | 117 | 168 | 197 | 10.7 | 13.4 |

The results in Table 3 indicate that in the cleaning wipes of the present invention, only a small portion of overall tensile strength came from the foam layer. The combination of the adhesive plus the fibrous web can significantly strengthen the cleaning wipe relative to a foam layer alone, especially for thin foam layers. The overall dry or wet tensile strength of a cleaning wipe tested in a 1-inch strip with a 2-inch jaw span can be over 600 grams, such as about 800 grams or greater, about 1000 g or higher, about 1500 grams or higher, about 2000 grams or higher, or about 2500 grams or higher. Wet and dry tensile strength can also be below about 10,000 grams (when tested for a 1-inch strip with a 2-inch jaw span), such as below about 7,000 grams or below about 5,000 grams. In some embodiments of the present invention, it is believed that the combination of high wet tensile strength (about 800 grams or greater, for a 1-inch wide strip) coupled with a low bending stiffness such as about 0.05 Nm or less, or 0.01 Nm or less, can result in a product with good durability in use and with excellent flexibility for reaching confined spaces or narrow recesses that might be missed with stiffer cleaning materials.

Samples with spunbond and VIVA© paper towel reinforcement layers were also tested for tactile perception. Results are shown in Tables 4 and 5 below:

TABLE 4

Wire Mesh Tactile Sensitivity results for cleaning wipes with a spunbond reinforcement layer.

| Subject | Mesh Discr. | Wire Mesh Tactile Sensitivity | Normalized Wire Mesh Tactile Sensitivity | Corrugated Tactile Sensitivity | Normalized Corrugated Tactile Sensitivity |
|---|---|---|---|---|---|
| 1 | 80 | 375 | 335 | 415 | 371 |
| 2 | 100 | 435 | 435 | 405 | 405 |
| 3 | 100 | 465 | 465 | 375 | 375 |
| 4 | 150 | 215 | 263 | 285 | 349 |
| 5 | 80 | 265 | 237 | 405 | 362 |
| 6 | 80 | 285 | 255 | 395 | 353 |
| 7 | 150 | 235 | 288 | 115 | 141 |
| Mean | | 325 | 325 | 342 | 337 |
| St. Dev. | | 92 | 84 | 101 | 82 |
| Ratio | | 0.284 | 0.259 | 0.296 | 0.243 |

TABLE 5

Wire Mesh Tactile Sensitivity results for cleaning wipes with a VIVA ® paper towel reinforcement layer.

| Subject | Mesh Discr. | Wire Mesh Tactile Sensitivity | Normalized Wire Mesh Tactile Sensitivity | Corrugated Tactile Sensitivity | Normalized Corrugated Tactile Sensitivity |
|---|---|---|---|---|---|
| 1 | 80 | 315 | 282 | 455 | 407 |
| 2 | 100 | 255 | 255 | 315 | 315 |
| 3 | 100 | 365 | 365 | 335 | 335 |
| 4 | 150 | 245 | 300 | 315 | 386 |
| 5 | 80 | 175 | 157 | 395 | 353 |
| 6 | 80 | 285 | 255 | 365 | 326 |
| 7 | 150 | 245 | 300 | 145 | 178 |
| Mean | | 269 | 273 | 332 | 329 |
| St. Dev. | | 56 | 59 | 89 | 69 |
| Ratio | | 0.207 | 0.215 | 0.269 | 0.209 |

In general, the wipes tested can be characterized as having a Wire Mesh Tactile Sensitivity value of about 1000 or less, more specifically about 600 or less, and most specifically about 500 or less or 400 or less. The same can be said of the Normalized Wire Mesh Tactile Sensitivity, the Corrugated Tactile Sensitivity, and the Normalized Corrugated Tactile Sensitivity. Attempts to perceive the texture of either the corrugate metal plate or the 30-mesh wire through the thickness of the MR. CLEAN® melamine foam pad failed because the texture was not discernible at the upper limit of the balance, 2100 grams of force.

EXAMPLE 2

Hand-Made Cleaning Pads

Pads similar to those of Example 1 were made, but using a aerosol spray adhesive instead of a meltblown adhesive. The spray adhesive was 3M™ 90 Spray Adhesive (3M Corp., Minneapolis, Minn.). Samples were prepared by applying spray onto a surface of the foam and the pressing it against a tissue web or spunbond web that had also been sprayed with the adhesive and cutting the laminate to size. Samples were made using BASOTECT® 2011 foam (treated by the manufacturer to be hydrophilic) with thicknesses of 2 mm, 3 mm, 5 mm, and 8 mm. Samples were also made using slices cut from the MR. CLEAN® product with a variety of thicknesses (1 mm, 2 mm, and 3 mm). Foams layers from both sources were then adhesively attached to a variety of substrates such as creped tissue, and spunbond webs. A partial listing of specific examples made is set forth below, along with other hand-made examples using other attachment means.

BASOTECT® 2011 foam layers were cut to dimensions of 95 mm×133 mm×2 mm and joined to an 0.5 osy spunbond web using a light application of 3M (Minneapolis, Minn.) 3M™ Hi-Strength Spray Adhesive 90. Other wipes were made with foam layers having dimensions of 50 mm×50 mm×3 mm and 102 mm×102 mm×3 mm. In these examples, the reinforcing layer had the same dimensions as the foam layer and was coextensive therewith.

A layer of BASOTECT® foam from BASF, pre-treated to be hydrophilic, was also used. It was cut to dimensions of 95 mm×133 mm×5 mm and joined to spunbond with 3M™ Hi-Strength Spray Adhesive 90.

A layer of BASOTECT® foam having dimensions of 432 mm×254 mm×3 mm was joined to a VIVA® paper towel of the same dimensions using KOSA® bicomponent binder fibers with a nominal length of 6 mm. An airlaid handsheet former was used to apply the binder fibers uniformly to the paper towel. The foam was placed thereon, and the collection was heated at 172° C. for 30 minutes under a load of 0.02 psi to activate the binder fibers. After cooling, the bonded composite was cut to form six wipes having planar dimensions of 133 mm×95 mm.

A layer of BASOTECT® 2011 foam with dimensions of 124 mm×133 mm×2 mm was joined to a VIVA® paper towel of the same dimensions using a Pellon® Wonder-Under Transfer Web #805 (Pellon Consumer Products Division, Freudenberg Nonwovens, Durham, N.C.). The adhesive transfer web was activated by ironing the composite with a handheld 1200 Watt Sunbeam iron (Model 3953-006) on the wool setting.

In one example, a 3-mm thick layer of BASOTECT® 2011 foam was cut to yield a layer with dimensions of 102 mm×102 mm×3 mm. The foam layer was joined with a conventional hotmelt adhesive and hotmelt adhesive applicator on a pilot line to an 0.5 ounce-per-square-yard (osy) polypropylene spunbond web.

In another example, a thin layer of green dry floral foam from Oasis Floral Products (Kent, Ohio, UPC No. 082322634866) was cut with the commercial meat slicer to dimensions of about 68 mm×98 mm×2 mm and sprayed on one surface with 3M (Minneapolis, Minn.) 3M™ Hi-Strength Spray Adhesive 90 and then pressed against a layer of about 20 gsm spunbond material that had also been sprayed with the adhesive, to form a cleaning wipe. The floral foam is a phenolic-based foam which proved to be effective in removing crayon from flat surfaces, though it is stiffer and more brittle than BASOTECT® foam. In a related example, a thin layer of floral foam having the same dimensions 68 mm×98 mm×2 mm was sprayed with the Hi-Strength Spray Adhesive 90 and then attached to a web of VIVA® paper towels to form another cleaning wipe.

EXAMPLE 3

Dry Erase System

To demonstrate the cleaning abilities of the laminate of the present invention, melamine foam laminates were used to remove crayon and permanent marker ink from a white substrate, a 12-inch by 18-inch section of white countertop material, a high pressure laminate (HPL) marketed under the PIONITE® brand name and manufactured by Pioneer Plastics (Auburn, Me.) as product F39 SW811N White. According to manufacturer specifications at http://www.pionite.com/pionite/pspec.html, type F39 (Standard Decorative Laminate) HPL materials have a sheet thickness of 0.039 inch (1.0 mm) plus/minus 0.005 inch (0.12 mm), and exceed the performance requirements of NEMA LD 3-1995 Grade HGP. (Of course, many other materials could be used for dry erase boards, such as PIONITE® Markerboard Laminates made by Pioneer Plastics in Auburn, Me.)

The HPL material was mounted in an aluminum frame provided with two mounts for screws to attach to a wall. Writing on the white board was done using several colors of regular-sized CRAYOLA™ crayons (Crayola, Inc., Easton, Pa.) selected from a box of 64 colors.

An eraser comprising a layer of melamine foam was made by converting an existing dry erase eraser. The original eraser had a handle joined to a soft felt layer. To modify the eraser, a layer of VELCRO™ hook material with an adhesive backing was pressed into the felt layer, with the hook-side engaging the soft felt layer, where it attached well due to mechanical entanglement. Release paper on the outward-facing adhesive side of the VELCRO™ material was then removed to expose the pressure-sensitive adhesive, which was used then joined to the flat side of a woven VELCRO™ hook-like material to provide a hook-outward orientation for engaging the nonwoven reinforcing layer of cleaning wipes comprising spunbond web adhesively joined to melamine foam. In this manner, a hook system engages the cleaning wipes of the present invention, allowing the handle of the eraser to provide a useful gripping means for holding the wipe to clean crayon or other markings off the HPL dry erase board.

The laminates of the present invention can also be used to clean and maintain existing dry erase systems. In one embodiment, dry erase markers can be replaced with crayons, grease pencils, wax pencils, and the like, due to the ability of the laminates of the present invention to readily remove such materials from solid surfaces. Exemplary dry erase materials include PIONITE® Markerboard Laminate (Pioneer Plastics, Auburn, Me.) and other boards and laminates.

EXAMPLE 4

Wipe for Use with a Mop

A layer of BASOTECT® foam from BASF was cut to dimensions of 102 mm×254 mm×3 mm and joined in a centered and aligned relationship to a larger spunbond web with planar dimensions of 229 mm×254 mm. Attachment was done with 3M™ Hi-Strength Spray Adhesive 90. The laminated foam-web composite was suitable for attachment to a SWIFFER™-type mop head (Procter & Gamble, Cincinnati, Ohio) as a disposable mopping sheet. One such sheet was mounted onto the mop head and used to clean portions of a laboratory floor with a small amount of water previously applied to portions of the floor.

As illustrated in this example, the reinforcing layer can have one or two planar dimensions (length and width) greater than the planar dimensions of the foam layer, which may be oriented in alignment with the sides of the reinforcing web or may be skewed with respect thereto, and which may be mounted in a centered or off-center relationship with respect thereto.

EXAMPLE 5

Wipe with Gripper Element

To demonstrate one form of a gripping means for holding a cleaning wipe in place, a wipe was attached to the gripping portion of a paint edger. A Trimline® TrimTite EZ Painter™, manufactured by Newell Rubbermaid (St. Francis, Wis., UPC 070042 503210), was obtained. The bristle layer (the coarse fabric that hold paint for edging) was removed. Two two-inch wide strips of self-adhesive VECLRO® hook material were applied across the surface of the edger (one strip was trimmed such that the two strips covered the surface) that had formerly held the bristle layer, with the adhesive side against the edger. The outward-facing hook material was then joined to a nonwoven loop material that had been adhesively attached to a 3-mm thick BASOTECT® foam layer. Both the foam and the nonwoven web had planar dimensions of 89 mm×121 mm. The nonwoven loop material is substantially the same as the attachment zone in the hook-and-loop fastening system in 2003 HUGGIES® diapers marketed in the United States. The nonwoven loop material was joined to the foam with 3M™ Hi-Strength Spray Adhesive 90.

It should be understood that the present invention includes various modifications that can be made to the embodiments of the cleaning product 10 as described herein as come within the scope of the appended claims and their equivalents.

The invention claimed is:

1. A thin, flexible cleaning wipe for use in cleaning a surface, comprising:
   a melamine based foam configured for contacting and cleaning a surface to be cleaned, the melamine based foam being free from plastic deformation, wherein said melamine based foam has a thickness of from about 2 millimeters to about 20 millimeters and a density of from about 4 kg/m$^3$ to about 15 kg/m$^3$, and
   a web attached to the melamine based foam, wherein the web is a wet-resilient tissue having a three dimensional surface defining peaks and valleys, the melamine based foam is attached to the three-dimensional surface of the wet-resilient tissue, wherein the cleaning wipe has a bending stiffness according to the Zwick Flexibility test of about 0.1 Nm or less and a dry tensile strength of at least about 600 grams per inch, wherein the ratio of the thickness of the foam layer to the thickness of the fibrous web is greater than 2.

2. The cleaning wipe as set forth in claim 1, wherein the web is a nonwoven web.

3. The cleaning wipe as set forth in claim 1, wherein the melamine based foam is laminated to the web.

4. The cleaning wipe as set forth in claim 1, wherein the Wire Mesh Tactile Sensitivity value is about 1000 or less.

5. The cleaning wipe as set forth in claim 1, wherein the Wire Mesh Tactile Sensitivity value is about 600 or less.

6. The cleaning wipe as set forth in claim 1, wherein the Wire Mesh Tactile Sensitivity value is about 400 or less.

7. The cleaning wipe as set forth in claim 1, wherein the bending stiffness is about 0.05 Nm or less.

8. The cleaning wipe as set forth in claim 1, wherein the bending stiffness is about 0.05 Nm or less and the Wire Mesh Tactile Sensitivity value is about 1000 or less.

9. The cleaning wipe as set forth in claim 1, wherein the modulus (E) for the cleaning wipe according to the Zwick Flexibility Test is about 60,000 kPa or less.

10. The cleaning wipe as set forth in claim 1, wherein the bending stiffness is about 0.05 Nm or less, and the Normalized Wire Mesh Tactile Sensitivity is about 600 or less.

11. The cleaning wipe as set forth in claim 1, wherein the basis weight of the wipe is less than about 400 gsm.

12. The cleaning wipe as set forth in claim 1, wherein the wet tensile strength is from about 600 grams per inch to about 10,000 grams per inch.

13. The cleaning wipe as set forth in claim 1, wherein the wet tensile strength is about 800 grams per inch or greater, the thickness is less than 10 millimeters, the Normalized Wire Mesh Tactile Sensitivity is about 1000 or less.

14. The cleaning wipe as set forth in claim 1, wherein the foam contributes less than about 40% of the tensile strength of the wipe.

15. The cleaning wipe as set forth in claim 1, wherein the ratio of the thickness of the foam layer to the thickness of the fibrous web is greater than 2 to about 20.

16. The cleaning wipe as set forth in claim 1, wherein the wet-resilient tissue comprises an abrasive material.

17. The cleaning wipe as set forth in claim 1, wherein the web and melamine based foam form part of a scrubbing pad.

18. The cleaning wipe as set forth in claim 1, wherein the web and melamine based foam form part of a sponge substitute.

19. The cleaning wipe as set forth in claim 1, wherein the melamine based foam is from about two millimeter to about eight millimeters in thickness.

20. The cleaning wipe as set forth in claim 1, wherein the web is made from an absorbent material and the web is selected from the group consisting of an absorbent tissue, an absorbent through-dried tissue, an absorbent tissue-polymer composite web, an absorbent coform web, an absorbent reinforced airlaid web, an absorbent molded airlaid web, a hydroknit web, and a hydroentangled web.

21. The cleaning wipe as set forth in claim 1, wherein the melamine based foam is configured in multiple layers, and wherein the web is configured in multiple layers, the layers of the melamine based foam are alternatingly positioned with the layers of the web in a stacked configuration.

22. The cleaning wipe as set forth in claim 1, wherein the melamine based foam is attached to the web by an attachment means selected from the group consisting of ultrasonic bonding, hot melts, pressure sensitive adhesives, thermal bonding, mechanical fasteners, hook and loop type fasteners, hydroentanglement of fibers into the foam, and sewing.

23. The cleaning wipe as set forth in claim 1, wherein the web is integrally formed with the melamine based foam.

24. The cleaning wipe as set forth in claim 1, wherein the web is a plurality of fibers embedded in the melamine based foam.

25. The cleaning wipe as set forth in claim 1, wherein the web is selected from the group consisting of a scrim layer, a mesh, an elastomeric network, a tow, a woven fabric, a tissue, a coform material, milkweed fibers, natural fibers, synthetic fibers, and a nonwoven web.

26. The cleaning wipe as set forth in claim 1, wherein the web has a functional member selected from the group consisting of a cleaning agent, a bleaching agent, an abrasive compound, a detergent, an odor releasing agent, a skin wellness agent, an odor control agent, a biosensing agent, a heat generation agent, an antimicrobial agent, a natural plant based extract or compounds, and a foam generating agent.

27. The cleaning wipe as set forth in claim 1, wherein the melamine based foam has a visual indicating portion that is of a different color than an outer surface of the melamine based foam.

28. The cleaning wipe as set forth in claim 1, further comprising a protective envelope attached to the web.

29. The cleaning wipe as set forth in claim 1, wherein the web is a hydrophilic web.

30. The cleaning wipe as set forth in claim 1, wherein the melamine based foam is made of a plurality of strips connected by a plurality of tabs, and wherein the web is dispersible such that the web breaks up when exposed to water.

31. The cleaning wipe as set forth in claim 1, wherein the Zwick Flexibility Modulus of the cleaning wipe is greater than about 1100 Kpa.

32. The cleaning wipe as set forth in claim 1, wherein the melamine based foam includes struts that are less than about 15 microns in width.

33. The cleaning wipe as set forth in claim 1, wherein the surface to be cleaned is a dry-erase board configured to allow crayon marking, and wherein the melamine based foam is configured for removing crayon marking from the dry-erase board.

34. The cleaning wipe as set forth in claim 1, wherein the cleaning wipe is formed by a process comprising the steps of:
   cutting a block of melamine based foam into a melamine based foam layer less than about ten millimeters in thickness;
   applying an adhesive to the web;
   placing the melamine based foam layer on the adhesive on the web; and
   moving the melamine based foam layer and the web through a die cutting nip such that individual cleaning wipes exit the die cutting nip.

35. The cleaning wipe as set forth in claim 1, wherein at least one of the melamine based foam and the web has an electrostatic charge in order to aid in cleaning of the surface to be cleaned.

36. A cleaning product configured for use in cleaning dirt from a surface, comprising:
   a melamine based foam layer configured for engaging a surface and cleaning the surface, the melamine based foam being free from plastic deformation, wherein said melamine based foam has a thickness of from about 2 millimeters to about 20 millimeters and a density of from about 4 kg/m$^3$ to about 15 kg/m$^3$, wherein upon movement across the surface portions of the melamine based foam layer are removed by friction; and
   a reinforcing web layer attached to the melamine based foam layer, the reinforcing web layer provides some structural rigidity to the melamine based foam layer, wherein the reinforcing web layer has a three dimensional surface defining peaks and valleys, the melamine based foam is attached to the three-dimensional surface of the reinforcing web layer;
   wherein the melamine based foam layer contributes to the cleaning product less than about one third of the overall tensile strength of the cleaning product, wherein the cleaning product has a bending stiffness according to the Zwick Flexibility test of about 0.1 Nm or less, wherein the ratio of the thickness of the foam layer to the thickness of the reinforcing web layer is greater than 2.

37. The cleaning product as set forth in claim 36, wherein the reinforcing web layer has a receiving surface, and wherein the melamine based foam layer substantially covers the entire receiving surface of the reinforcing web layer.

38. The cleaning product as set forth in claim 36, wherein the reinforcing web layer is formed at least in part by an abrasive material selected from the group consisting of coarse meltblown shot and meltblown multifilamentary aggregates.

39. The cleaning product as set forth in claim 36, wherein the reinforcing web layer is a nonwoven web.

40. The cleaning product as set forth in claim 36, wherein the melamine based foam layer is laminated to the reinforcing web layer.

41. The cleaning product as set forth in claim 36, wherein the reinforcing web layer and the melamine based foam layer form part of a scrubbing pad.

42. The cleaning product as set forth in claim 36 wherein the reinforcing web layer and the melamine based foam layer form part of a sponge substitute.

43. The cleaning product as set forth in claim 36, wherein the reinforcing web layer is made from an absorbent material and the reinforcing web layer is selected from the group consisting of an absorbent tissue, an absorbent through-dried tissue, an absorbent tissue-polymer composite web, an absorbent coform web, an absorbent reinforced airlaid web, an absorbent molded airlaid web, a hydroknit web, and a hydroentangled web.

44. The cleaning product as set forth in claim 36, wherein the melamine based foam layer is configured in multiple layers, and wherein the reinforcing web layer is configured in multiple layers, the layers of the melamine based foam are alternatingly positioned with the layers of the reinforcing web in a stacked configuration.

45. The cleaning product as set forth in claim 36, wherein the melamine based foam layer is attached to the reinforcing web layer by an attachment selected from the group consisting of ultrasonic bonding, hot melts, pressure sensitive adhesives, thermal bonding, mechanical fasteners, hook and loop type fasteners, and sewing.

46. The cleaning product as set forth in claim 36, wherein the reinforcing web layer is integrally formed with the melamine based foam layer.

47. The cleaning product as set forth in claim 46, wherein the reinforcing web layer is a plurality of fibers embedded in the melamine based foam layer.

48. The cleaning product as set forth in claim 46, wherein the reinforcing web layer is selected from the group consisting of a scrim layer, a mesh, an elastomeric network, a tow, a woven fabric, a tissue, a coform material, milkweed fibers, natural fibers, synthetic fibers, and a nonwoven web.

49. The cleaning product as set forth in claim 36, wherein the reinforcing web layer has a functional member selected from the group consisting of a cleaning agent, a bleaching agent, an abrasive compound, a detergent, an odor releasing agent, an odor control agent, a skin wellness agent, a biosensing agent, a heat generation agent, antimicrobial agents, natural plant based extracts or compounds, and a foam generating agent.

50. The cleaning product as set forth in claim 36, wherein the melamine based foam layer has a visual indicating portion that is of a different color than an outer surface of the melamine based foam layer.

51. The cleaning product as set forth in claim 36, further comprising a protective envelope attached to the reinforcing web layer.

52. The cleaning product as set forth in claim 36, wherein the reinforcing web layer is a hydrophilic web.

53. The cleaning product as set forth in claim 36, wherein the melamine based foam layer is made of a plurality of strips connected by a plurality of tabs, and wherein the reinforcing web layer is dispersible such that the reinforcing web layer breaks up when exposed to water.

54. The cleaning product as set forth in claim 36, wherein the Zwick Flexibility Modulus of the cleaning product is greater than about 1100 Kpa.

55. The cleaning product as set forth in claim 36, wherein the melamine based foam layer includes struts that are less than about 15 microns in width.

56. The cleaning product as set forth in claim 36, wherein the surface is a dry-erase board configured to allow crayon marking, and wherein the melamine based foam layer is configured for removing crayon marking from the dry-erase board.

57. The cleaning product as set forth in claim 36, wherein the cleaning product is formed by a process comprising the steps of:
    cutting a block of melamine based foam into the melamine based foam layer;
    applying an adhesive to the reinforcing web layer;
    placing the melamine based foam layer on the adhesive on the reinforcing web layer; and
    moving the melamine based foam layer and the reinforcing web layer through a die cutting nip such that individual cleaning products exit the die cutting nip.

58. The cleaning product as set forth in claim 36 wherein at least one of the melamine based foam layer and the reinforcing web layer has an electrostatic charge in order to aid in cleaning the surface.

59. A cleaning wipe for use in cleaning a surface, comprising:
    a melamine based foam configured for contacting and cleaning a surface to be cleaned, the melamine based foam being free from plastic deformation and being from about 2 millimeter to about 20 millimeters in thickness;
    a nonwoven web attached to the melamine based foam, the melamine based foam and the nonwoven web are laminated to one another in order to effect attachment, wherein the ratio of the thickness of the foam to the thickness of the nonwoven web is greater than 2; and
    a protective envelope attached to the web configured to prevent a user from physically contacting the cleaning wipe.

60. A cleaning wipe for use in cleaning a surface, comprising:
    a melamine based foam configured for contacting and cleaning a surface to be cleaned, the melamine based foam being free from plastic deformation, wherein said melamine based foam has a thickness of from about 2 millimeters to about 20 millimeters and a density of from about 4 kg/m$^3$ to about 15 kg/m$^3$; and
    a web attached to the melamine based foam, wherein the web is a wet-resilient tissue having a three dimensional surface defining peaks and valleys, the melamine based foam is attached to the three-dimensional surface of the wet-resilient tissue, wherein the ratio of the thickness of the foam to the thickness of the web is greater than 2;
    wherein the wire mesh tactile sensitivity value of the cleaning wipe is less than about 1000 and wherein the cleaning wipe has a bending stiffness according to the Zwick Flexibility test of about 0.1 Nm or less.

61. The cleaning wipe as set forth in claim 60, wherein the web is a nonwoven web.

62. The cleaning wipe as set forth in claim 60, wherein the melamine based foam is laminated to the web.

63. The cleaning wipe as set forth in claim 60, wherein the web is a wet-resilient tissue comprises an abrasive material.

64. The cleaning wipe as set forth in claim 60, wherein the web and melamine based foam form part of a scrubbing pad.

65. The cleaning wipe as set forth in claim 60, wherein the web and melamine based foam form part of a sponge substitute.

66. The cleaning wipe as set forth in claim 60, wherein the melamine based foam is from about two millimeters to about eight millimeters in thickness.

67. The cleaning wipe as set forth in claim 60, wherein the web is made from an absorbent material and the web is selected from the group consisting of an absorbent tissue, an absorbent through-dried tissue, an absorbent tissue-polymer composite web, an absorbent coform web, an absorbent reinforced airlaid web, an absorbent molded airlaid web, a hydroknit web, and a hydroentangled web.

68. The cleaning wipe as set forth in claim 60, wherein the melamine based foam is configured in multiple layers, and wherein the web is configured in multiple layers, the layers of the melamine based foam are alternatingly positioned with the layers of the web in a stacked configuration.

69. The cleaning wipe as set forth in claim 60, wherein the melamine based foam is attached to the web by an attachment selected from the group consisting of ultrasonic bonding, hot melts, pressure sensitive adhesives, thermal bonding, mechanical fasteners, hook and loop type fasteners, and sewing.

70. The cleaning wipe as set forth in claim 60, wherein the web is integrally formed with the melamine based foam.

71. The cleaning wipe as set forth in claim 60, wherein the web is a plurality of fibers embedded in the melamine based foam.

72. The cleaning wipe as set forth in claim 60, wherein the web is selected from the group consisting of a scrim layer, a mesh, an elastomeric network, a tow, a woven fabric, a tissue, a coform material, milkweed fibers, natural fibers, synthetic fibers, and a nonwoven web.

73. The cleaning wipe as set forth in claim 60, wherein the web has a functional member selected from the group consisting of a cleaning agent, a bleaching agent, an abrasive compound, a detergent, an odor releasing agent, a skin wellness agent, an odor control agent, a biosensing agent, a heat generation agent, an antimicrobial agent, a natural plant based extract or compounds, and a foam generating agent.

74. The cleaning wipe as set forth in claim 60, wherein the melamine based foam has a visual indicating portion that is of a different color than an outer surface of the melamine based foam.

75. The cleaning wipe as set forth in claim 60, further comprising a protective envelope attached to the web.

76. The cleaning wipe as set forth in claim 60, wherein the web is a hydrophilic web.

77. The cleaning wipe as set forth in claim 60, wherein the melamine based foam is made of a plurality of strips connected by a plurality of tabs, and wherein the web is dispersible such that the web breaks up when exposed to water.

78. The cleaning wipe as set forth in claim 60, wherein the Zwick Flexibility Modulus of the cleaning wipe is greater than about 1100 Kpa.

79. The cleaning wipe as set forth in claim 60, wherein the melamine based foam includes struts that are less than about 15 microns in width.

80. The cleaning wipe as set forth in claim 60, wherein the surface to be cleaned is a dry-erase board configured to allow crayon marking, and wherein the melamine based foam is configured for removing crayon marking from the dry-erase board.

81. The cleaning wipe as set forth in claim 60, wherein the cleaning wipe is formed by a process comprising the steps of:
   cutting a block of melamine based foam into a melamine based foam layer less than about ten millimeters in thickness;
   applying an adhesive to the web;
   placing the melamine based foam layer on the adhesive on the web; and
   moving the melamine based foam layer and the web through a die cutting nip such that individual cleaning wipes exit the die cutting nip.

82. The cleaning wipe as set forth in claim 60, wherein at least one of the melamine based foam and the web has an electrostatic charge in order to aid in cleaning the surface.

* * * * *